United States Patent [19]
Bukowski et al.

[11] 4,128,758
[45] Dec. 5, 1978

[54] ELECTRONIC ORDER PRICING SYSTEM

[75] Inventors: Raymond J. Bukowski, Chicago; Frederick S. Erst, Arlington Hts., both of Ill.

[73] Assignee: Motiograph, Inc., Richardson, Tex.

[21] Appl. No.: 297,819

[22] Filed: Oct. 16, 1972

Related U.S. Application Data

[63] Continuation of Ser. No. 14,605, Feb. 26, 1970.

[51] Int. Cl.² ............................................. G06K 1/12
[52] U.S. Cl. .................................. 235/433; 235/419; 235/456; 364/464
[58] Field of Search ............. 235/61.9, 91.14, 61.6 H, 235/61.6 R, 56, 156, 92 AC; 186/1 A, 1.2; 194/4; 339/18 R, 18 B; 234/16

[56] References Cited

U.S. PATENT DOCUMENTS

| | | | |
|---|---|---|---|
| 2,928,953 | 3/1960 | Bassler | 235/61.11 E UX |
| 3,035,764 | 5/1962 | Beman | 235/61.9 R |
| 3,048,327 | 8/1962 | Gewickey et al. | 234/16 |
| 3,335,407 | 8/1967 | Lange et al. | 235/61.6 R |
| 3,441,714 | 4/1969 | Simjian | 235/61.6 R |
| 3,639,732 | 2/1972 | Crain et al. | 235/61.12 N |
| 3,751,637 | 8/1973 | Dillon et al. | 235/61.9 A |

OTHER PUBLICATIONS

Richards, "Arithmetic—Digital Computers," 1955, pp. 140, 141.

*Primary Examiner*—Thomas J. Sloyan
*Attorney, Agent, or Firm*—Emrich, Root, O'Keeffe & Lee

[57] ABSTRACT

An electronic order pricing system including a data card having a plurality of item lines, each representing an orderable item with certain of the lines bearing indicia representing a quantity of items ordered by a customer, apparatus for reading the data card line by line and providing outputs representing the data thereon, circuits for calculating the quantity of each item ordered, a programmable price select matrix storing price data for each orderable item, circuits for using the stored price data and the item quantities calculated to calculate a total price for the items ordered, a sales tax based on the total price and a total order price, and circuits for effecting printout of the calculated price data on the data card.

61 Claims, 45 Drawing Figures

INVENTORS.
RAYMOND J. BUKOWSKI
FREDERICK S. ERST

BY

ATTYS.

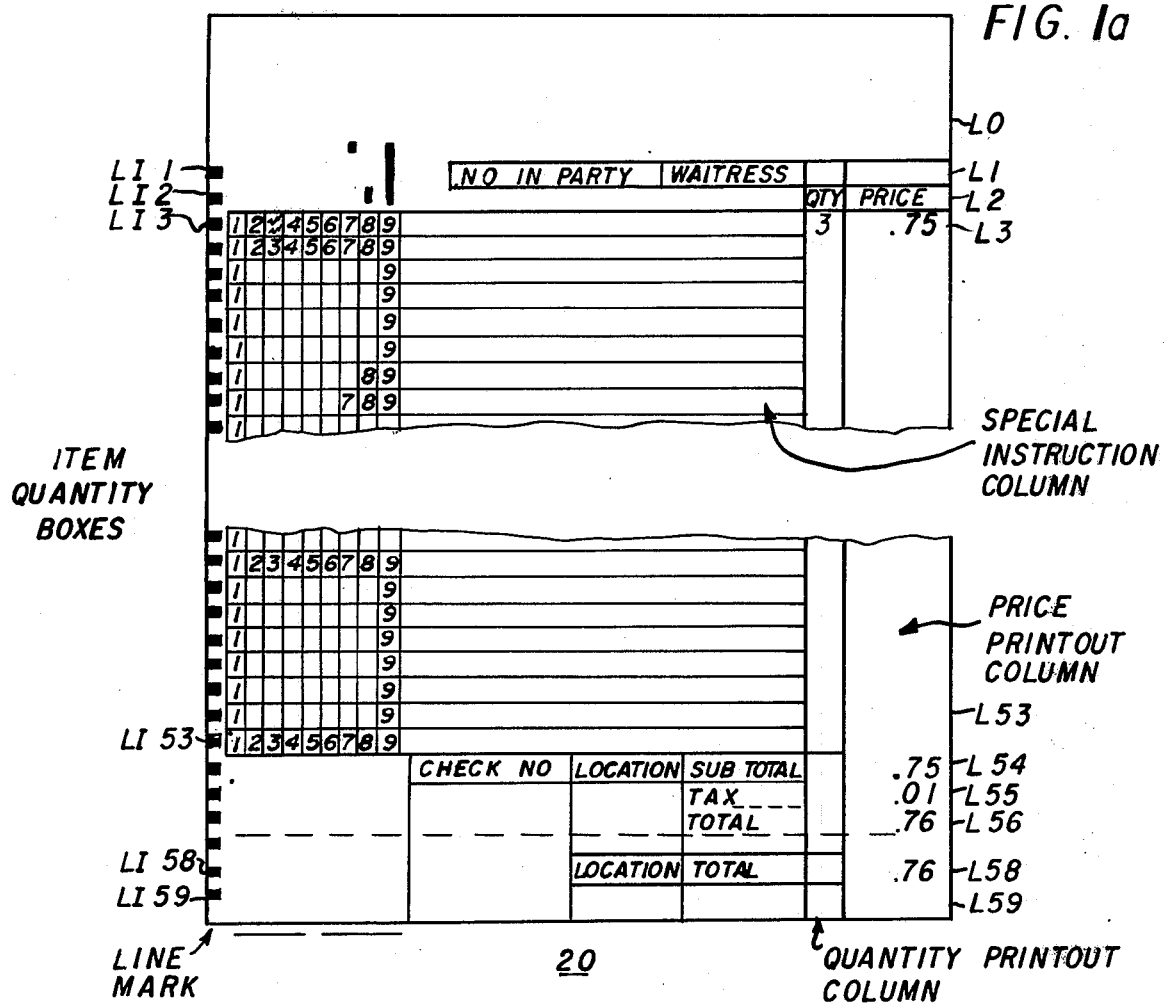
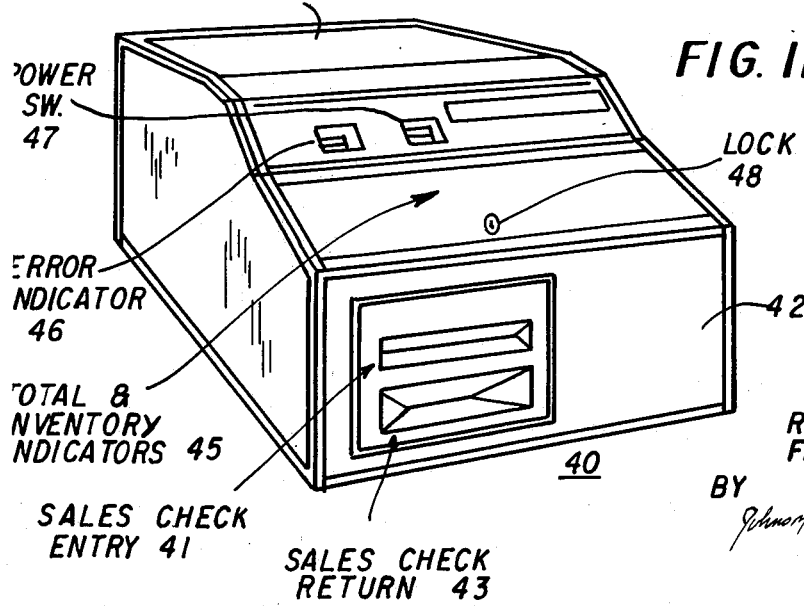

INVENTORS
RAYMOND J. BUKOWSKI
FREDERICK S. ERST

BY

ATTYS.

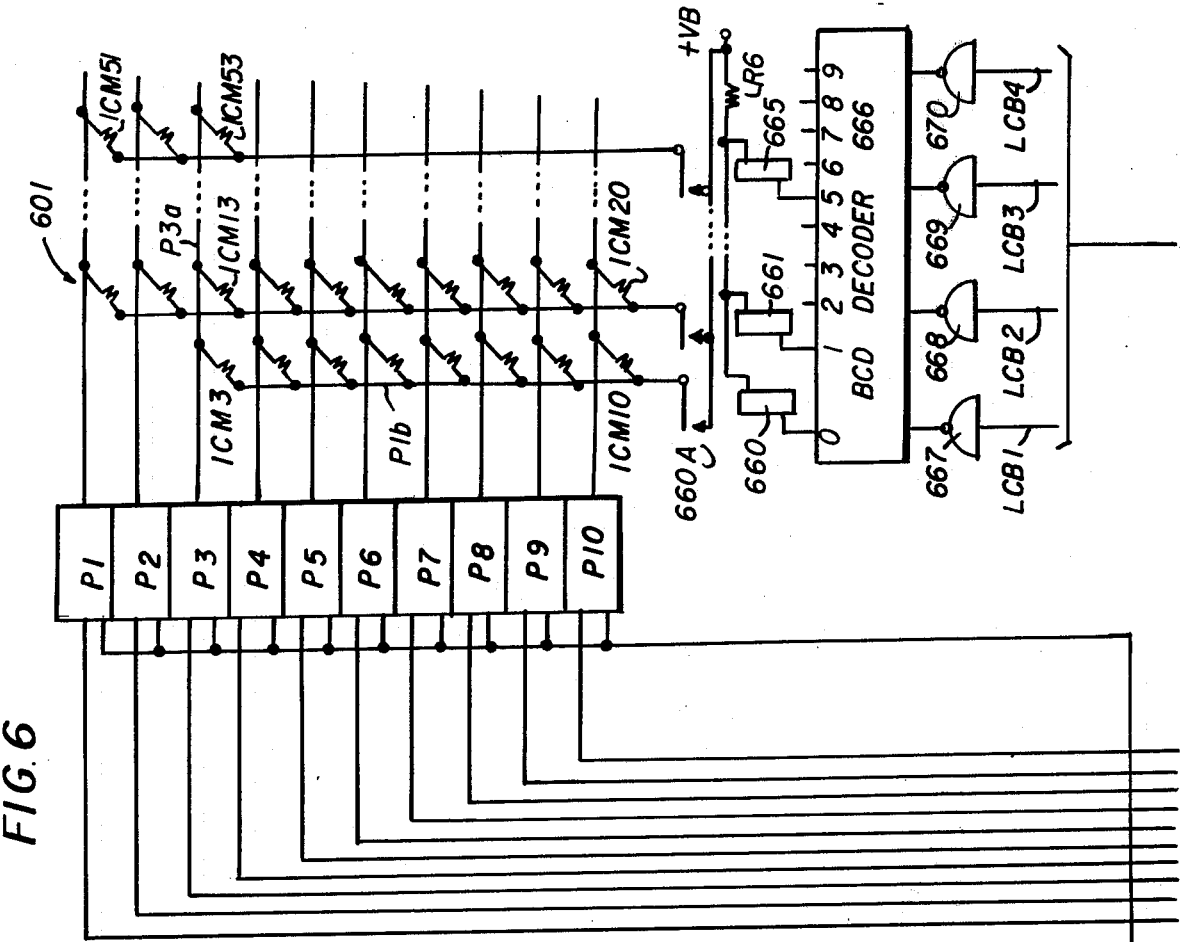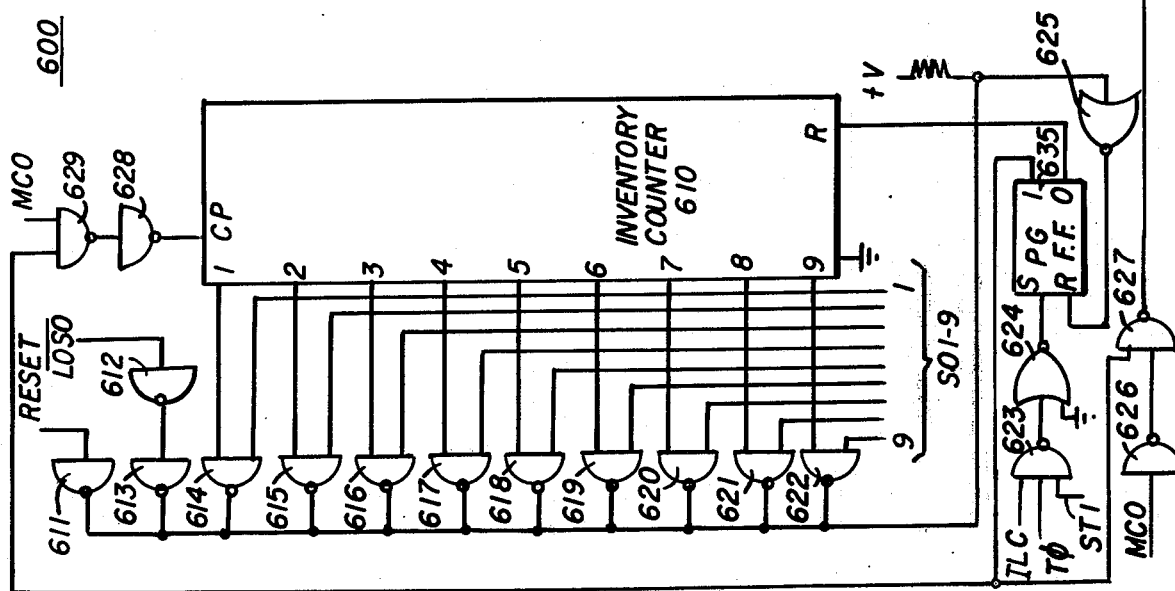
FIG. 6
INVENTORS
RAYMOND J. BUKOWSKI
FREDERICK S. ERST
BY *Johnson Dienner Emrich Verbeck & Wagner*
ATTYS.

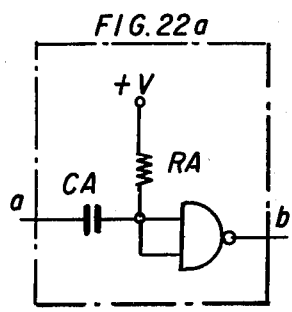
FIG. 22a
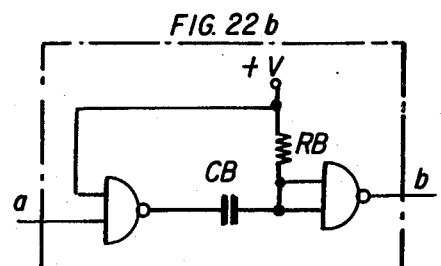
FIG. 22b
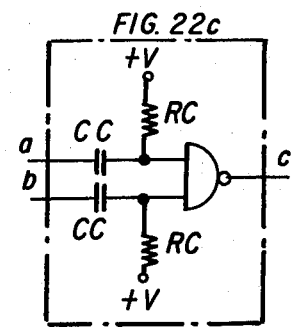
FIG. 22c
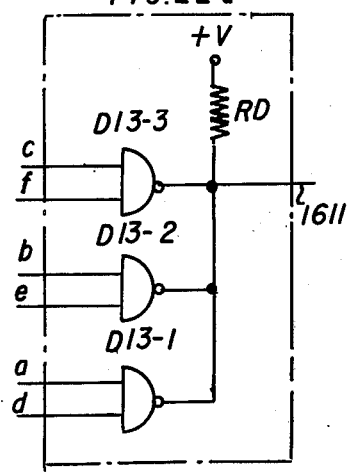
FIG. 22d
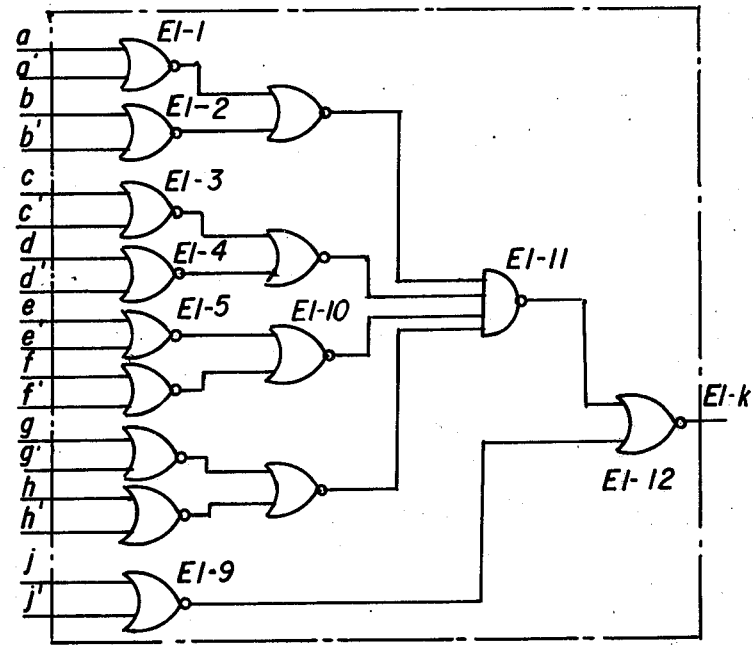
FIG. 22e
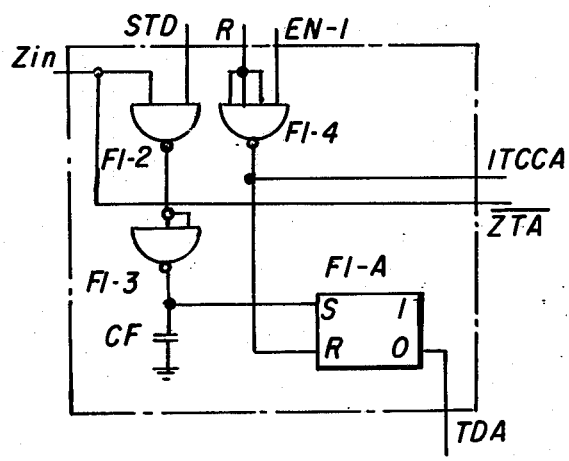
FIG. 22f
FIG. 21
| FIG. 3 | FIG. 2 | | |
|---|---|---|---|
| FIG. 4 | FIG. 5 | FIG. 6 | |
| FIG. 7 | FIG. 8 | FIG. 9 | |
| FIG. 10 | FIG. 11 | FIG. 12 | FIG. 13 |
| FIG. 14 | FIG. 15 | FIG. 16 | FIG. 17 |
| FIG. 18 | FIG. 19 | FIG. 20 | |
INVENTORS
RAYMOND J. BUKOWSKI
FREDERICK S. ERST
BY
ATTYS.

INVENTORS
RAYMOND J. BUKOWSKI
FREDERICK S. ERST

ATTYS

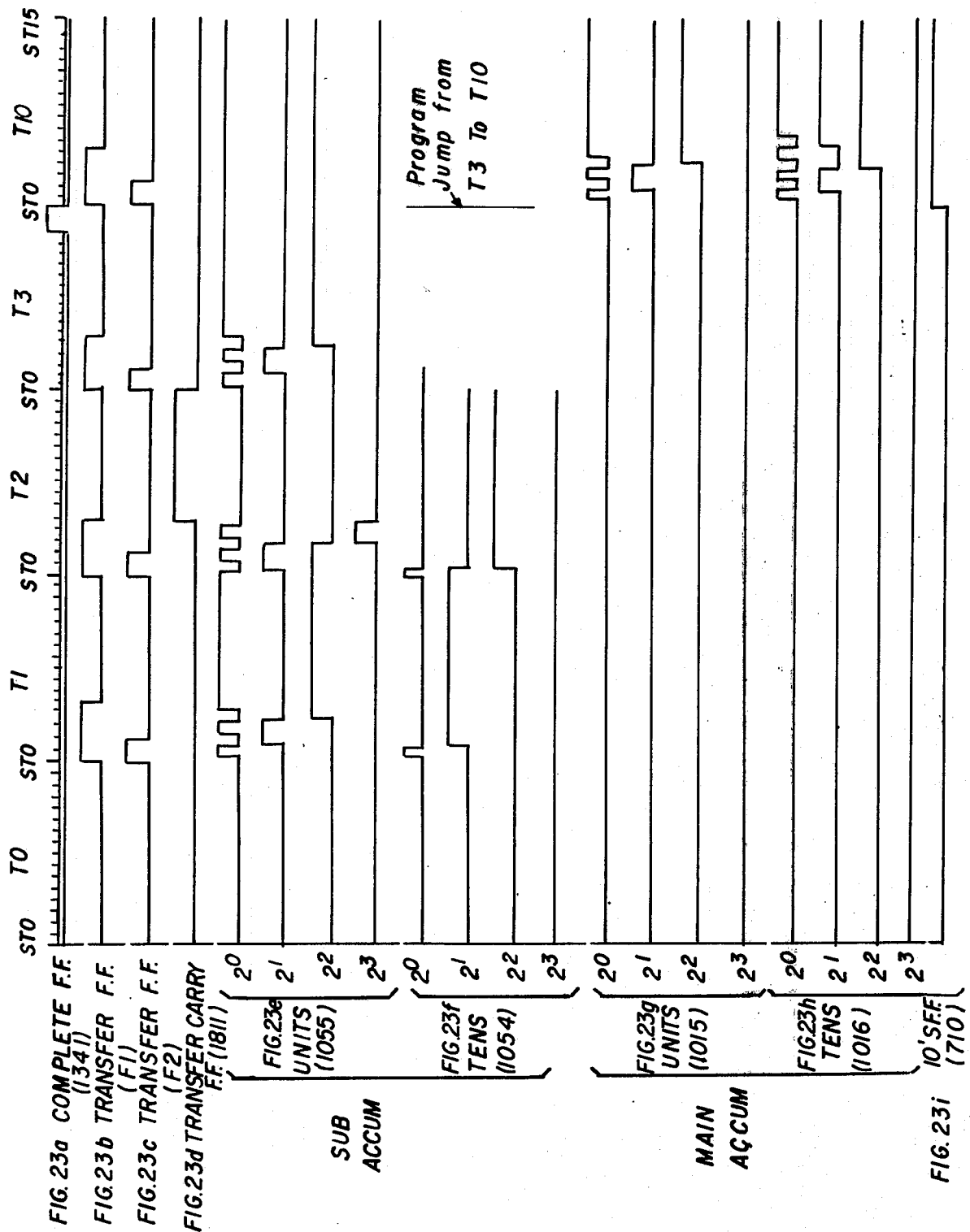

ELECTRONIC ORDER PRICING SYSTEM

This is a continuation of application Ser. No. 14,605, filed Feb. 26, 1970.

BACKGROUND OF THE INVENTION

1. Field of the Invention

This invention relates to electronic calculating systems and more particularly to an electronic order pricing system for receiving customer order information by way of a data card and for calculating the price of the order.

2. Description of the Prior Art

In many retail establishments, such as stores, restaurants, etc., a customer's order is manually entered on a sales check or bill by a clerk or waitress and when the order has been filled, and before the bill is presented to the customer, the customer's order will be priced with the unit price for each item ordered being multiplied by the total number of each item ordered and the total price for each order will be determined by adding the individual price totals for each of the items ordered.

The process may frequently require look-up of item prices and manual calculation to obtain the total bill. Thus, manual customer billing is slow and tedious process and is, of course, subject to human error. Such error in the pricing and addition of sales checks can result in customers being under-charged in which case profits are diminished. If, on the other hand, a customer is over-charged the customer will tend to look with disfavor on the particular establishment. If such pricing errors are frequent, the retail establishment will have low profit margins and will be likely to lose a number of customers.

In other retail establishments, each item price is individually entered into a case register, item by item, by a clerk or waitress, and a sub-total is automatically computed by the register. Such procedures while more accurate, are still subject to human error if, for example, a clerk selects the wrong price for an item or makes a mistake in keying the price of an item into the register. In addition, the customer cannot, at a glance, correlate prices on his bill with items he has ordered, and in scanning a register receipt which usually comprises a long column of figures which represent his order, it is difficult for the customer to determine if he was charged properly. Moreover, the register is tied up while each item price is entered into the register and if a customer changes his order, the register cannot be used for pricing other orders while the first order is modified.

SUMMARY OF THE INVENTION

The present invention provides an electronic order pricing system which automatically prices items ordered, calculates a sub-total for each order, a sales tax based on the sub-total, the grand total for the order, and provides an itemized, printed sales check.

Order information is supplied to a calculating unit of the system through the use of preprinted data cards on which each of a plurality of lines represent an orderable item. Each item line includes an index mark and a plurality of item quantity boxes by which the user indicates the quantity of each item ordered.

The preprinted data card serves as the medium for supplying order information to the system. The order information is, in effect, stored on the data card and supplied a line at a time to the system which uses the data to determine the quantity of items ordered for each line and the extended price for the items ordered for each line. This information is then printed on each line as it is determined and only the total price for all the lines is stored with the total price accumulating as successive lines are read.

To take an order, the clerk or waitress merely makes a pencil mark in the appropriate item quantity box of the line labelled to represent the item ordered. The data card further includes space for providing additional order information to a stockroom or kitchen, for example. Such space is provided without effecting the size of the quantity data portion of the card.

When the entire total order has been taken, the user inserts the data card into the electronic order pricing apparatus which prices the order and provides the total price for the items ordered, computes and adds a sales tax to the item total price and prints out the resulting total price for the order on the data card.

Thus since the item pricing and order pricing are done by the order pricing unit, human error is minimized by eliminating some of the sources of their error. Furthermore, since the complete order is taken before it is priced the amount of time in which the pricing apparatus is in use is minimized. Thus, the pricing apparatus can be used by several order taking personnel. It is pointed out that an order involving six different item lines will take approximately five seconds to price using the electronic order pricing system of the present invention.

When the data card is inserted into the pricing unit, the system is responsive to the detection of the line index marks and item quantity marks to determine, on a line by line basis, the quantity of items ordered for each line.

Item line indexing circuits, which include a line mark counter and a line mark count matrix, are responsive to the line index marks to provide a different control signal for each item line for selecting a price programmed in a programmable price select board.

The price select board includes three price programming devices for each line. Each programming device comprises an inexpensive plug and socket arrangement for permitting; selection of one-out-of-ten outputs which represent the digits zero to nine. The three devices for each item line assign a three-digit price to each line in accordance with outputs selected for each device. The price select board provides price information for each item line of the data card.

The price select board is pluggably connected into circuits of the system and accordingly the entire set of programmed prices can be changed by merely removing one board of programmed devices and substituting a different board. In such a way, a retailer can accommodate pricing of special sale prices or, in a restaurant, for example, different prices can be provided for day or evening menus.

The selected price is transferred over data transfer circuits to price data accumulator circuits a number of times equal to the quantity of each item ordered.

Price data representing the total price calculated for the number of items determined to be ordered for each line and further price data representing a sub-total price for all of the items ordered are transferred through the data transfer circuits to print control circuits which effect print out of the price data on appropriate lines of the data card.

Tax circuits, which include adjustable tax select switches, are used to calculate a sales tax for the order at a rate which can be adjusted from 0% to 9.9% in the described embodiment. The data transfer circuits which transfer item price data are also used to transfer tax data which is two orders of magnitude less than the price data. The tax circuits include circuits for shifting the decimal point of the tax figure by two places to scale the tax figure to the same order of magnitude as the price data so that printout of the total tax and addition of the tax to the subtotal of the order is possible. A tax round-off circuit is provided to increase the hundreds digit of the tax figure by one whenever the tens digit of the tax figure is equal to or greater than five. The roundoff of the tax figure is effected prior to shifting the decimal point.

The electronic order pricing system provided by the present invention comprises a wired program which provides an ordered sequence of operations for item quantity determinations, price and tax figure calculations, transfer of price and tax data, and printout of the calculated information on the data card.

The system further includes inventory control circuits including a matrix of inventory counters, for registering the quantity of items ordered. As each item line is priced, an inventory counter associated therewith is stepped a number of times equal to the quantity of items ordered for that item line.

The circuits and apparatus of the electronic pricing control system which provide the above functions for automatic order pricing are set forth in the following detailed description which makes reference to the accompanying drawings.

DESCRIPTION OF THE DRAWINGS

FIG. 1a is a data card for providing data to the system;

FIG. 1b is an isometric view of a transporter unit which houses the circuits and apparatus, including data card advancing apparatus, of the system;

FIGS. 2-20, assembled as shown in FIG. 21, are a schematic circuit diagram of the order pricing system and are used in the detailed description of the system and its operation;

FIG. 21 shows how FIGS. 2-20 are to be assembled;

FIG. 23 is a timing chart which illustrates the timing sequence of certain circuits during the item line scan program.

DESCRIPTION OF A PREFERRED EMBODIMENT

DATA CARD

Referring to FIG. 1a, a sales check or data card 20 for presenting to the order pricing system information relating to a customer's order includes a plurality of item lines L0, L1, L2-L59 each representing a different item to be ordered by the customer. In one application, the sales check included fifty-one lines such as lines L3 to L53 used for item identification. However, a larger or smaller number of lines may be provided, if desired. In taking an order, the waitress will mark appropriate boxes of each item line to designate the quantity of each item ordered. For example, if the waitress received an order for three items which are identified by the third line L3, that is, the first row of boxes shown on the sales check, the box of the sales check containing the number 3 will be marked by a pencil mark as shown in FIG. 1a.

To the left of the item quantity boxes along the left edge of the check in a vertical column are a set of line marker indicia LI1, LI2, ... LI59 one for each line of the check, which indicate the vertical location of each line and of the quantity information which appears on each line and extends horizontally across the sales check. As can be seen in FIG. 1a, line markers LI3--LI53, are located in the center of the space alloted for each horizontal line of information and the nine item quantity boxes will be scanned for pencil marks near the center of the boxes. Thus, when any one of the quantity boxes is marked by the user, there can be some "slopover" or extension of the pencil marks from one box into an adjacent box without resulting in a false reading.

Figure 1:
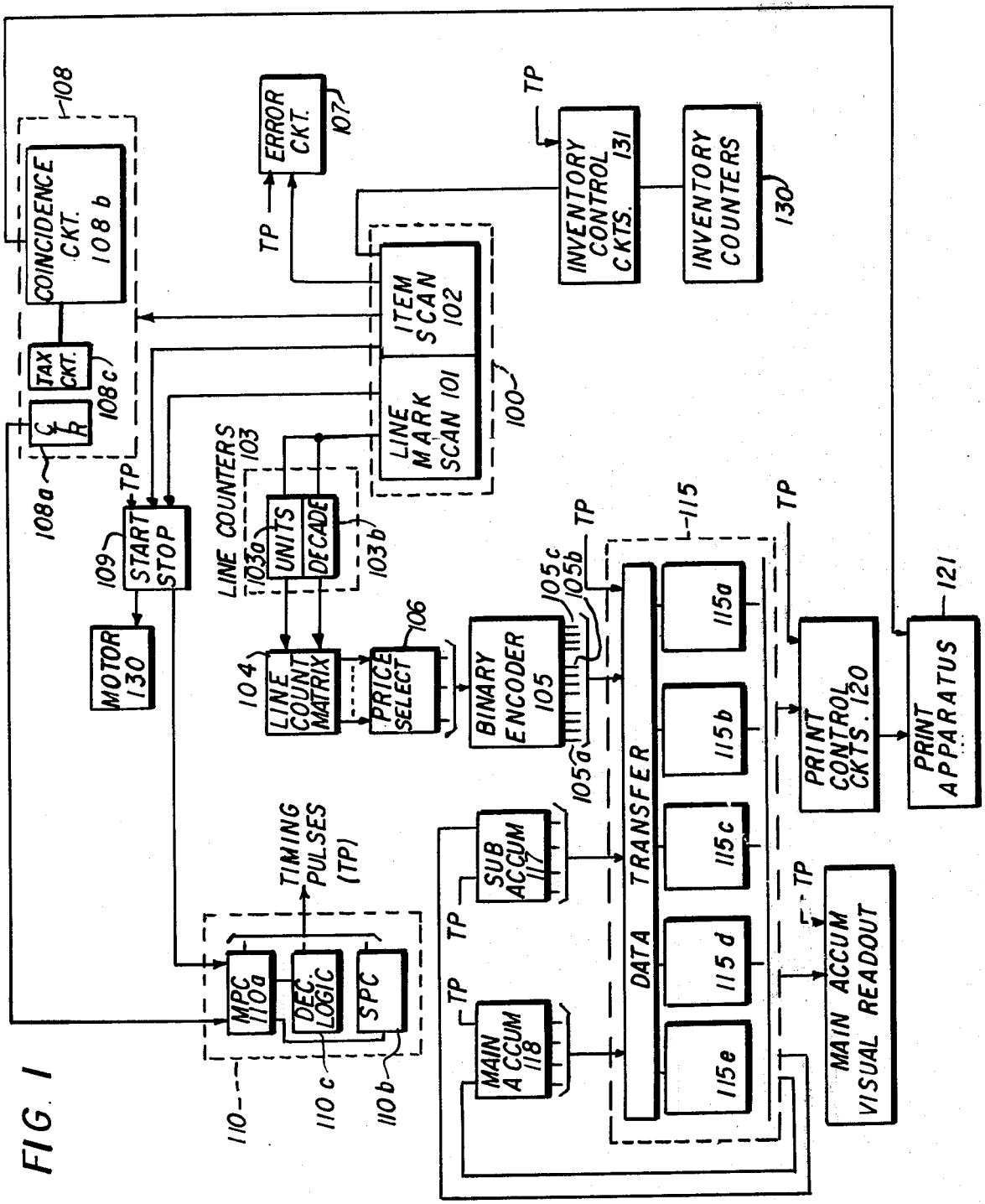
FIG. 1 is a block diagram of an electronic order pricing system.
Figure 1C:
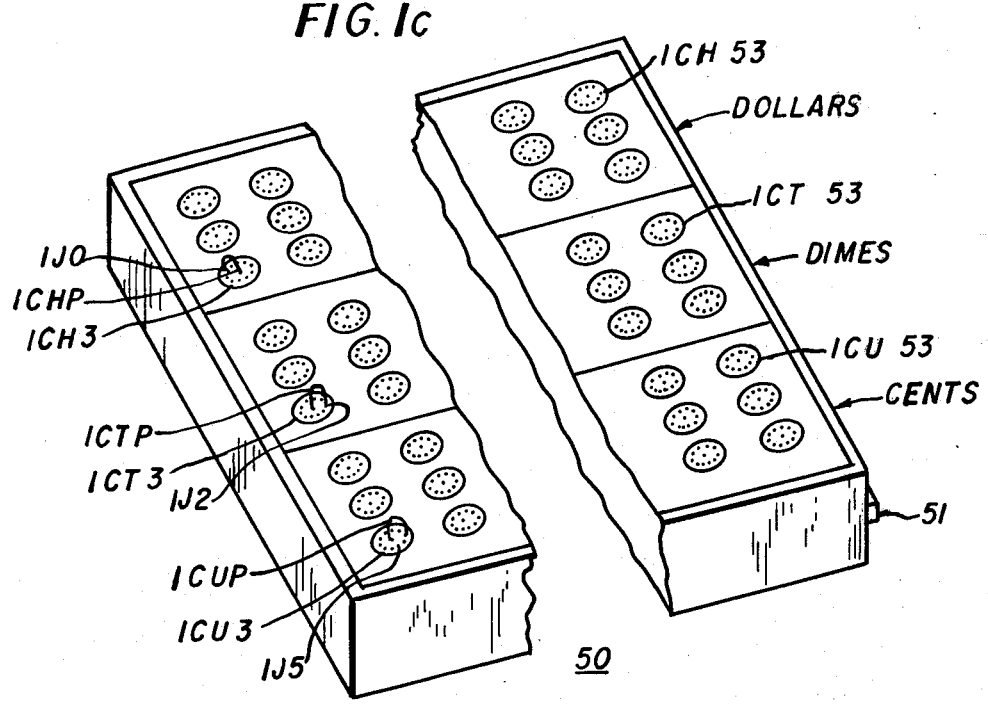
FIG. 1c is an isometric view of a programmable price select board.
Figure 1D:
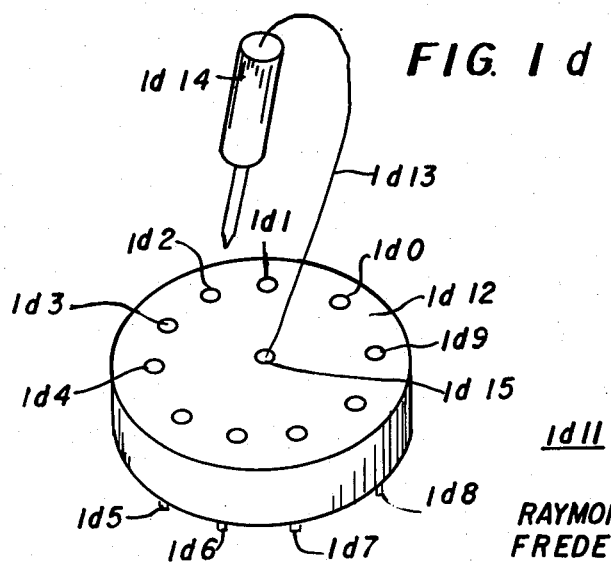
FIG. 1d is an enlarged isometric view of a programmable price select device of the board shown in FIG. 1c.
Figure 1E:
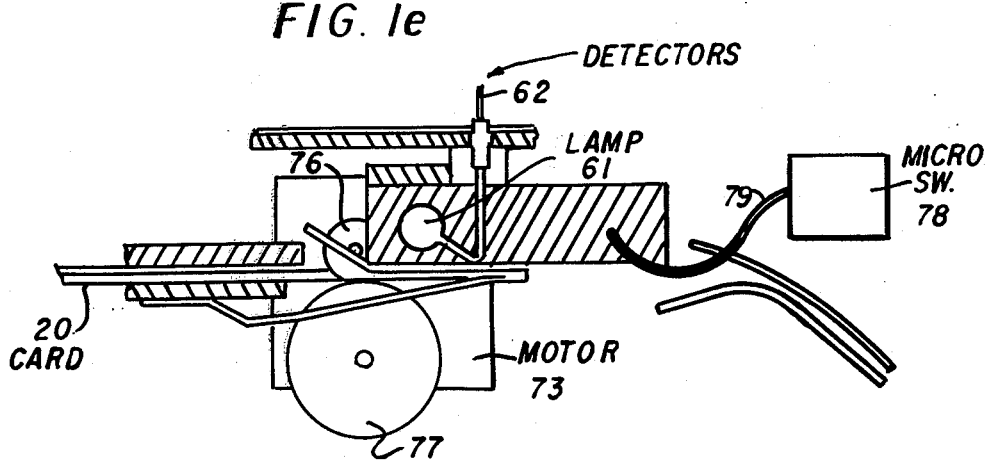
FIG. 1e is a partial sectional view of a portion of the transport, showing card scanning apparatus and card advance mechanism.

The marks are detected by optical scanning apparatus, shown in FIG. 1e which includes ten detectors, such as detector 62, and a lamp 61 or a plurality of lamps, one for each of the detectors 62-71. A level adjustment circuit 260, shown in FIG. 2, permits control of the amount of "slopover" detectable by the scanning apparatus. While the sales check is being advanced through the unit, only a small area near the center of each item quantity box is scanned until both a line mark and a mark in an item quantity box are detected at the same time, at which time advancement of the check will be halted and the area scanned increased.

Immediately to the right of the nine quantity boxes is an item identification and instruction column which is used to identify for the waitress the particular article which is to be priced on the menu. Again, in a restaurant, the identification would be for a food article. Further room is provided for additional information pertaining to the nature of the food which is to be provided, as for example, the condition of the cooking or added condiments which may be desired. The vertical columns which identify the quantity utilize only a small portion of the total area of the sales check available, and thus, the waitress is provided with a large amount of writing space for use in the designation of special information to the chef when the sales check is submitted to the kitchen.

The sales check further includes a column immediately to the right of the item identification column in which the quantity of items ordered for each line is printed by the pricing apparatus.

Immediately adjacent the quantity print-out column is a price column in which is printed an extended price, for each line, that is the total price for an indicated number of items for a given item line "purchased".

The price of the article represented by a line of the check is programmed into the system so that the user of the sales check has no further function than to mark the quantity desired.

At the bottom of the sales check and to the right in the conventional manner of sales checks used in restaurants, lines L54, L55, L56 and L58 provide, in succession, a print out area for the subtotal for the price extensions in the right-hand vertical column, the tax based on the amount appearing in the subtotal, a total bill which includes the subtotal and a tax, and a receipt portion which is in effect a further print-out of the total appearing on line L56. The receipt portion of the sales check may be perforated so that the receipt may be easily separated from the sales check.

The area of the card adjacent lines zero to two which is not used for item identification in the present example can be used to permit control functions, such as a system reset or information readout to be effected.

TRANSPORT

The mechanical aspects of the order pricing system including a transport for advancing the sales check through the unit past the scanning and print-out apparatus are set forth in detail in a copending U.S. application Ser. No. 14,608, now U.S. Pat. No. 3,718,244, which was filed Feb. 26, 1970, by Raymond J. Bukowski, Raymond L. Brija and Florian F. Yanikoski and was assigned to the assignee of the present invention.

The unit 40 shown in FIG. 1b comprises a sales check entry slot 41 which is located in the front face of the housing 42 and into which the sales check 20 (FIG. 1a) is fed by the waitress. A sales check return slot 43 is provided to return the sales check to the waitress with the printed information and total pricing of the items ordered.

The unit further provides an error indicator light 46 located on the front panel of the computer which indicates inadvertent errors by the waitress, as, for example, the marking of two different quantities in the same line. A power switch 47 provided on the unit, is normally turned on and left on during the period the restaurant is open.

The upper portion 44 of the unit houses a programmable price board 50 shown in FIG. 1c which stores price data relating to the unit price for each item represented by the item line of the sales check 20. In one embodiment, each item line is priceable in dollars, dimes and cents to a maximum price of $9.99.

Figure 11:
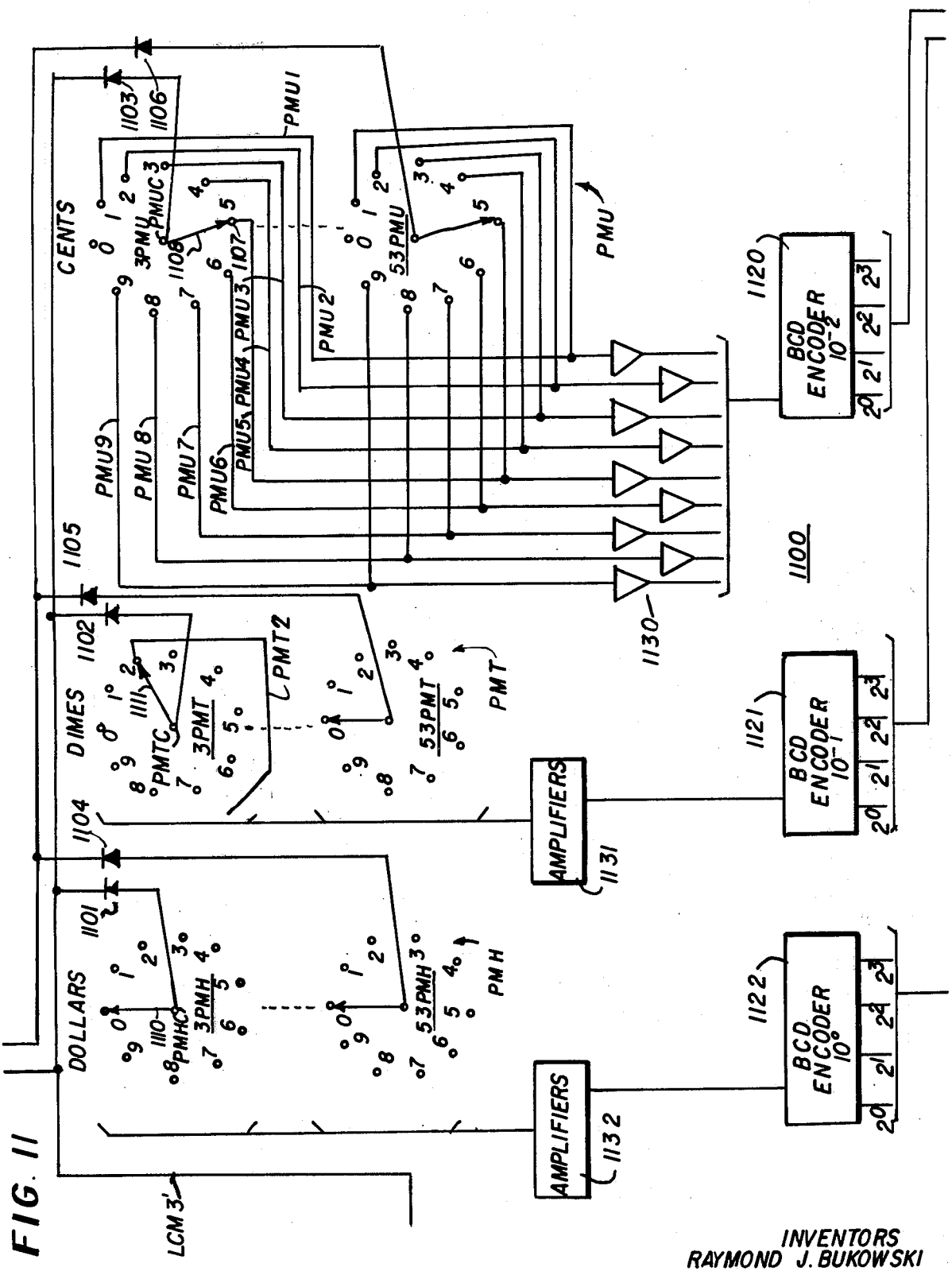

The programmable panel 50 which is pluggably inserted into the unit via an edge connector 51 is basically comprised of three groups of programming devices, such as device 1d11 shown in FIG. 1d, providing dollar, dime and cent price information for each item line. In the present example, each of the three groups comprises a three by seventeen arrangement of fifty-one pricing devices 1CH3–1CH53, 1CT3–1CT53 and 1CU3-1-CU53. Each device such as device 1d11, shown in FIG. 1d, includes a socket 1d12 having ten jacks 1d0–1d9 which represent the digits 0–9, and a lead 1d13 including a pin-plug 1d14 for providing a changeable connection between the common terminal 1d15 and the ten jacks 1d0–1d9. The connections to the circuits of the pricing apparatus are shown in FIG. 11 and will be described in the detailed description which follows.

Three price programming devices such as devices 1CH3, ICT3, and ICU3 of the price select board 50, FIG. 1c, are associated with each item line such as line L3 of the sales check. The corresponding pin plugs 1CHP, 1CTP, 1CUP are inserted into the jacks which correspond to the digits required to provide the desired price for the item line. Thus, for example, to assign a price of twenty-five cents to the item on line L3 the pin plug 1CHP for the dollar device 1CH3 is plugged into jack 1J0; the pin plug 1CTP for the dimes device 1CT3 is plugged into jack 1J2 and the pin plug 1CUP for the cents device 1CU3 into jack 1J5. In this example, the price programming devices 1CT3 and 1CU3 provides circuit paths from the input of the price matrix to the output of the price matrix over the second and fifth leads of the dimes and cents price programming circuits, as will be shown.

The programmable price board 50 located in the upper portion 44 of the unit is accessible to the owner of the business or whoever has access to the key-lock 48 on the unit, and the prices for any of the articles can be changed by the owner at any time without the need of calling in outside help to reprogram the price select board 50. The actual programming takes only seconds for each article and is accomplished by merely removing the appropriate pin plug of any device from the jack into which it had been plugged and re-inserting it into a different jack to provide a different price. Moreover, through the use of pluggable price board, such as board 50, the entire set of programmed prices can be changed by removing board 59 and inserting a different price board. In this way, the restaurant owner may easily provide two sets of prices, one for day sales and the other for evening sales.

Referring to FIG. 1e, there is shown schematically scanning apparatus including a lamp 61 (or ten lamps) and ten light detectors 62–71, such as detector 62, positioned adjacent the data portion of the sales check 20 for detecting the line marks, such as line mark LI3, and item quantity marks, such as the mark in the third box in line L3, which may be provided in one of the nine boxes in each item line of the sales check. Also shown in this view is sales check advancing apparatus including a microswitch 78 with an operating arm 79 moved by the top edge of the sales check 20 to operate the switch 78 to energize the system, and a motor 73 for turning advance wheels 76 and 77 to move the sales check through the unit.

GENERAL SYSTEM OPERATION

As the sales check is inserted into the sales check entry slot 41 (FIG. 1b) microswitch 78 is operated energizing the system, turning on the scan lamp 61 (or lamps) and starting the sales check advance motor 73 which rotates advance wheels 76 and 77 to move the sales check 20 into the unit past the ten light sensors 62–71, which may be, for instance photosensitive transistors. As the check moves past the scanning devices, signal outputs are provided for each line of information on the check, that is, a signal output from a scan device, such as device 62, positioned over the column of line marks LII-LI59 indicates the detection of a line mark, and a signal output from one of the nine quantity column scanning device detectors 63–71 positioned over item quantity boxes labelled 1–9, respectively, (FIG. 1a) indicates the presence of a quantity mark at the particular line.

Referring to FIG. 1, each line mark output from the line scanning apparatus 101 steps a line counter 103 which comprises a units counter 103a and a decade counter 103b for providing counts from 0 to 59, referencing the position of the sales check within the unit, by indicating how many lines has been counted.

The outputs of the units and decades counters 103a and 103b of the line counter 103 are combined in a line count matrix 104 which provides an output signal for each of the sixty counts of the line counter 103. The outputs of the line count matrix associated with one of the item lines L3–L53 of the sales check 20 are routed to a programmable diode price select board 106 which provides a signal path for the outputs of the line matrix for each of the line matrix outputs. The signal path is related to the price of the item represented by a line and the price is programmed in the price array 106 by the plug and socket arrangement described in the foregoing.

The item quantity scanning circuit 102 including devices 63–71, provides no output in the absence of a marking in one of the item quantity boxes 1–9 of an item line, a single output which indicates the quantity marked, or (in the event of an inadvertent error by a waitress) multiple output signals, if more than one quantity is marked on one line. In the event that multiple signals appear at the output of the scanning apparatus 102, an error circuit 107 will light the error lamp 46 located on the unit (FIG. 1b) to indicate the check is in error, and a correction will be required.

The outputs of the item scanning devices 102 are also fed to an item quantity counting circuit 108 where these outputs are compared with outputs of a second digital counter 108a to provide an indication of the quantity of items marked on the sales check.

In the present example, the third box in line L3 has been marked on to indicate that three of the items represented by line L3 of the sales check have been ordered. The item which is identifiable by the third line of the sales check 20 has been priced at 25 cents, and the associated price programming devices 1CH3, 1CT3, and 1CU3 shown in FIG. 1c, of the price matrix 106 have been connected to represent a price of 25 cents for line three.

The sales check advances to line L3 while the line counter steps from count zero to count three, whereupon detection of the line mark LI3 together with the detection of the mark in the item quantity box of line L3 by the scanning device 65 positioned over the third item quantity box in line L3 will cause the scanning device to provide a signal output.

When a single quantity mark, such as the mark in box 3 of line L3 and a line mark such as line mark LI3, are detected simultaneously, a start-stop circuit 109 is energized causing the clutch to be deenergized and the brake to be energized so that advancement of the sales check is halted temporarily. Energization of the start-stop circuit 109 also enables system control circuits 110 which include a main program timing pulse generator 110a, a sub-program timing pulse generator 110b, and decade logic circuits 110c for generating timing pulses which are used to synchronize the operation of the system logic. In general, NAND and NOR type logic is used throughout the system. The digital counters, logic gates and flip-flops, etc., which comprise the system logic are commercially available types.

The line count matrix outputs are passed through the diode price select board 106 to a decimal to binary encoder circuit 105 whereby the outputs are encoded in binary form on three groups 105a–105c of four output leads of the coding circuit to represent the price of the item in dollars, dimes and cents. The binary coded prices will be present at the output of the binary to decimal encoder during that period for which advancement of the sales check is inhibited. The check will remain in this position until the appropriate calculations have been completed for the third line of the sales check and printout has been completed. At the end of the printing cycle, the start circuit will cause the brake to be released and the clutch engaged so that the motor will again continue advancing the sales check through the unit. The sales check will be advanced until an item line and a quantity mark are detected on another item line.

PRICE CALCULATION

The output of the price select board 106 is extended to price data transfer 115 circuits which include five sections 115a–115e, for effecting transfer of the information from the price array 106 to the sub-accumulator 117, the transfer of such information being effected simultaneously over three sections 115a–115c of the data transfer circuits, respectively, in serial pulse form. Sections 115a–115c transfer data representing price information for the cents, dimes and dollars of the price matrix. In the present example of a unit price of twenty-five cents, no pulses are transmitted over circuits 115c; two pulses are transferred over circuit 115b and five pulses are transferred over circuits 115a to the sub-accumulator 117. Such transfer is effected for the data marked on line L3 three times because three such items have been ordered as indicated by the mark in the third box of item line L3 on the sales check. The successive transfer operations are controlled by the program counters 110 as will be shown.

DATA TRANSFER

As the price information, twenty-five cents, appearing in binary form on the three sets of output leads 105a–105c of the coding circuit 105 is fed three times into the sub-accumulator 117 by way of the data transfer circuits 115a–115c the extended or total price for the items ordered seventy-five cents will be automatically accumulated in the sub-accumulator 117, and as the third entry of such information is made to the sub-accumulator, a decimal counter 108a in the quantity mark counting circuit 108, which is stepped each time in information is thus transferred from the diode price array 106 to the sub-accumulator 117, will reach a count of three and, in a coincidence circuit 108b, coincidence will occur between an output signal from the item scan circuits 102 and the output of the decimal counter 108a, indicating three additions of the price assigned to such an article has taken place in the sub-accumulator. Then, a signal generated by the counting circuit 108 will inhibit further transfer of the information from the price array 106 to the sub-accumulator 117.

After the extended price has been calculated for the item of line L3, the extended price is transferred through the data transfer circuits 115a–115c to a main accumulator 118 where the extended price totals for all of the items of item lines L3–L53 of the sales check 20 will eventually be accumulated during the scanning of the item line.

PRINT OUT

After each item line calculation is completed, the extended price, stored in the sub-accumulator 117 is also transferred via the data transfer circuits 115 to print control circuits 120 to control print apparatus 121 to print the extended price for each line in the printout area of the sales check.

At the same time, the quantity counter circuit 108a effects the printing of the quantity of the items ordered, in the example, three items for line L3, in the quantity item printout column of the sales check.

Figure 1F:
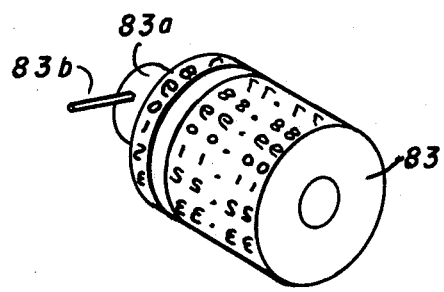
FIG. 1f is an isometric view of a print cylinder used in the printout of price information on the data card.

The printing apparatus 121, shown in FIG. 1f, includes a cylinder 83 having five columns of digits 0–9, four digit columns for printing the prices of the items and a fifth digit column for printing quantities of the item.

The cylinder 83 is rotated on its shaft 83a by way of a stepping motor (not shown) to rotate through ten successive steps to cause the digits 0-9 to be successively positioned over the printout area of the sales check. The shaft 83a includes a magnetic member 83b which rotates with the shaft. When the zero digits of the print cylinder 83 are positioned over the printout area of the sales check, the magnetic member 83b is aligned with a detector or pickup which provides an output signal (to a circuit 2051, FIG. 20), for enabling the print control circuits 120 to print zeros. The printing cylinder 83 is rotated to bring the digits 0-9 successively into alignment with the printout area of the sales card. The printout is done in ten steps with all the zeros printed in the first step. Then, during the second step, all the ones are printed, and as the print wheel print cylinder 83 is rotated through a complete revolution the other digits are printed.

In the example, in which the number seventy-five is to be printed in the price column and the number three is to be printed in the extension column, the number three will be printed in the quantity extension column of line L3 when the threes on the printhead are aligned with the printout area of the card; the number five will be printed in the units price column when print wheel has been rotated to align the fives with the printout area of the card; and the number seven will be printed in the tens column when the sevens are aligned with the printout area of the card.

When the printout of the price and quantity information for line L3 is completed, the sales check is advanced and item lines L4–L53 are scanned. Each time a mark is detected in one of the item quantity columns, a calculation is made to obtain the price extension and the quantity for that line and printed out in the manner described above for line L3. During the scan of lines L4–L53, the extended prices for lines L3–L53 will be accumulated in the main accumulator 118. In the present example, it is assumed there are no further item quantity marks on the sales check.

SUBTOTAL

The sales check is advanced until the fifty-fourth line mark LI54 is detected by line scanning circuit 101.

At this time, the total of all the extended prices for the item lines L3–L53 has been accumulated in the main accumulator. This subtotal will be printed on the fifty-fourth line L54 of the sales slip 20.

Upon detection of the fifty-fourth line mark, the contents of the main accumulator 118, seventy-five cents in this example, will be transferred to the print control circuitry 120. The information in the main accumulator 118 will be printed out, a digit at a time, in the space provided in the right-hand margin on line L54 of the sales check which is labelled sub-total. The printing operation is similar to that for printing the extended prices for line L3 described in the foregoing.

COMPUTATION OF SALES TAX

After the sub-total has been printed on line L54, the sales check is advanced until the fifty-fifth line mark is adjacent the line scanning apparatus 101 and the line mark LI55 is detected.

When line mark LI55 is detected, a sales tax, based on the sub-total present in the main accumulator 118, will be computed. The sales tax is computed in a manner similar to that of calculating extended prices for each line of the item lines as described. The data transfer circuits 115 are used in the calculation of the tax; however, in accordance with the functioning of a program for calculating a sales tax for the order under the control of the program counters 110, the decimal point will be shifted the appropriate number of places to the left whereby the tax can be added directly to the subtotal stored in the main accumulator.

Programmable tax magnitude indicators 108c provided in the item quantity counter circuit 108 are set to predetermined values to represent the whole number and a fraction thereof of the percent sales tax, and are then operative to cause the dollar value of the subtotal of the check to be successively transferred by way of the data transfer circuits 115 from the main accumulator 118 to the sub-accumulator 117 a number of times equal to the magnitude of the tax programmed on the tax indicators 108b. Data transfer circuits 115a–115e are used for the tax computation.

For example, when the tax rate is one percent, the price data, seventy-five cents stored in the main accumulator 118 is transferred from the main accumulator via the transfer circuits to the sub-accumulator once. If on the other hand, the tax rate were five percent, the price data would be transferred five times in succession. In the example described, the tax rate is assumed to be one percent. After the transfer of price data has been completed once in correspondance with the indicated tax rate, the counter circuit will inhibit further transfer of data. The tax figure will be 0.75.

The program logic counter circuits 110 are then operative to generate signals for enabling circuits to process the tax figure 0.75 to round off the number. Since the digit being transferred through the tens digit data transfer circuit 115b is greater than five a carry is made to the next higher digit the hundreds digit. The resulting tax number is 1.75. This tax figure 1.75 is accumulated in the sub-accumulator and is transferred through the transfer circuits 115 to the main accumulator 118. During this transfer, the decimal point is shifted two places to the left so that the digit one in the hundreds transfer circuit 115c is transferred to the cents portion of the main accumulator and the seven and five are shifted out of the transfer circuits 115. Thus, the tax, one cent, is scaled down to the percent total and the resultant figure is transferred over the transfer circuits and can be added to the sub-total seventy-five cents, stored in the main accumulator. The tax quantity one cent stored in the sub-accumulator is also transferred to the print control circuits 120 to effect printout of the tax calculated on line L55 of the sales check.

The foregoing description assumes that only a whole tax digit, such as 1%, was entered into the system. In the event that the tax rate includes a fractional tax, i.e., 1.3%, for example, the system will be enabled to make a further calculation for the 0.3% tax in a manner similar to that described for the calculation of a whole percent tax. After the whole percent tax, data 0.750 for a one percent tax rate has been accumulated in the sub-accumulator, the price total, seventy-five cents stored in the main accumulator 118 is passed through the data transfer circuits 115 to the sub-accumulator 117 in three additional successive operations and during the data transfer, the decimal point will be shifted in a manner appropriate to represent the fractional value of the tax being computed so that a resulting fractional tax figure 0.075 is provided with each transfer and is added to the quantity stored in the sub-accumulator. Tax data, 0.975 representing the total tax on the order is thus accumulated in the sub-accumulator and then transferred via the data transfer circuits 115, to the main accumulator 118 where the tax is added to the sub-total. It is pointed out that the tax data is rounded off to one cent prior to transfer to the main accumulator.

GRAND TOTAL

After the tax has been printed out in the appropriate column on the sales check, the check is advanced one more line increment and when line mark LI56 is detected, the total seventy-six cents stored in the main accumulator 118 is transferred via the transfer circuits 115a–115d to the print control circuits 120 in the manner heretofore described, to effect the printout on line L56 of the sales check of the grand total, including the sub-total and tax.

RECEIPT

The check is then advanced two more lines and when line mark LI58 is detected, the price data stored in the main accumulator 118 is again fed through data transfer circuits 115a–115d to the print control circuits 120 for printout of the total on the customer receipt portion of the sales check 20.

INVENTORY CONTROL APPARATUS

The system includes inventory counters 130 controlled by inventory control circuits 131 to record the number of items which have been ordered as detected by the item scan apparatus 102. One counter is provided for item line of the sales check and the counter is stepped a number of times corresponding to the item quantity detected as indicated by the coincidence circuit 108b.

SYSTEM PROGRAMS

The sequence of operations for scanning and pricing a sales check and for printing out price and quantity information on the check is synchronized by timing pulses generated by a system program counter and decade logic circuits 110. The program counters and decade logic generate forty time slots or times identifiable as T0–T39 in the present embodiment, and sixteen sub-time slots or times of T0–T39 identifiable as ST0–ST15. The sub-time slots permit sequential performance of individual operations within each of the main time slots T0–T39.

The various steps in the operational sequence associated with the pricing of a sales check are divided into five programs listed in Table I, namely, an item line count program, a sub-total program, a tax program, a grand total program, and a customer receipt program. Table I lists the five programs, the time periods used by each program, and the functions carried out during the time periods of each program.

Each of these programs may be described as basically consisting of a total set of time slots T0–T39 of which T0 is used to start the program, T1–T9 and T11–T19 are used for calculation and T30–T39 are used for printing data on the sales check. The scanning operations take place during time T0.

Since calculations are not made during each program, for example, in the subtotal program wherein the contents of the main accumulator are printed out on the check, the program logic circuits include decade logic circuits, for the tens, twenties and thirties, decades of the program count, which are settable to "jump" the program, for example, from T0 to T30 skipping time slots T1–T29 and "jumping" from the program start cycle to the printout cycle.

During T0 of the item line count program, the sales check will be advanced through the unit, and line marks and quantity columns will be scanned. Upon simultaneous detection of a line mark and a mark in a quantity column, the item line count program will be initiated and the program will step to T1 and during time slots T1 through T9 the total price for the quantity of items indicated will be calculated. Also, during times T1–T9, the position of the quantity mark on the sales check will be determined by the item quantity scan circuits thereby providing an indication of the number of items which have been ordered for each line.

The total price of the items for each line such as line L3 will be calculated in the manner described above, with the price data twenty-five cents for line L3 being transferred to the sub-accumulator during times T1–T3 a number of times three in the present example, equal to the quantity of items marked. Thus, at the end of time slot T3, the extended price for each item will have been calculated and will appear in the sub-accumulator. At time T10, the data seventy-five cents in the sub-accumulator is transferred to the main accumulator and the program jumps to T30. During time T30, the data is transferred to the print control circuits 120 and 121 from the sub-accumulator and all the zeros will be printed on the sales check. During times T31 to T39, digits 1–9 will be printed on the sales check. Thus, at time T33, the quantity three will be printed, and at times T35 and T37 the extended price seventy-five cents will be printed. At T39, the program will step to T0 and the scan will be continued until lines Li–L53 have been scanned. After line L53 has been scanned, the program will step T0 of the sub-total program, when line mark L1 54 is detected.

At time T0 of the sub-total program, the fifty-fourth mark is detected, starting the sub-total program sequence. Since the sub-total program requires no calculations, the program is jumped to time T30 at the end of T0 and the digits 0–9 of the sub-total are printed out during times T30–T39. The sub-total information is brought forward from the main accumulator during time T30 to the print control circuits 120.

The program then steps to T0 of the tax program sequence, at which time the tax program is initiated. During times T1–T9 of the tax program the whole percent magnitude tax is calculated. During times T11–T19, the fractional percent tax on the subtotal is calculated. At time T20, the tax is rounded off at the unit figure, and during time T21 the decimal point for the tax is shifted two places to the left to scale the tax so it can be added to the total price stored in the main accumulator. The digits of the tax are printed on line L55 of the sales check during times T30–T39.

The grand total program is started after time T39 of the tax program, and at T0, when the grand total program is started, the program is jumped to T30 at which time the printout of the contents of the main accumulator on line L56 of the sales check, is effected.

The receipt program is started after T39 of the grand total program and provides a customer receipt for the total bill. The program uses time slots T0 and T30–T39 to transfer the grand total from the main accumulator to the print control circuitry and to printout the digits on the sales check on line L58.

The functioning of these programs in controlling the electronic order pricing system in the pricing of a sales check will be described in more detail in the following description.

TABLE I

| Programs | Time Period | Function |
|---|---|---|
| Item Line Count Program Sequence | T0 | Scan cycle Program Start |
| | T1–T9 | Calculation(price extension and quantity) |
| | T10 | Data transfer |
| | T30–T39 | Print out (quantity and extended price) |
| Sub-total Program Sequence | T0 | Program start |
| | T30–T39 | Print out (total of extended prices) |
| Tax Program Sequence | T0 | Program Start |
| | T1–T9 | Calculation (whole % tax) |
| | T11–T19 | Calculation (fractional % tax) |
| | T20 | Tax round-off |
| | T21 | Tax decimal point shift |
| | T30–T39 | Print out (total tax) |
| Grand Total Program Sequence | T0 | Program Start |
| | T30–T39 | Print out (subtotal plus tax) |
| Receipt Program Sequence | T0 | Program Start |
| | T30–T39 | Print out (grand total) |

SPECIFIC DESCRIPTION

As now set forth hereat, the manner in which the novel pricing control apparatus applied, by way of example in a restaurant for pricing orders entered on sales slips, is operative to scan a sales check 20, shown in FIG. 1a, provide the print out of the quantity and price extensions for each of the items which have been marked on the sales check, and to provide the subtotal, tax, grand total and receipt print out on the sales check, will now be described.

For purposes of illustration, the third box in the third row L3 of the sales check 20, FIG. 1a, is marked to indicate that a customer has ordered three of the items represented by the third line L3 of the sales check. The programmable diode price select board 1100 has been programmed, as shown in FIG. 11, so that the unit price of the item represented by line L3 is twenty-five cents.

Upon detecting the line mark LI3 on the sales check 20, the pricing control apparatus will extend the total price of the item by adding the twenty-five cent unit price three times and, after effecting such calculation, will cause the quantity three to be printed out in the quantity column of the check, and will cause the total price for three such items, seventy-five cents, to be printed in the price column of the third line. No other item quantity marks have been made on the sales check, and thus, the line scan apparatus 200, shown in FIG. 2, will continue to scan until line mark LI54 is detected at which time the subtotal, seventy-five cents, will be printed on the sales check.

Then, when line mark LI55 is detected, the apparatus will calculate the tax on the item based on the subtotal, and assuming the rate is 1%, the tax will be rounded off to one cent and will be added to the subtotal providing a grand total seventy-six cents for the check. The grand total is printed on line L56 and also on the receipt line L58 of the sales check.

POWER CIRCUIT

Referring to the FIGS. 2–20 of the drawings, assembled as shown in FIG. 21, there is shown a schematic representation of the control circuits for a described embodiment of an electronic order pricing system of the present invention. In general, NAND and NOR logic is used in the system. Moreover, in order to simplify certain of the drawings, some of the circuits are shown in FIGS. 2 through 20 in block form and the circuits, such as circuits A-1, B-1 etc. correspond to the circuits shown in FIGS. 22a–22a.

Figure 5:
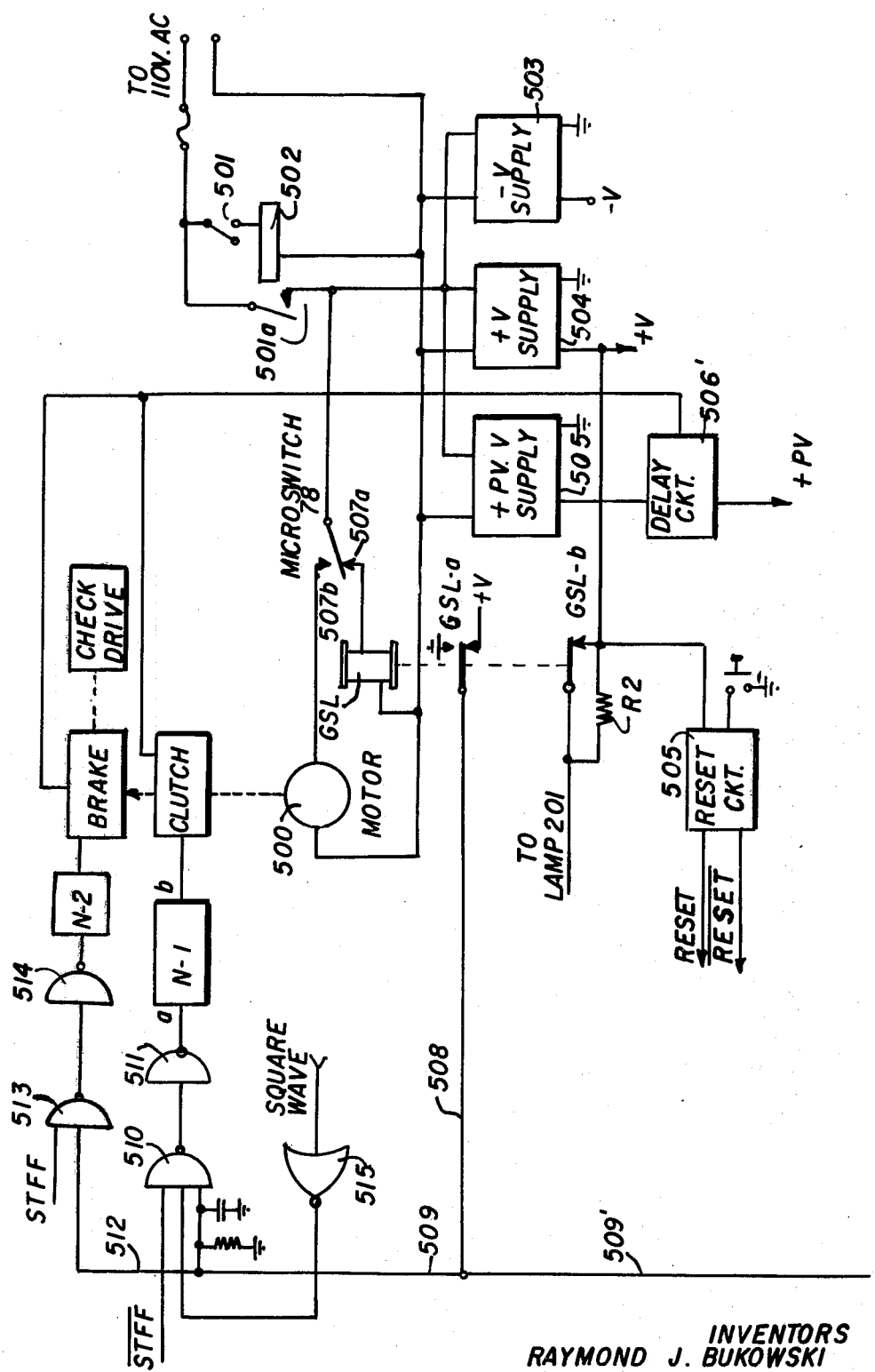

Referring first to FIG. 5, when the power switch 501 is turned on, a power relay 502 is operated closing a path over contact 501a from the line voltage to power supplies 503, 504 and 505 which provide positive and negative voltages V and −V which may be five volts for the logic circuits of the system and a larger voltage PV, which may be 28 volts, used for energizing the brake and clutch of the motor and relays and solenoids of the system. The connection of the voltage PV to the system is delayed by a delay circuit 506 to allow the logic circuits to stabilize and reset after the application of the system logic voltages, plus and minus V, to the system.

Also, when the power switch 501 is turned on, relay GSL, connected between ground and +V through contacts 507a of a microswitch 78 (FIG. 1e) is operated and a ground is applied to lead 508 over a contact GSL-a of relay GSL.

The ground on lead 508 is extended over lead 509 to a logic gate 510 which is then disabled. The output of gate 510 is connected through inverter 511 to clutch-drive circuit N-1 (FIG. 22n), disabling the clutch. The ground on lead 509 is also extended over lead 512 to gates 513 and 514 to the brake drive circuit N-2 (which sets the brake).

The ground on lead 508 is further extended via lead 509' to a delay circuit 801 (FIG. 8) enabling gate 802 and disabling gate 803, providing plus V or a logic 1 level on lead CTR. Lead CTR is connected to the reset input CPU of the units line counter 901 (FIG. 9) which is thus reset, and also over lead 904 to the reset input CPD of the decade line counter 902 which also resets. Wave shaping circuits (not shown) may be interposed between the line mark detect circuit and the inputs CPU sand CPD of the counters 901–902. At this point, the circuits of the system are in the quiescent state and the pricing coumputer apparatus is ready to scan the check further and to provide the pricing operation.

To price an order entered on a sales check, the check is inserted into a sales check entry slot 41 (FIG. 1b) operating the microswitch 78, opening a contact 507a which disables the GSL relay. This operation also closes a contact 507b applying power to the motor. The motor rotates the advance wheels 76 and 77 (FIG. 1e) which advances the sales check 20 through the unit. When relay GSL is disabled, contact GSL-a is opened and ground is removed from lead 508. Consequently, gate 510 is enabled and the output of gate 510 is able to follow the square wave applied to gate 510 through gate 515, and the clutch drive circuit N-1 is enabled by gate 510, energizing the clutch at the rate of the square wave.

At the same time, the brake is released as gate 513 is disabled.

SCANNING APPARATUS

As the sales check is inserted into the sales check entry slot 41, the transport mechanism is operative to advance the check to bring the successive lines of the check into the read-out position relative to the optical scanning apparatus of the system.

Figure 2:
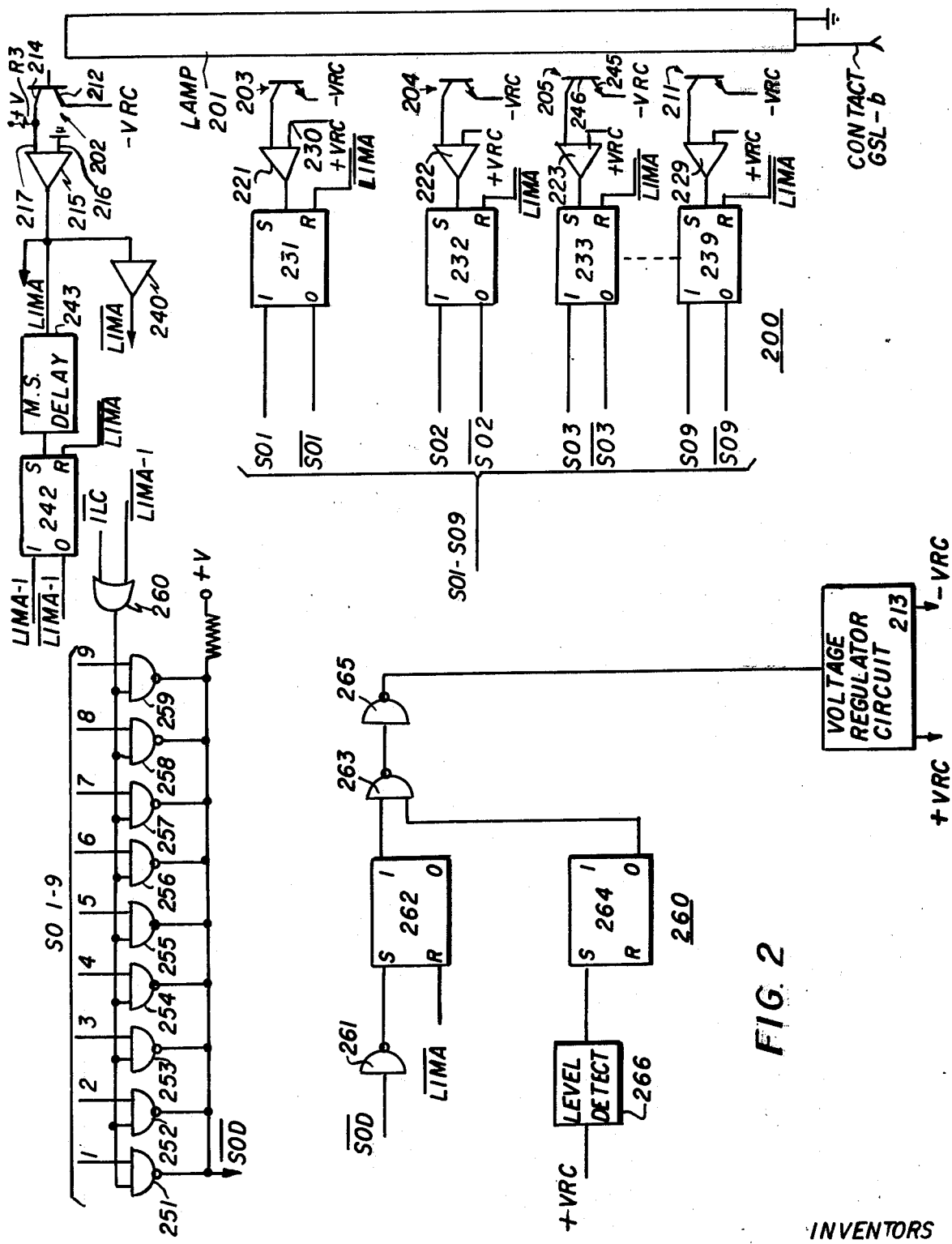

Referring to FIG. 2, the scanning apparatus includes a lamp (or ten lamps) 210 and ten light sensors 202-211, which may be, for example, photosensitive transistors.

The lamp 201 is positioned to illuminate the area of the sales check that includes the line marks and the quantity mark columns (see FIG. 1a). The photo-sensitive surfaces of the transistors 202-211 are positioned at an angle to the surface of the sales check such that light reflected from clear or unmarked areas of the check will be directed toward the light sensing devices 202-211.

The lamp 201 is connected between ground and voltage V through a resistor R2, and power is applied to the lamp filament when the power switch 501 is turned on. When the microswitch 78 is operated, upon the insertion of a sales check, and the GSL relay is disabled, contacts GSL-b is closed, shorting out the resistor R2 and connecting the filament of the lamp 201 directly to the power supply V whereby the lamp 201 is turned on full.

One of the photo-sensitive transistors 202 is positioned to detect light reflected from the area adjacent the line marks LI0-LI59, and the other nine photo-sensitive transistors 203-211 are positioned to each detect light reflected from the area including one of the nine quantity boxes.

Each transistor 202-211, such as transistor 202, has its emitter 212 connected to an output −VRC of a voltage regulator circuit 213. The transistor has its collector 214 connected to an input 217 of a differential amplifier 215 and also to a plus V through a resistor R3. A second input 216 of the differential amplifier 215 is connected to ground.

Light reflected to the photo-sensitive surface of transistor 202 by an unmarked area of the sales check will turn the transistor on. When transistor 202 is turned on, the voltage −VRC on the emitter 212 will be applied to the input 217 of the differential amplifier 215. The voltage −VRC may be a few hundred millivolts and will be passed to the output of the amplifier 215 providing a signal which is approximately a logic zero. Accordingly, the signal output from the line mark detecting circuit, given the designation LIMA, will be a logic 0 in the absence of a line mark detected.

On the other hand, without illumination, the photo-sensitive transistor 202 remains cut off. Thus, marks on the check such as the line marks LI1-LI59 disposed along the edge of the sales check 20 will minimize light reflection to the photo-sensitive transistor 202, which will be turned off and the positive voltage V applied to the input 217 of the amplifier 215 through a resistor R2 will be passed to the amplifier output so that LIMA becomes a logic 1. Similarly, the nine photo-transistors 203-211 positioned over the item line quantity marking area are each individually connected to a differential amplifier 221-229. However, the second input of each of the amplifiers 221-229 such as input 230 of amplifier 221 is connected to a second output +VRC of the voltage regulator circuit 213.

The output of each differential amplifier 221-229, such as amplifier 221, is connected to a scan output detected flip-flop 231-239, such as flip-flop 231 which will be set each time an item quantity mark is detected. Accordingly, each time a quantity mark is detected a logic 1 will be present on the corresponding output lead S01-S09. In the absence of any mark on the sales check, the output on lead S01-S09 will be a logic 0. The scan output detected flip-flop 231-239 will be reset by a signal $\overline{\text{LIMA}}$ which will become a logic 1 as the sales check is advanced from one line mark to the next.

Upon detection of the first line mark LI1, the output +V from the photo-transistor 202 is fed to the differential amplifier 215 and the output LIMA of the differential amplifier 215 becomes a logic 1.

The output LIMA of line mark detector amplifier 215 is inverted by amplifier 240 to provide a control signal $\overline{\text{LIMA}}$.

The output LIMA of amplifier 215 is further extended to a line mark detected delay flip-flop 242 through a 200 millisecond delay circuit 243. Since the output of flip-flop 242 is actually the control signal LIMA delayed 200 ms, the output has been given the designation LIMA-1. The complementary output of the flip-flop 242 is designated $\overline{\text{LIMA 1}}$.

Signal LIMA is used to enable line counters 901 and 902 (FIG. 9) and a line count matrix 800 (FIG. 8) to access a programmable price array 1100 (FIG. 11) to provide signals at the output of the price array which are representative of the unit price of the item on the sales check item line being scanned. Signal LIMA-1 is used to enable the system timing and control circuits at a time after the price data signals and are provided at the output of the price array.

The outputs LIMA and LIMA-1 will become true each time a line mark is detected. Signal LIMA will remain true as long as a line mark is detected and will become logic 0 as the sales check is advanced past a detected line mark. When LIMA becomes logic zero the flip-flop 242 is reset by the signal $\overline{\text{LIMA}}$.

LINE COUNTERS

The output LIMA of the line mark scan amplifier 215 is extended through delay circuit 801 and path 804 to a units line mark counter 901 (FIG. 9) which provides counts from 0 to 9 on leads LCU0-LCU9 and to a line decade counter 902 which provides on leads LCD0-LCD5 counts from 0 to 5 for indicating decades up to fifty.

The units line counter 901 is stepped each time a line mark is detected when LIMA becomes logic 1 and clocks the counter at input CPU.

Each time the units counter 901 provides an output on lead LCU9, the decade line counter 902 receives a clock pulse at CPD when the next line mark is detected at which time LIMA will enable gates 905 and 906. At that time, the units line counter 901 will step to zero. Accordingly, the position of the sales check within the unit, that is, the particular line of the check that is positioned under the scan apparatus is indicated by the output of the units and decade line counters 901 and 902.

LINE COUNT MATRIX

Figure 8:
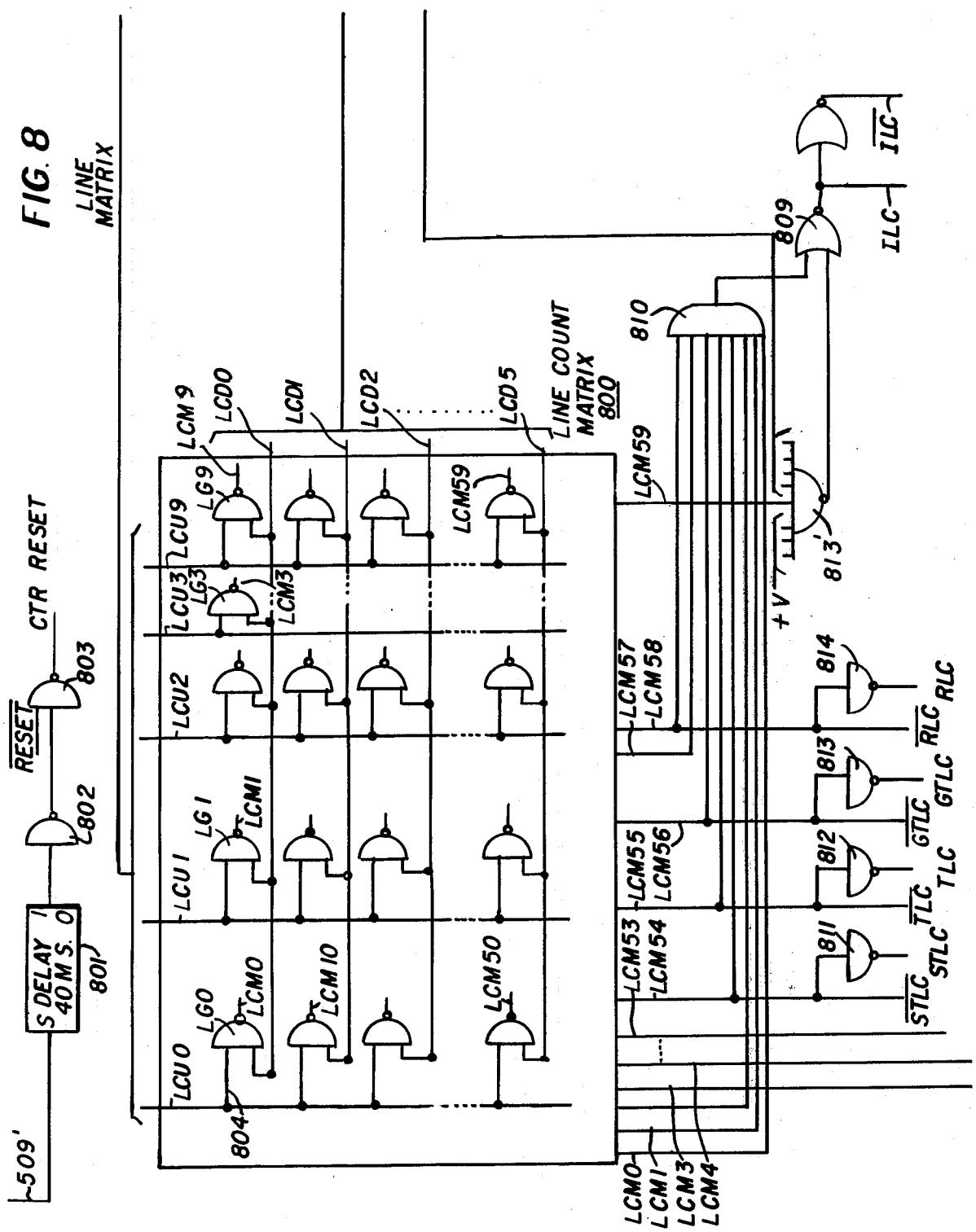

With each LIMA input, the line counter advances one count and a pulse output over line counter output leads LCU0-9 or LCD0-9 such as lead LCU0 of the units line counter is extended to an input of a six by ten line count matrix 800 (FIG. 8). The line count matrix 800 comprises a plurality of two-input NAND gates such as gate LG0, which combine the outputs of the line units and decades counters such as outputs LCU0 and LCD0 to provide sixty separate line mark outputs LCM0–ICM59 which represent the lines of the sales check.

One input of each gate, such as input 910, of gate LG0 in the ten columns is connected to one of the ten outputs LCU0–LCU9, such as output LCU0, of the line units counter 901, and the other input of each gate such as input 911 of gate LG0 in the six rows is connected to one of the outputs LCD0–LCD5, such as output LCD0 of the line decade counter 902. Accordingly, for each count provided by the line counters 901 and 902, one of the NAND gates will be enabled, providing a ground or logic 0 on one of the outputs LCM0–LCM59, such as output LCM0, of the line count matrix 800.

Thus, before a line mark is detected, the line decade counter 902 will have a logic 1 output on lead LCD0 which is extended to input 911 of gate LG0. The output of the units line counter 901 on lead LCU0 will also be logic 1. This output is extended to lead 804 of gate LG0 which will be energized providing a ground at its output LCM0. As the units counter steps from 0 to nine, successive outputs on leads LCU0–LCU9 will enable gates LG0 to LG9 to provide successive ground outputs on leads LCM0–LCM9. As successive line marks LI10–LI59 are detected, corresponding gates in rows 2-5 of the line count matrix will be enabled providing output on leads LCM10–LCM59.

Referring briefly to the sales check shown in FIG. 1a, lines 1 and 2 are not used as item lines. Line matrix outputs on conductors LCM0–LCM2 are extended through a gate 810 to inhibit a NOR gate 809 which when enabled generates a signal ILC a control signal used to indicate items lines L3–L53 are being scanned.

Similarly, outputs LCM54–LCM55, LCM56 and LCM58 are extended to gates 811–814 respectively which when enabled provide control signals STLC, TLC, GTLC, and RLC, which control the system to determine the sub-total, the tax and the grand total and to effect the print out of the data obtained. Line matrix outputs LCM54–LCM58 are also extended to gate 810 to inhibit NOR gate 809. Output LCM59 and the outputs LCD6–LCD9 of line decade counter 902 are extended to gate 813 which when enabled provides an inhibit for NOR gate 809.

As the sales check continues it is advanced into the unit to the first line mark LI1, the line mark LI1 is detected and the line counter is stepped to count one and the output LCU1 of the line counter 901 extended to the line count matrix 800 enables gate LG1, while gate LG0 is disabled, providing an output on line conductor LCM1. Similarly, when line mark L12, the units line counter steps to count two and gate LG2 is enabled when gate LG1 is disabled.

As the sales check is advanced to line 3, the line mark LI3 is detected and signal LIMA to the line units counter is stepped to a count of three, providing an output on LCU3 which enables gate LG3 providing a logic 0 on output LCM3 of the line count matrix 800.

Recalling that each of the lines L3 through L53 of the sales check represents a different item to be priced, outputs LCM3 to LCM53 of the line count matrix 800 are extended to a programmable diode price select matrix 1100 (FIG. 11) and while lines L3–L53 are being scanned, the NOR gate 809 is enabled providing output ILC, a control signal used throughout the system to indicate that lines L3–L53 are being scanned. It is pointed out that the output LCM3 for the first item line is extended over lead LCM3' to a gate 1001, the output of which is connected to circuits B-6 to B-9 at the reset inputs of the main accumulator 1000. When LCM 3 is a logic 0, the main accumulator will be reset.

PROGRAMMABLE DIODE PRICE SELECT BOARD

The programmable diode price select-matrix 1100, shown schematically in FIG. 11 basically comprises 153 diodes such as diodes 1101–1106 connected by way of the plug and socket arrangement shown in FIG. 1d from the outputs LCM3–LCM53 of the line count matrix to data transfer circuits 1600 (FIGS. 16–17) for establishing separate signal paths for each of the outputs line circuit matrix which provide a dollar, dime, and cent indication of the unit price of the item represented by that line.

The price select board includes three sections PMH, PMT, PMU representing dollar, dime and cent digits, respectively, and each section includes fifty-one programmable devices, such as 3PMH–53PMH, such that fifty-one separate prices are provided to assign a three-digit price to each of the fifty-one item lines L3–L53 of the sales check. The plug and socket devices 3PMH–53PMH, 3PMT–53PMT and 3PMU–53PMU for programming the price select-board to provide a predetermined price for each item line have been described in the foregoing with reference to device 1d11, shown in FIG. 1d.

Jacks 1–9 are connected to nine leads, such as leads PMU1–PMU9 of programming device 3PMU representing degits 1–9. A center terminal PMUC is connected to output lead LCM3 of the line count matrix 800 through a diode 1103. A pin plug 1107 attached to the center terminal PMUC by a lead 1108 is pluggable into one of the jacks to complete a path from the center terminal PMUC to an output lead PMU1–PMU9. The line output count matrix LCM3 also is connected to the common terminals PMTC, PMHC of devices 3PMT and 3PMH through diodes 1102 and 1101, respectively. Accordingly, diode 1101 connects the line count matrix LCM 3 to the dollar section PMH of the price select board 1100. Diode 1102 connects the line count matrix output LCM3 to the dime section PMT of the price select matrix, and a diode 1103 connects the line count matrix output LCM3 of the line count matrix to the cents section of the price select board.

The terminals 1–9 of the price programming devices of each of the sections PMH, PMT and PMU are multipled for the fifty-one programmable diode path selectors, such as 3PMU–53PMU. The 153 diodes, such as diodes 1101–1106, prevent sneak paths for signals over leads connected in multiple and having a common digit programmed. In the present example, it is assumed that the unit price for the item represented by line L3 is twenty-five cents. Thus, the price programming device 3PMH of the dollar section PMH, associated with line L3, has been set to 0 by plugging lead 1110 into the jack marked 0; the programming device 3PMT for the dime section PMT has been set to two by plugging lead 1111 into the jack marked 2; and the programming device 3PMU for the cents section PMU has been set to five by plugging lead 1108 into the jack marked 5.

Each of the other outputs LCM4–LCM53 of the line count matrix 800 are similarly assigned to a unit price by appropriate connections made in the programmable price select board 1100.

The signal output over conductor LCM3 from the line count matrix 800 is passed via diodes 1101–1103 and the programming devices 3PMH, 3PMT and 3PMU, connected to represent twenty-five cents, and over one of nine multipled conductors, such as PMU1–PMU9, to one of three decimal-to-binary encoders 1120–1122 for sections PMU, PMT and PMH respectively of the price select matrix 1100. The zero signal output of the dollar device 3PMH is not extended to the encoder 1122. The logic 0 signal on lead LCM3 is extended over conductor PMU5 from the cent price select section to PMU on input of decimal-to-binary encoder 1120. The signal on lead LCM3 is also extended over a lead PMT2 from the dime portion PMT of the matrix 1100 to decimal-to-binary encoder 1121.

The nine outputs of each of the three sections PMU, PMT, PMH of the price select matrix are extended to the decimal-to-binary encoders 1120–1122 through three groups 1130–1132 of nine amplifiers, such as shown for group 1130, which compensate for signal loss in the diodes such as diodes 1101–1106.

Each of the three decimal-to-binary encoders 1120–1122 has four outputs designated $2^0$, $2^1$, $2^2$ and $2^3$. In the present example, the outputs on the four leads of the binary encoder 1122 for the dollars section PMH are 0000; the outputs on the four leads of the encoder 1121 for dimes section PMT are 0100; and the outputs of the four leads of the encoder 1120 for the cents section PMU is 1010.

The binary coded outputs are present on the four outputs of encoder 1120–1121 during the period that the sales check is held in the read out position for the third line L3.

ITEM QUANTITY MARK DETECTION

When line mark LI3 is detected, the quantity mark in the third box on line L3 will also be detected. Referring to FIG. 2, the absence of light reflected toward transistor 205 will cause transistor 205 to turn off. When transistor 205 is turned off by the absence of reflected light amplifier 223 will provide a logic 1 level at its output and flip-flop 233 will be set providing a logic 1 level on lead S03.

Figure 12:
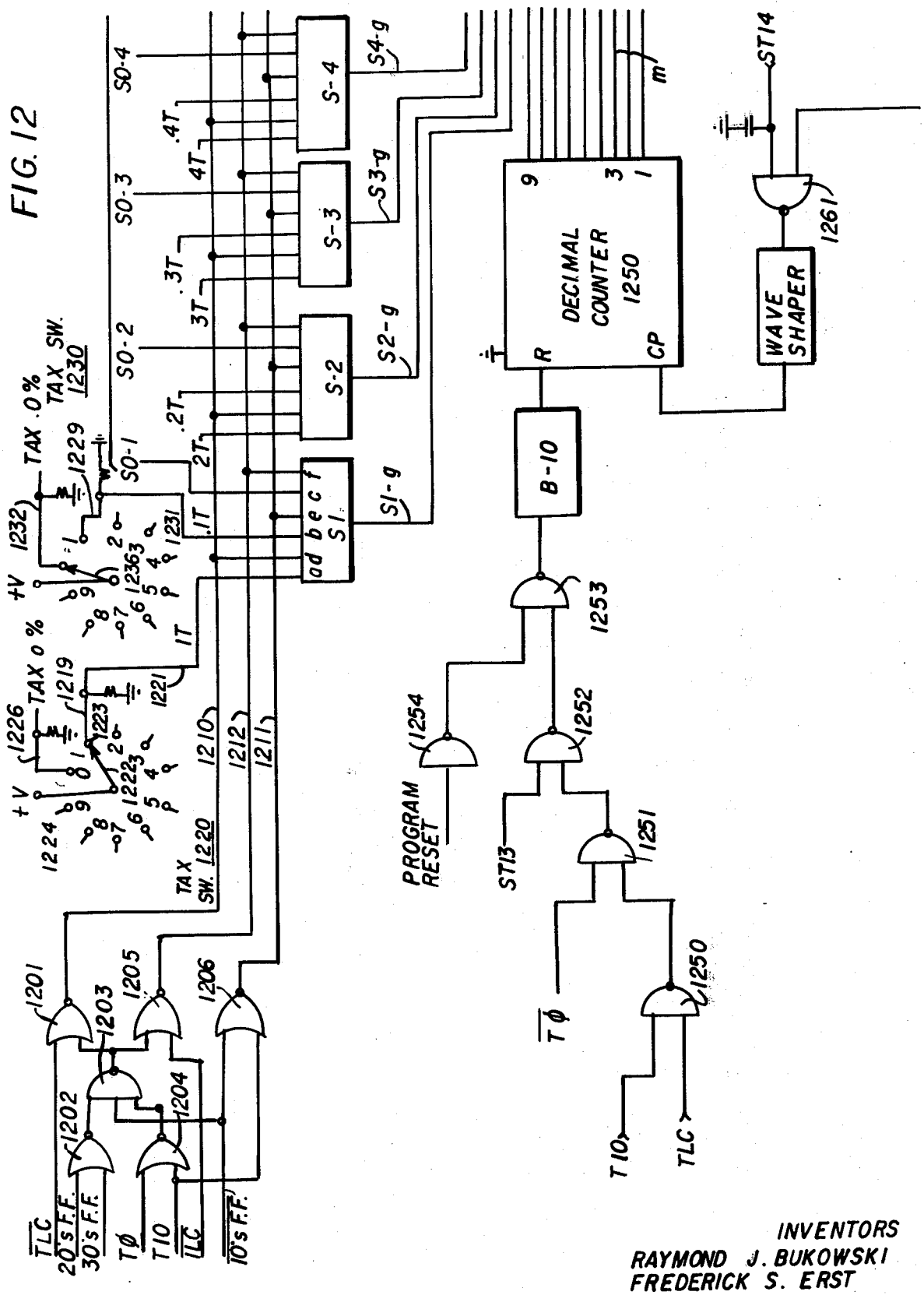
Figure 13:
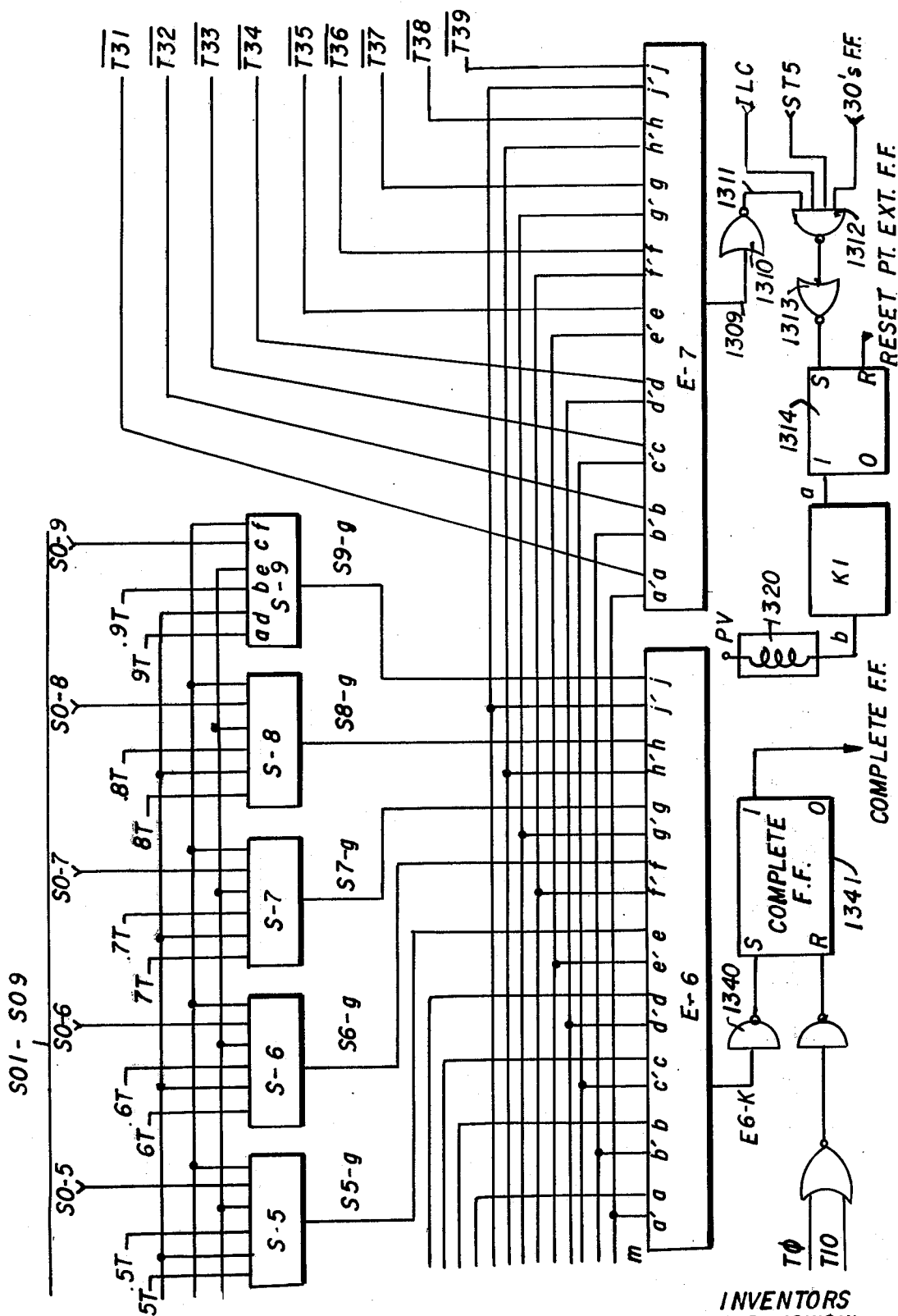

The outputs S01–S09 of the nine scan circuit flip-flops 231–239 are extended to inputs of nine item quantity count circuits S-1 to S-9 shown in FIGS. 12 and 13.

These outputs S01–S09 are also extended to a scan output detected circuit, FIG. 2, comprised of nine gates 251–259 one input of each gate, such as gate 253, is an output S01–S09, such S03, of the scan circuits. A second input to each of the nine gates is 251–259 provided by a NOR gate 260 which is enabled at this time since both inputs $\overline{ILC}$ and $\overline{LIMA}$ to the gate are logic 0, whereby a logic 1 is provided at the output of NOR gate 260. Accordingly, NAND gate 253 is enabled and its output $\overline{SOD}$ becomes a logic 0.

START CIRCUIT

Figure 3:
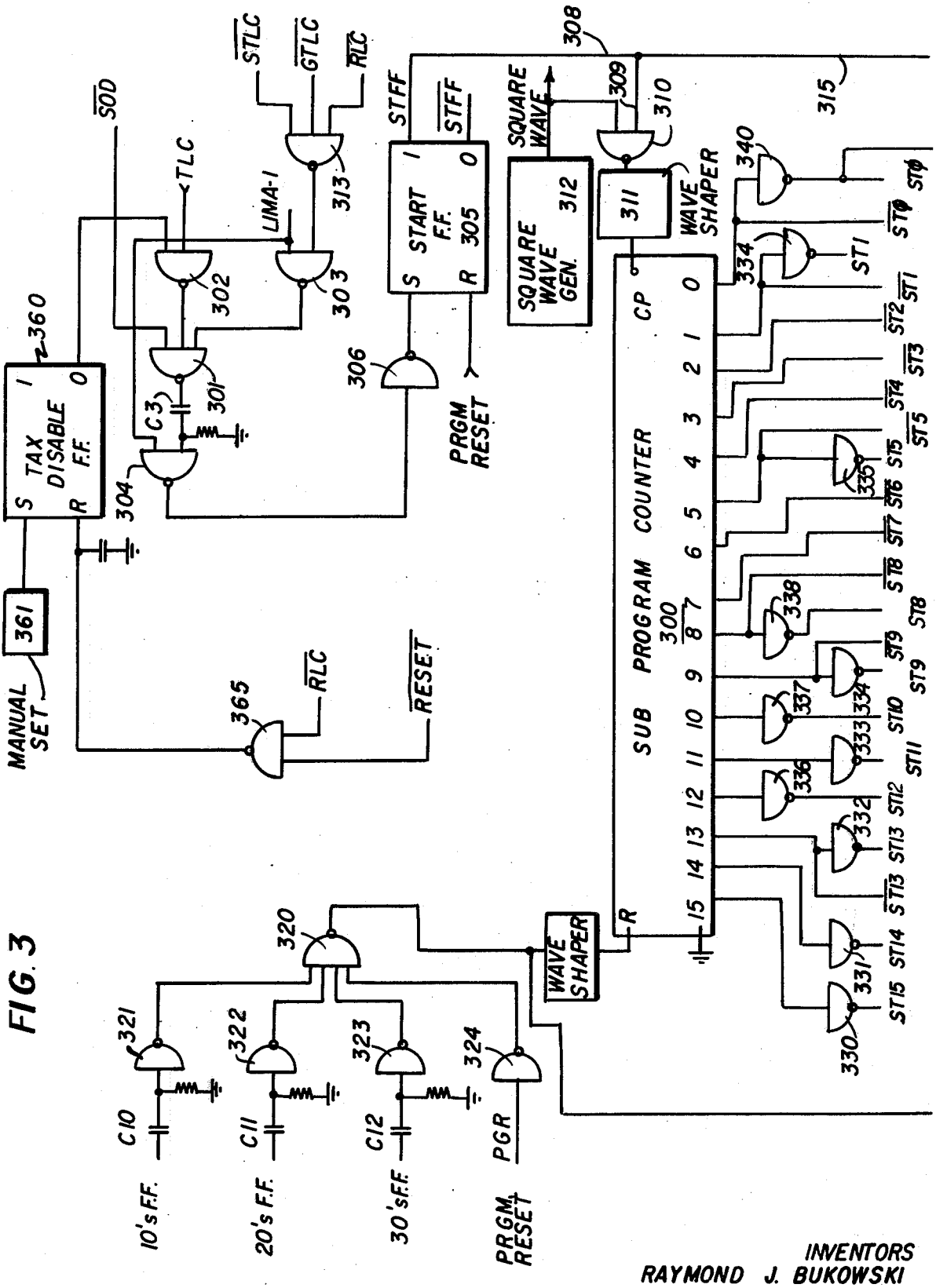

Referring to FIG. 3, when output $\overline{SOD}$ becomes logic 0, gate 301, which is normally enabled, since its three inputs $\overline{SOD}$ and the outputs of gates 302 and 303 are logic 1 is disabled gate 301 is coupled to gate 304 through a capacitor C3 so that when gate 301 is disabled, a logic 1 input is provided momentarily to gate 304, which sets a start flip-flop 305 connected to the output of gate 304 through an inverter 306, since a second input to gate 304 LIMA-1 is also a logic 1.

When the start flip-flop 305 is set, output STFF, an input to gate 513, becomes logic 1 enabling gate 513 and setting the brake via circuits N-2 and inverter 514. At the same time gate 510, an input of which is $\overline{STFF}$ is disabled whereby the clutch is released via circuit N-1 and inverter 511. When advancement of the sales check has been halted, continuous read out of line and quantity marks is provided, and accordingly, the signals on leads S03 and LCM3 will remain true while the sales check is maintained in position with the third line beneath the scanning detectors, in particular transistors 202 and 205.

The outputs S01, S02, S04–S09 of the other scan flip-flops will remain at ground.

Referring to FIG. 2, under scanning conditions as the sales check is advanced through the unit, the transistor emitters, such as emitter 245, of transistor 205 are floating and are at a potential which is approximately 0.7 volts more negative than the voltage on the base 246 of the transistor 205.

A gain circuit 260 is used to increase the optical scan area of the system, whenever the transport motor 500 has been stopped and a sales check is being scanned, by adjusting automatically the voltages −VRC and +VRC which are applied for example to the emitter 245 of transistor 205 and an input of amplifier 223, respectively.

When $\overline{SOD}$ becomes a logic 0 responsive to an output S01–S09 detected, a gate 261 is enabled, setting a flip-flop 262 which together with the negative output of a second flip-flop 264 enables gate 263. The output of gate 263, inverted by inverter 265 enables a voltage regulator circuit 213 which decreases the magnitude of voltage +VRC permitting transistor 205, for example, to switch at a lower potential. Thus, the transistor 205 will become less sensitive to light reflected from the unmarked area of item quantity box in which a mark was detected. A wide scan disable flip-flop 264 will be set whenever the voltage +VRC output of the regulator circuit exceeds a preset maximum as detected by a level detecting circuit 266, causing the voltage regulator circuit to be temporarily disabled.

The gain circuit 260 is reset by $\overline{LIMA}$ when detection of each line mark ceases.

TIMING PULSE GENERATION

To summarize what has happened to this point, the first three lines L1–L3 of the sales check 20 have been scanned and a quantity item mark has been detected in the third line L3 on the sales check. Advancement of the sales check through the unit has been temporarily stopped and a signal LCM3 generated in response to the third line mark has been detected and passed through a programmable price board 1100 which passes the signal LMC3 over selected paths which represent the coding of 25 cents for the item on line L3 signal decoders 1120–1122 which provided the outputs of the item column.

The outputs S01–S09, one of which S03 is a logic 1, of the ten detector flip-flops 231–239 are passed to the inputs of item quantity count circuits S-1 to S-9 (FIGS. 12–13).

The system has advanced to this condition without any timing pulses. However, at this point data transfer will be effected and in the calculation of the extended price and other operations, synchronization will be required for the remaining steps in the pricing process.

The system timing includes a main program counter 400 (FIG. 4) a sub-program counter 300 (FIG. 3) and program decade logic circuits, (FIG. 7), which are operative to providing timing signals in a predetermined sequence to enable the system logic circuits.

Figure 4:
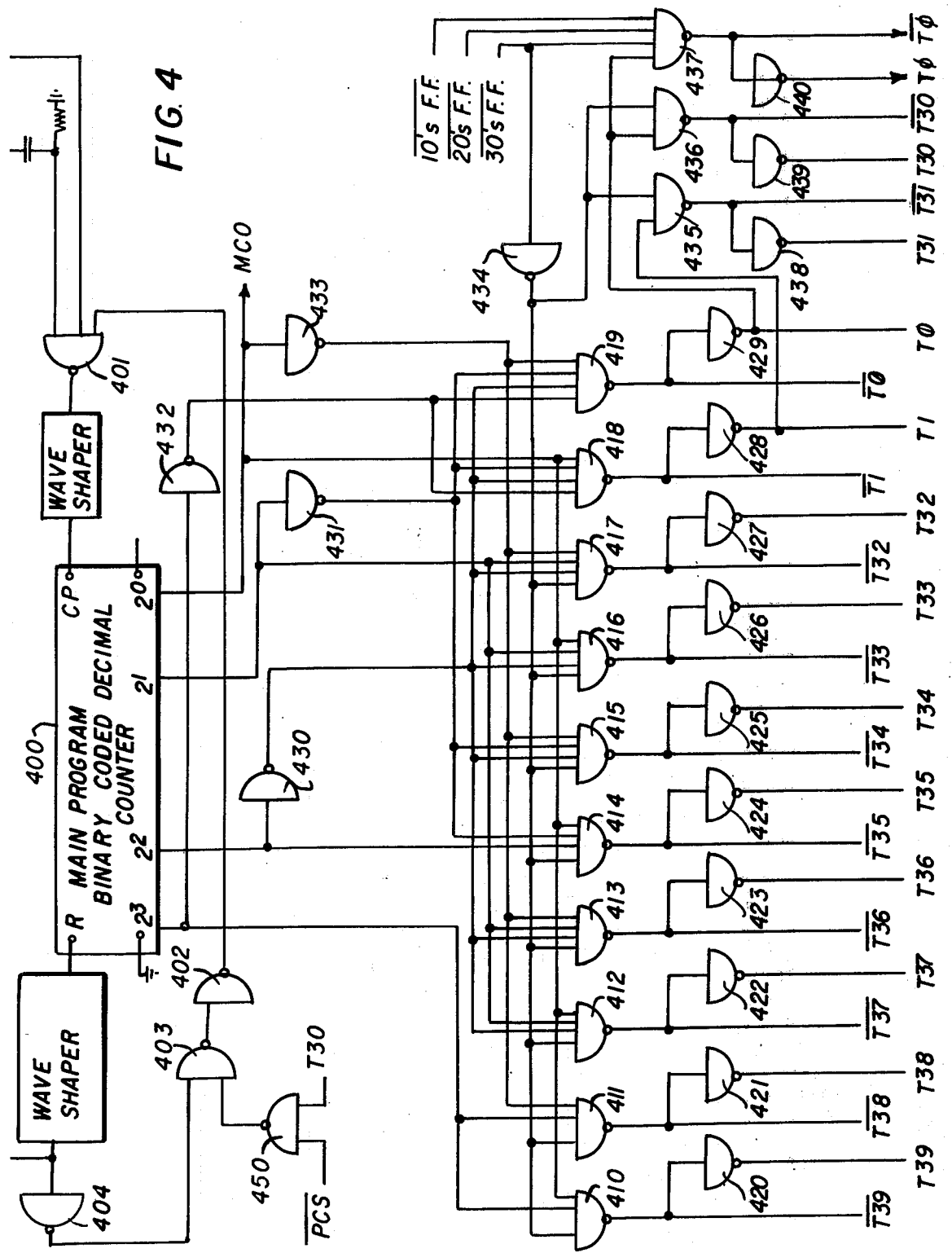

Referring first to FIG. 4, the main program counter 400 and associated gates 410–440 connected to outputs thereof are operative to provide 40 time slots designated T0–T39. The function of the 40 time slots with respect to the five programs has already been discussed in the preceding description accompanying Table I.

Figure 7:
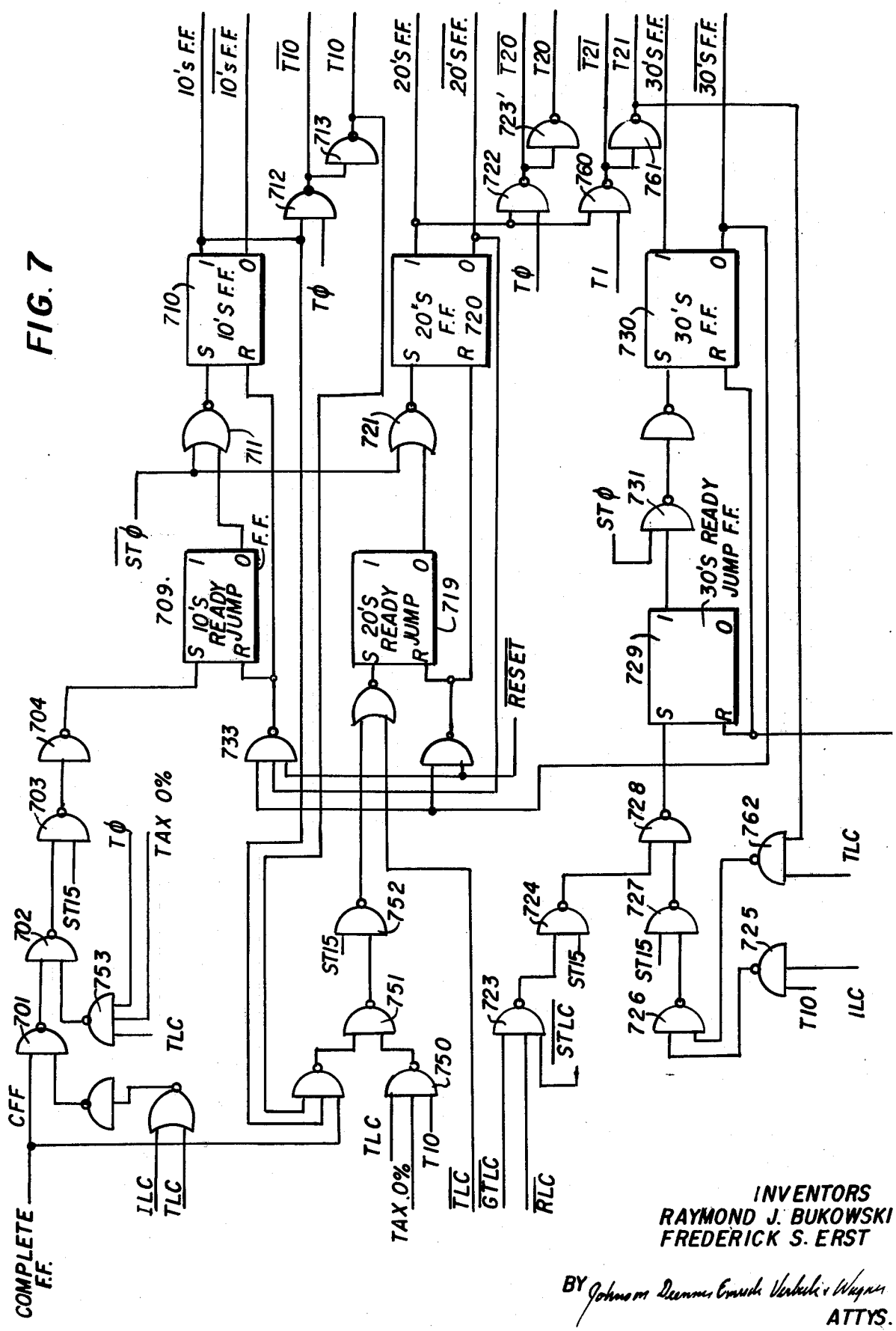

Associated with the main program counter 400 are decade logic circuits, shown in FIG. 7, including a tens flip-flop 710, a twenties flip-flop 720 and a thirties flip-flop 730 which are operative to provide signals which indicate the decade of the count of the main program counter 400. The manner in which these decade flip-flops 710, 720 and 730 are used will become more apparent in the following description.

Referring now to FIG. 3, the sub-program counter 300 is operative to generate sixteen time slots designated ST0–ST15. These are sub time slots which occur during each of the forty main time slots T0–T39.

To help in understanding, a time chart, FIGS. 23a–23i, has been provided which shown the time slots and the outputs of the more important control circuits. This chart which shows the outputs of the various circuits during the scanning of line L3 will be referred to when appropriate during the description.

Returning to FIG. 3, the positive output of the start flip-flop 305 is further extended over leads 308 and 309 to a gate 310. The logic 1 on lead 309 will enable gate 310 gating the output of a square wave generator 312 through a wave shaping circuit 311 to the clock pulse input CP of a sub-program counter 300. As long as the start flip-flop is set, the sub-program counter will be stepped at the rate of the square wave which is for example, 1.3 milliseconds. The square wave voltage is equal to +V. Thus the sub-program counter 300 will be stepped each 1.3 ms and will provide logic 0 levels on successive counter outputs 0–15 as the counter is 300 stepped. The positive output of the start flip-flop 305 is also extended over lead 315 to a gate 401 (FIG. 4). A second input ST0 to gate 401 is also logic 1. However, a third input to gate 401 is a logic 0 and thus, gate 401 will not be enabled at this time.

Digressing, the system includes a program reset flip-flop 1002 (FIG. 10) which is set at this time. The positive output of flip-flop 1002 is gated by an output ST0 of the sub-program counter 300 through a gate 1003 and disabling gate 1004 to provide a signal PGR which is a logic 1. In FIG. 3, output PGR enables gate 324, disabling gate 320 which, through inverter 404 (FIG. 4), disables gate 403 thereby inhibiting gate 401 through inverter 402. When the sub-program counter steps from ST-0 to ST-1, gate 1005 (FIG. 10) will be enabled and the output of gate 1005, will reset the program reset flip-flop 1002. The zero output of flip-flop 1002 will change output PGR of gate 1004 and gate 320 to logic 0 and through gates 402–404 will present a logic 1 level to an input of gate 401.

The sub-program counter 300 will advance through its counts ST0–ST15 each to provide a timing period of 1.3 microseconds. After the program set flip-flop 1002 has been reset, each time the sub-program counter 300 passes through count ST0, a pulse at the output of gate 340 will advance the main program counter one count from T0, to T1, to T2, etc., up to T39. Pulses ST0–ST15 and T0–T39 are the basic timing pulses used in the system, and the system logic circuits are connected to operate at different times as indicated by such legends.

DATA TRANSFER CIRCUITS

Figure 10:
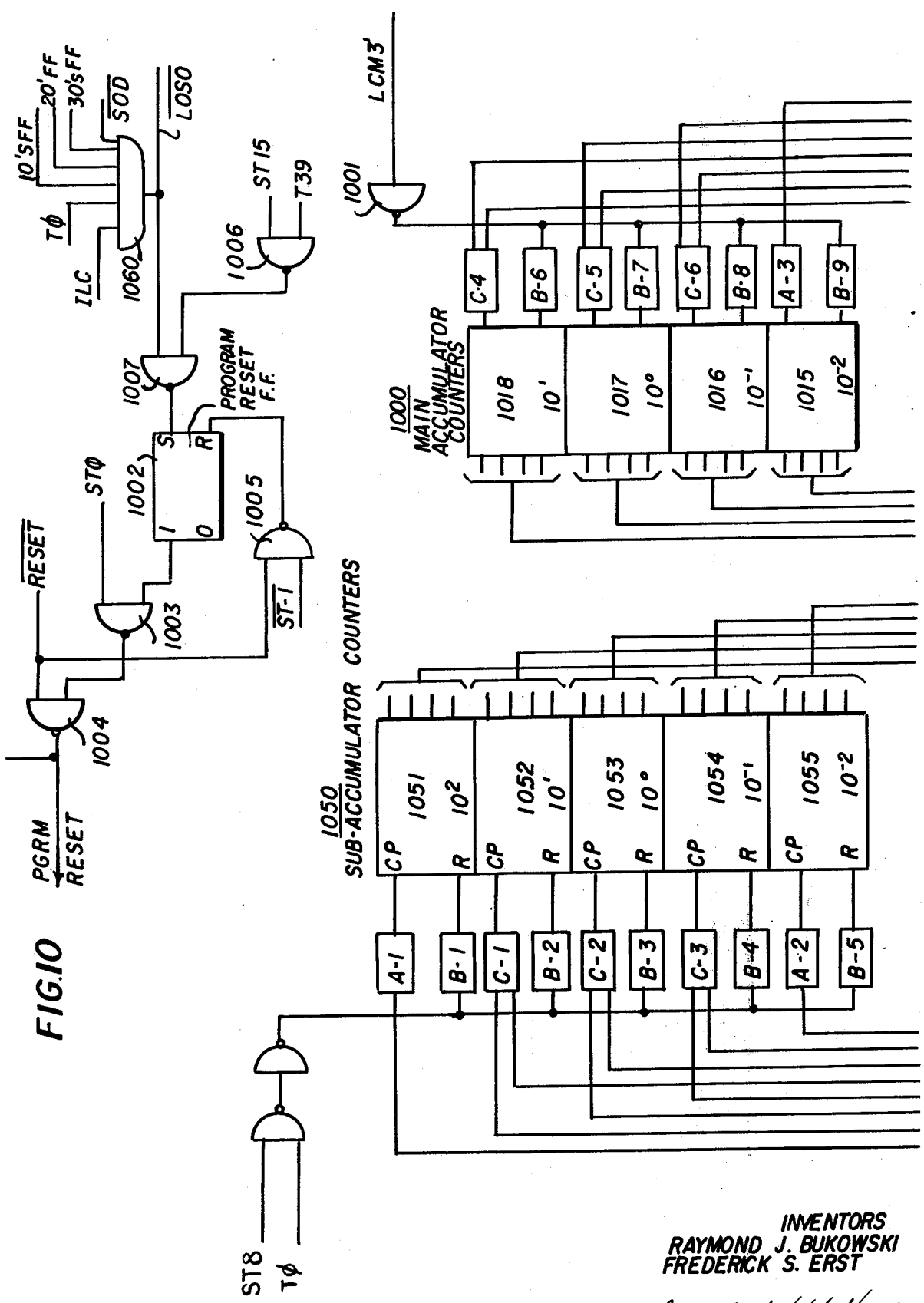

Data transfer circuits DTA–DTE shown in FIGS. 14–16 and 18 have been provided for transferring the price data for the items represented by lines of the sales check from the output of the pricing matrix 1100 to a sub-accumulator 1050 (FIG. 10). The data transfer circuits are also used to transfer data from the sub accumulator 1050 to a main accumulator 1000 and to print control circuitry shown in FIG. 19. Circuits are further used to transfer data from the main accumulator 1000 to the subaccumulator and the print control. The data transfer circuits DTA–DTE include input sections and output sections.

The input sections (FIGS. 15 and 16) of the data transfer circuits DTA–DTE provide a separate path for each digit of binary coded data to be transferred. An input circuit receives the four outputs which carry the binary coded price data present in the main accumulator, the sub accumulator or the price matrix.

Figure 16:
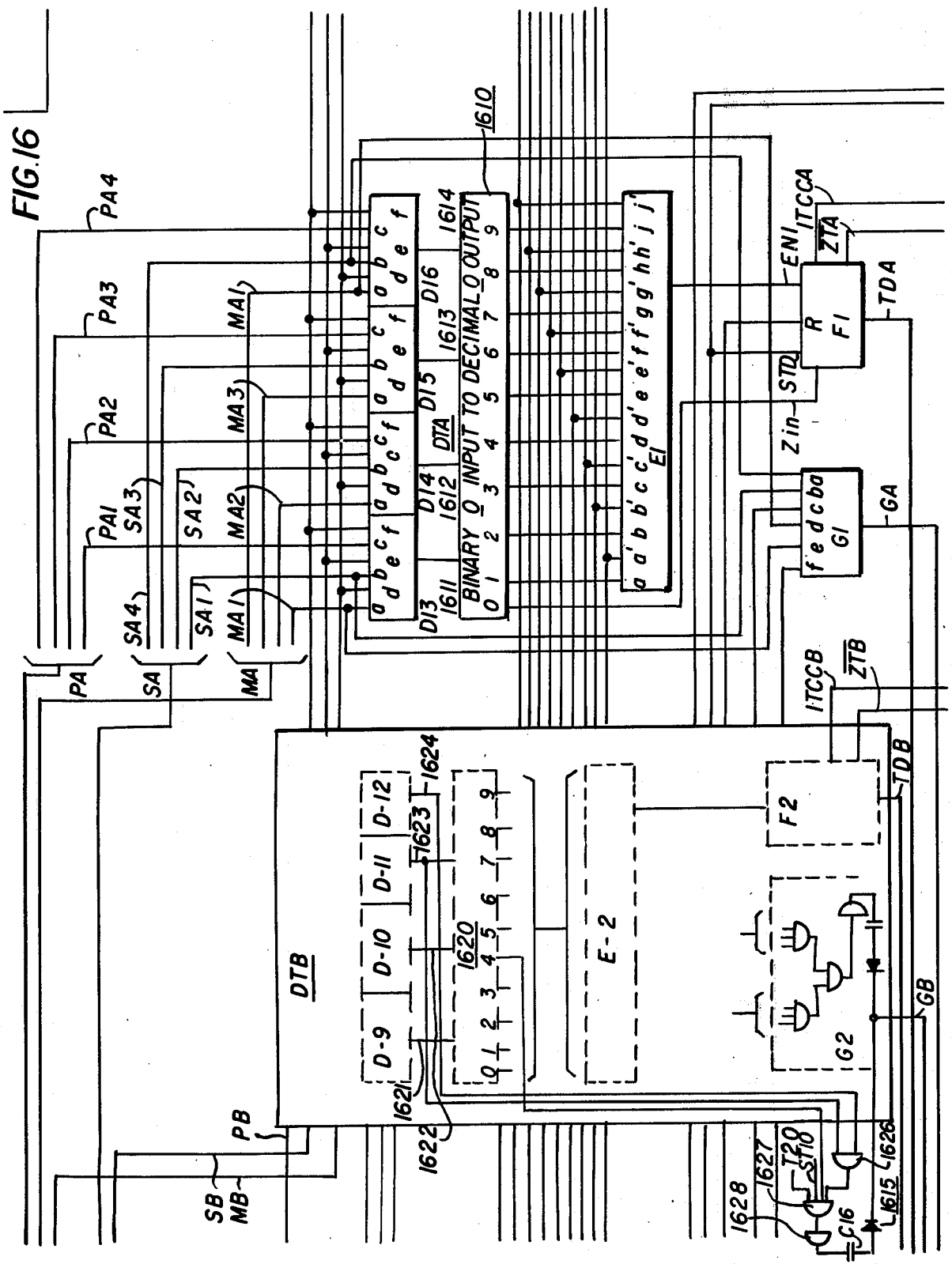

Referring to FIG. 16, input section DTA for transferring data representing the cents digits includes data source select circuits D13 to D16, shown in FIG. 22d, each, such as circuit D13, comprised of three two-input NAND gates the outputs of which are connected together to a common lead 1611–1614.

Inputs D13-a to D13-c of gates D13-1 to D13-3 respectively are connected to the output of the main accumulator 1000, the sub-accumulator 1050 and the price select matrix 1100, respectively. The other inputs D13d–D13f of gates D13-1 to D13-3 are connected to enable circuits comprised of gates 1701–1717, shown in FIG. 17, selectively enables one of the gates D13-1, D-13-2 or D-13-3 at the proper time to gate the data from the one of the sources into the data transfer circuits.

The outputs 1611–1614 of the four circuits D-13 to D-16 are connected to a binary-to-decimal converter 1610 which converts the binary coded data at the outputs 1611–1614 to decimal data on the outputs 0–9 of the converter 1610. The output zero is extended directly to a circuit F-1. Outputs 1–9 of the converter 1610 are connected to an input of coincidence circuits E-1 shown in FIG. 22e which is comprised of nine NOR gates E1-1–E1-9. A second input to gates E1-1E1-9 are timing pulses outputs of gates 1720–1738.

The output of the coincidence circuit E1 is extended to an output register circuit F-1, shown in FIG. 22f, which includes a data transfer flip-flop F1-A.

Figure 22G:
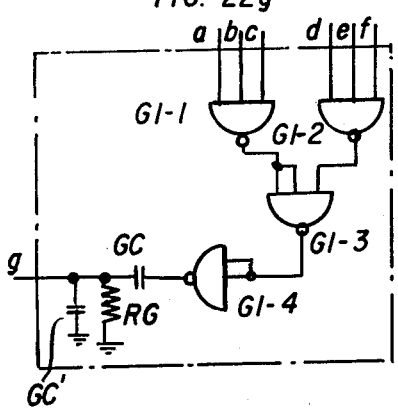
FIGS. 22a-22s are schematic circuit diagrams of circuits shown in block form in FIGS. 2-20.

The input section of the data transfer circuits also includes a transfer carry circuit G-1 shown in FIG. 22g having inputs G-1a to G-1f connected to the outputs of the main and sub-accumulators and enable signal generator circuits such that each time either the main or the sub accumulator counter passes through a count of nine, the carry circuit will be effective to transfer a carry digit to the next higher counter. The input section of the data transfer circuit DTA provides an output over lead TDA to the output section of the data transfer circuits. Data transfer circuits DTB are similar to circuits DTA with the exception of the provision of a circuit 1615 used in the computation of the tax as will be described.

Transfer circuits DTC and DTD are identical with circuit DTA. Circuit DTE which receives input data only from the main accumulator has no input data source circuit such as D-13 of circuit DTA. Moreover, circuit DTE does not include a carry circuit such as circuit G-1 of circuit DTA.

Figure 14:
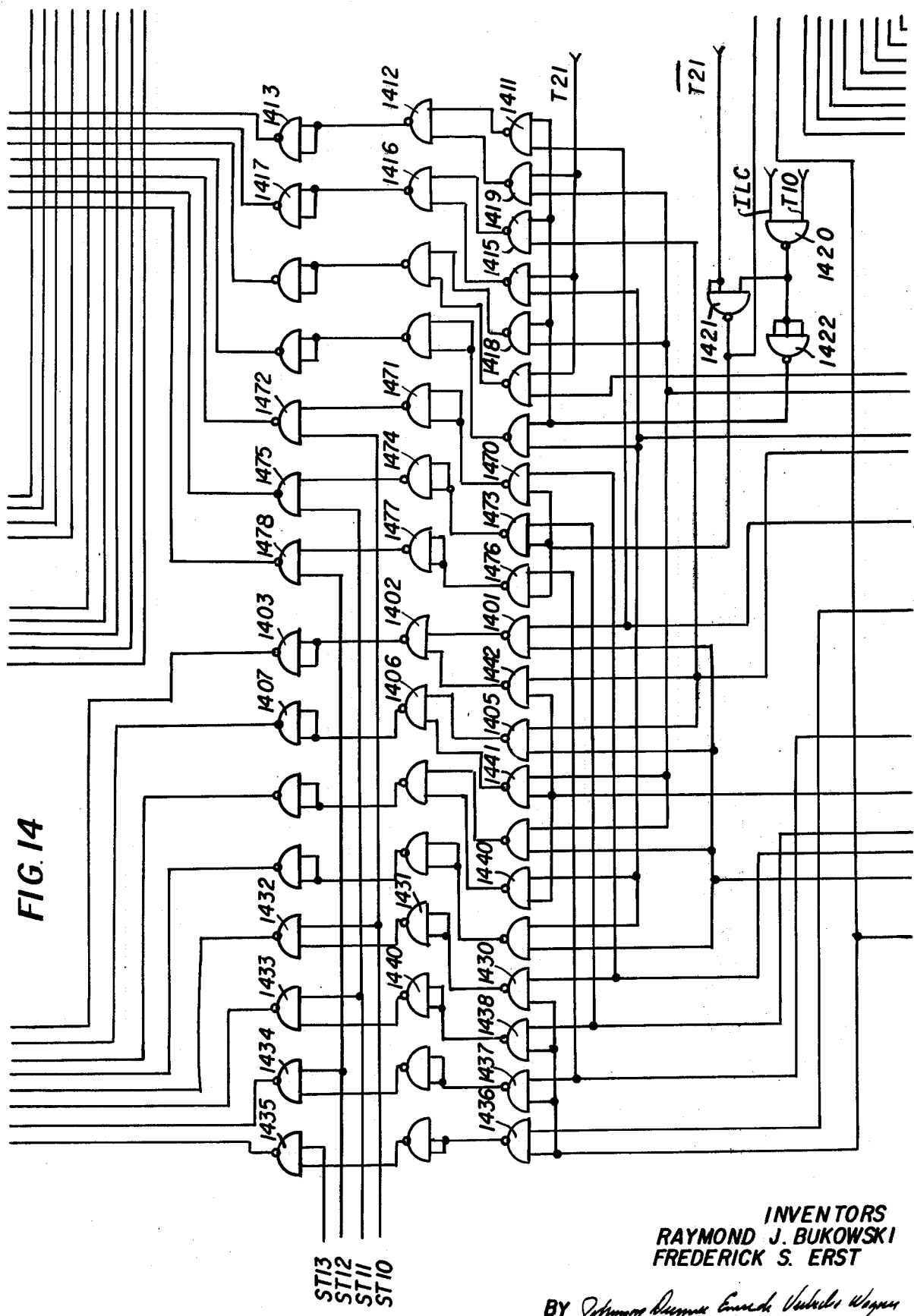
Figure 15:
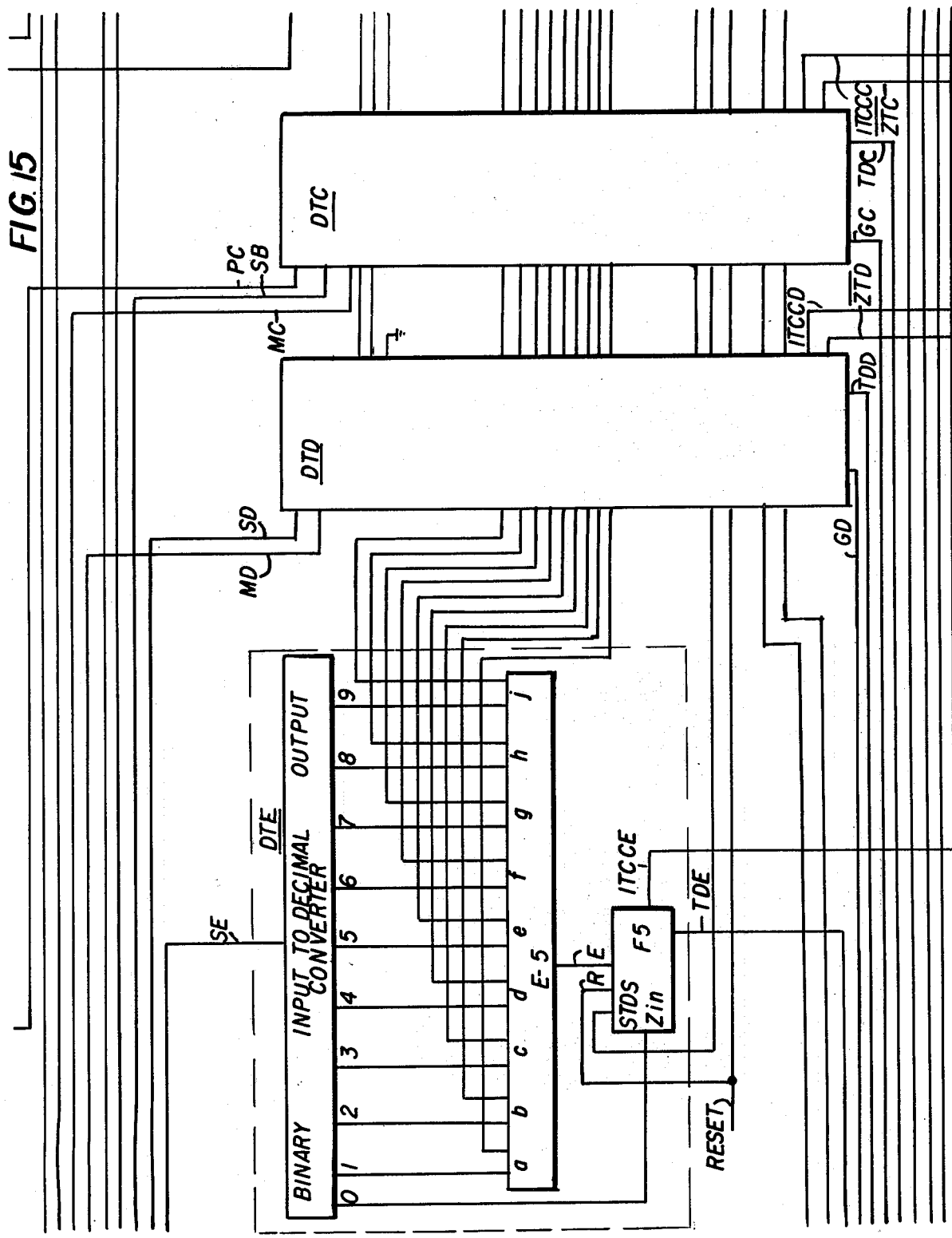

The output section of the data transfer circuits includes five NOR gates 1801–1805 (FIG. 18) for gating the serial data of transfer circuits DTA-DTE to a plurality of pulse routing gates, including gates 1401–1477, shown in FIG. 14, which gate the data to the main accumulator 1000 or sub-accumulator 1050.

The output circuits also include four carry flip-flops 1811–1814 associated with data transfer circuits DTA-DTD. The output of these flip-flops 1811–1814 are also gated to the main accumulator 1000 or sub-accumulator 1050 via the pulse routing gates of FIG. 14.

FIRST TRANSFER OF DATA

The binary coded outputs of the pricing matrix 1100 are extended in parallel to the inputs of data transfer circuits DTA, DTB and DTC over leads PA, SA and MA, three sets of four leads each for providing the binary code for the digits which represent the dollar, dime and cent magnitudes of the price, twenty-five cents, of the item represented by the leads PA connected to the outputs $2^0$ to $2^3$ of binary encoder 1120 to an input of input select gates D12-1 to D16-1, respectively, of the data transfer circuits DTA which transfer data representing the cents digits.

Similarly the outputs $2^0$ to $2^3$ of encoders 1121 and 1122 are connected to the input select gates of data transfer circuits DTB and DTC which transfer data representing dimes and dollars digits. These outputs will be transferred to the sub accumulator 1050 during times T1–T10. It is pointed out that the subaccumulator counters 1051–1055 are reset during time T0, ST0 of each program sequence.

Figure 17:
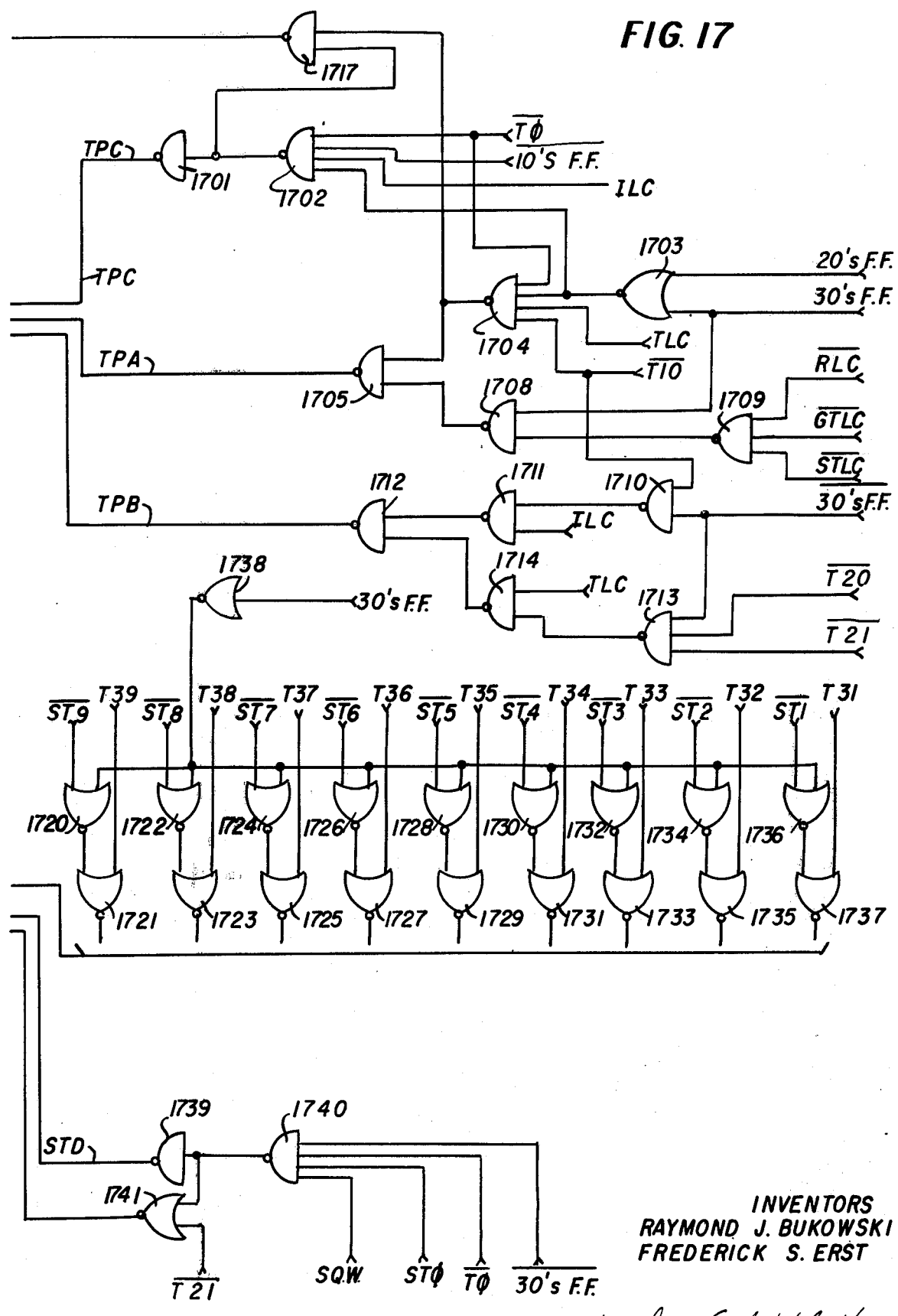

Gates D13-1 to D16-1 are enabled by a pulse TPC generated by gates 1701–1703 of FIG. 17. Referring to FIG. 17, NOR gate 1703 is enabled, since its inputs 20's FF and 30's FF are a logic 0, and thus, a logic 1 is provided at an input to NAND gate 1702. Three other inputs to gate 1702 will be a logic 1 during T1–T9, $\overline{T0}$, $\overline{10\text{'s flip-flop}}$ and ILC. Accordingly, logic 0 is provided at the output of gate 1702. The output of gate 1702 is inverted by an inverter 1701 to provide the signal TPC during times T1–T9.

Accordingly, the gates D13-1 to D16-1 will be enabled during time T1–T9 to pass data outputs from the price select board 1100 to the binary-to-decimal converter 1610 which is connected to the outputs 1611–1614 of gates D13-1 to D16-1 of circuits D13–D16. The outputs of the encoder 1120 on leads PA1–PA4 are a logic code 1,0,1,0, the binary coding of five. Thus, during times T1–T9 gates D13-1 and D15-1 will be enabled by pulse TPC, and logic 0's will be extended over leads 1611 and 1613 to the binary to decimal converter 1610, which will provide a ground or logic zero on output 5.

During time T1, ST0, flip-flop F1-1 is set over lead ST0 and gates F1-2 and F1-3 by the square wave clock which enables gates 1739 and 1740 shown in the bottom of FIG. 17. Two other inputs, $\overline{T0}$ and $\overline{30\text{'s FF}}$, are also logic 1 at this time.

However, referring to FIG. 22f, whenever the output of the binary to decimal converter is zero, that is a ground on output zero, Zin, gate F1-2 will be inhibited by the output over lead Zin and flip-flop F1-1 cannot be set.

Figure 18:
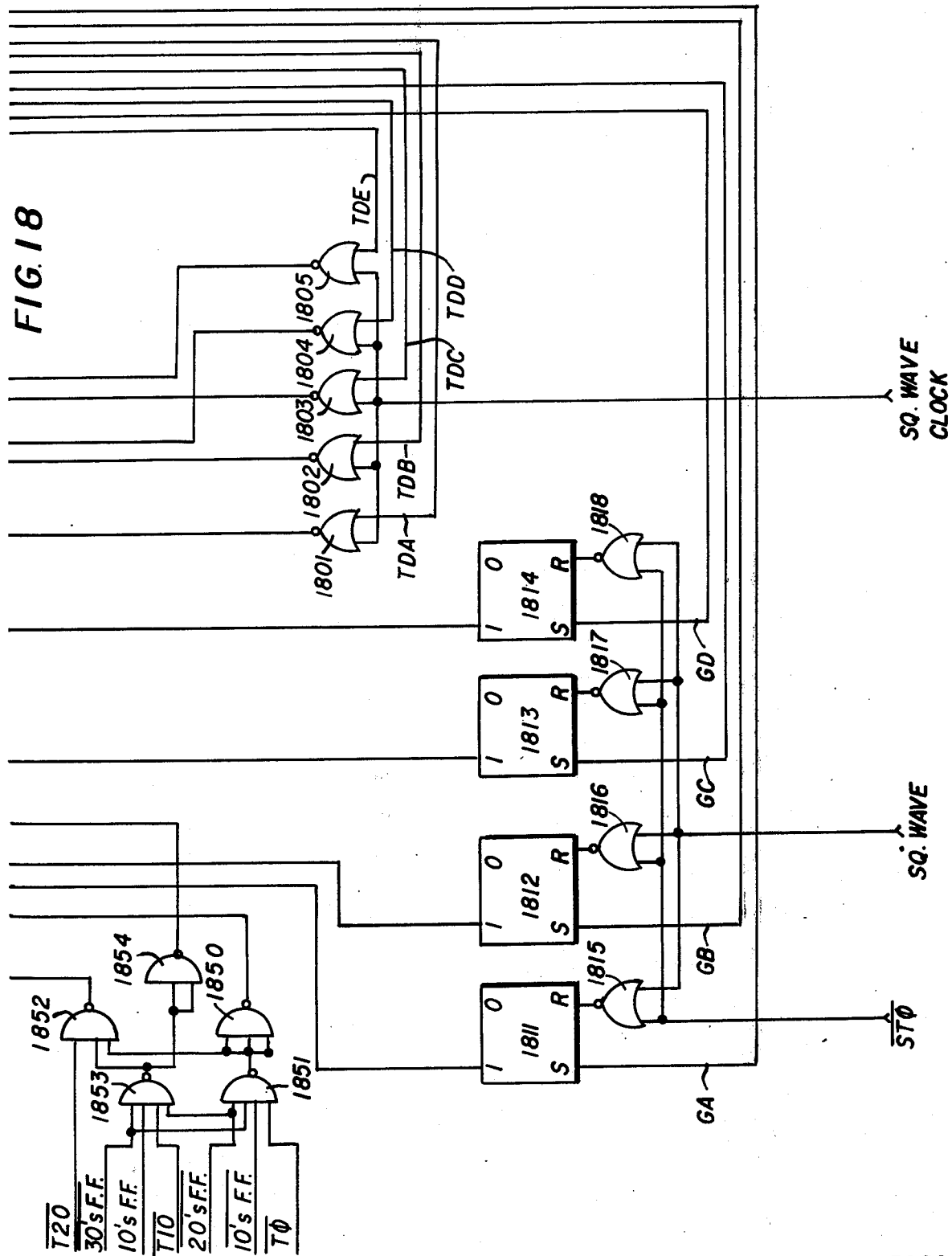

The set output DTA of flip-flop F1-1 is used to enable a NOR gate 1801, FIG. 18, which gates the output of the square wave pulse generator 312 to the sub accumulator counter 1055 which registers pulses representing the cents digits transferred over circuits DTA. As long as flip-flop F1-1 is set, the sub accumulator counter 1055 will be stepped with successive square wave pulses. As mentioned above, when the data transferred is zero, flip-flop F1-1 is not set and accordingly sub accumulator counter will not be stepped. The nine outputs of the binary-to-decimal converter 1610 are each extended to one of the inputs E1-a to E1-j of NOR gates E1-1 to E1-9 of a coincidence circuit E-1, shown schematically in FIG. 22e. A second input to gates E1-1 to E1-9 is one of nine timing pulses which represent ST1 to ST9 and are generated via gates 1720–1738 during times ST1–ST9. to provide successive logic 0 levels at inputs E1-a' to E1-j' of gates E1-1 to E1-9. Thus, during times ST1 to ST9 gates E1-1 to E1-9, respectively, will receive an enabling pulse which will enable a corresponding gate E1-1 to E1-9 if an output of the binary-to-decimal converter 1610 is present on the other input of the gates E1-1 to E1-9.

Since in the example, a ground is present on output 5 of the binary-to-decimal converter 1610, gate E1-5 will be enabled at ST5.

At T1, ST0, since the input to data transfer circuit DTA is not zero (and the output of the binary-to-decimal converter 1610 is not zero), transfer circuit F-1 will be enabled over ST0 and transfer flip-flop F1-A will be set as shown in the timing diagram FIG. 23b providing a logic zero level on lead DA at the output of the transfer flip-flop F1. Accordingly, gate 1801 will be enabled and the square wave pulse will be gated to gate 1401. A second input to gate 1401 is an enable signal generated by gates 1850–1851 (FIG. 18) during times T1–T9. When gate 1401 is enabled, the square wave signals will be gated to the sub-accumulator counter 1055 via gates 1402–1403 and input circuit A-2 shown in FIG. 22a. Thus, while gate 1801 is enabled during times T1–T9, the square wave pulses will step the sub-accumulator at the rate of the square wave.

Referring again to FIG. 16, transfer flip-flop F1-A will remain set from T1 ST1 to ST5 as shown in the timing diagram FIG. 23b, AT T1 ST5 coincidence will be detected between the ground on output 5 of the converter 1610 extended to input E1-e of gate E1-5 and the enable pulse ST5 on lead E1-e' of gate E1-5. The logic 1 output of NOR gate E1-5 disables NOR gate E1-10 disabling NAND gate E1-11 which disables NOR gate E1-12 providing a logic, 0 or ground on lead E1-k which is connected to an input EN-1 of transfer circuit F-1.

When input EN-1 of circuit F-1 is grounded, gate F1-4 is disabled and its logic 1 output, extended to the reset input of flip-flop F1-A resets the flip-flop F1-A and consequently disables NOR gates 1801 so that further gating of pulses to the sub-accumulator counter 1055 is inhibited.

During times ST1–ST5, while the transfer flip-flop F1-A is set, (FIG. 23b) the sub-accumulator counter is stepped five times, as shown in binary form in FIG. 23e, so that the digit five representing cents is transferred from the price select board 1100 to the sub-accumulator 1050.

Data transfer circuits DTB, which are similar to circuits, DTA, transfer the price data for the dimes or tens digits from the price select board 1100 to the tens counter 1054 of the sub-accumulator in a manner similar to that just described. The binary output 0100 representing the digit two of encoder 1121 is extended over leads PB to data transfer circuits DTB. A logic 0 output will be provided on lead TD2 during times T1, ST1–ST2. This output is extended to gate 1802 which will be enabled to gate the square wave signal to gate 1405 (FIG. 14) which is enabled during times T1–T9, by an enable signal generated by gates 1850–1851.

Accordingly, the square wave will be gated to the input CP sub accumulator counter 1054, via gates 1405–1407 and circuit C-3 during time T1, ST1–ST2 whereby sub accumulator counter 1054 will be stepped twice, see FIG. 23*f*.

At T1 ST2, the coincidence in circuit E-2 of data transfer circuit DTB of pulse ST2 togther with the output of a binary-to-decimal counter 1620 will cause transfer circuit F-2 to be reset and gate 1802 to be disabled.

Since the data input to transfer circuits DTC, which transfer data representing the hundreds or dollars digits, are all zero, the corresponding output transfer circuits will not be enabled and sub accumulator counter 1053 will not be stepped.

Thus, during time T1 time slots ST1 through ST2 the outputs of the price select board 1100 representing twenty-five cents have been transferred to the sub-accumulator counters 1054–1055.

ITEM QUANTITY COUNT CIRCUITS

The outputs S01–S09 of the scan output flip-flops 231–239, FIG. 2 are extended to input select circuits S1 through S9 of the item quantity count circuits, FIGS. 12–13.

Figure 22H:
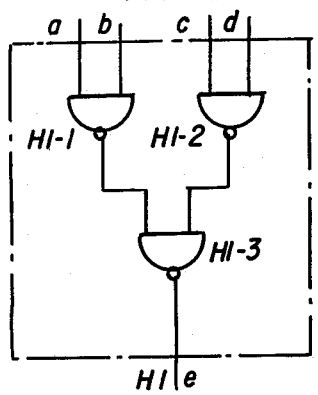
Figure 22I:
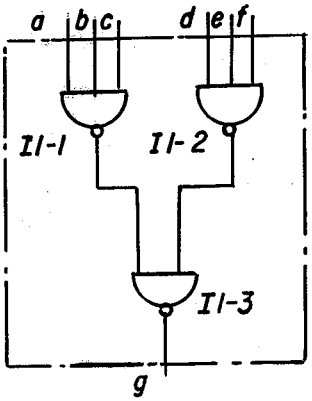
Figure 22J:
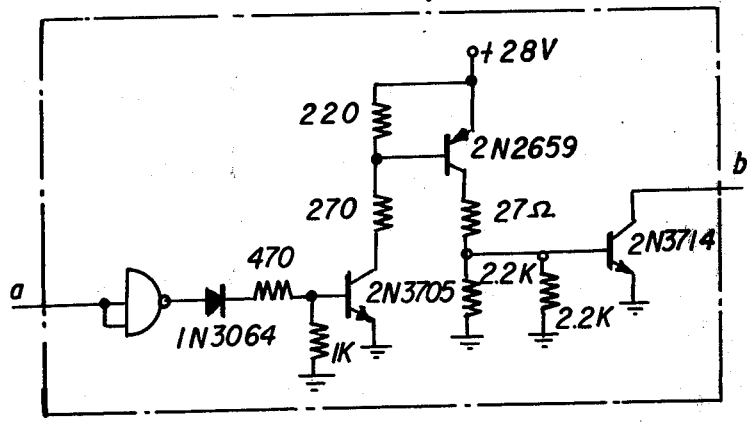
Figure 22K:
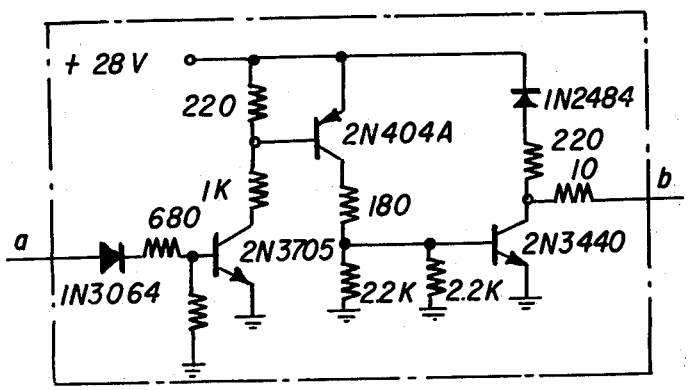
Figure 22:
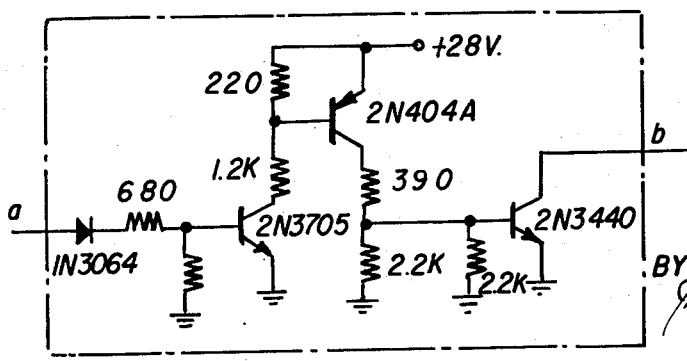
Figure 22M:
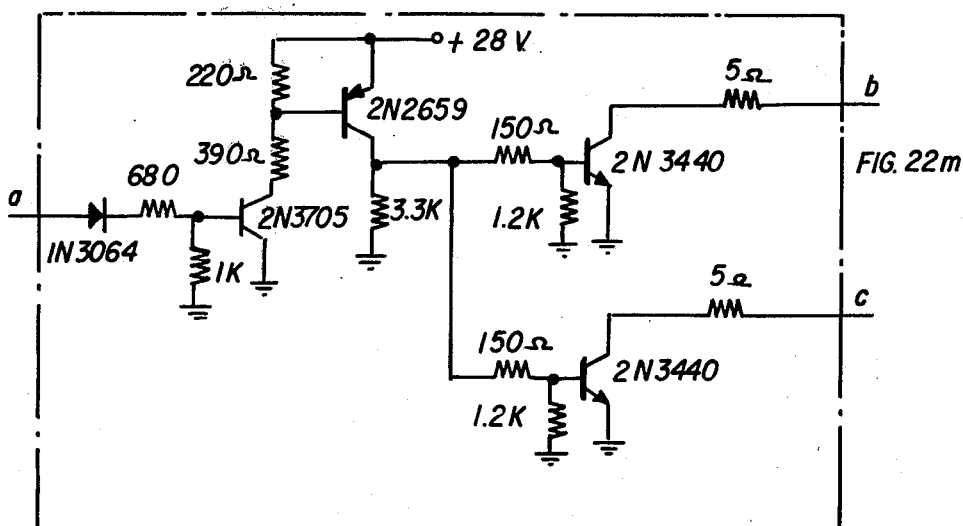
Figure 22N:
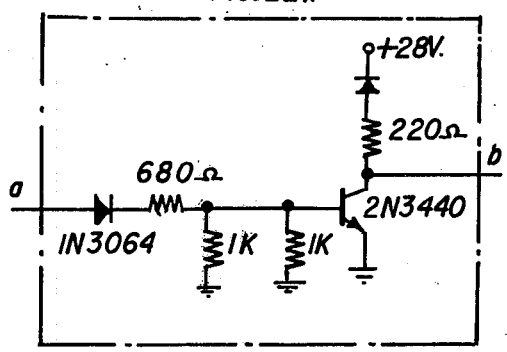
Figure 22P:
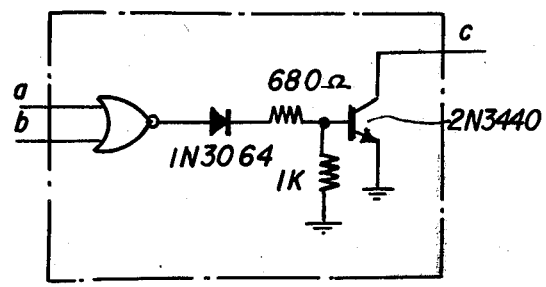
Figure 22Q:
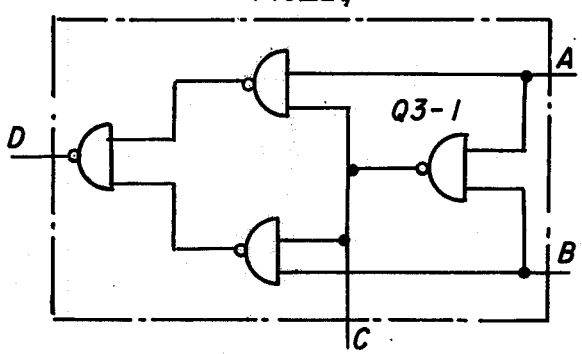
Figure 22R:
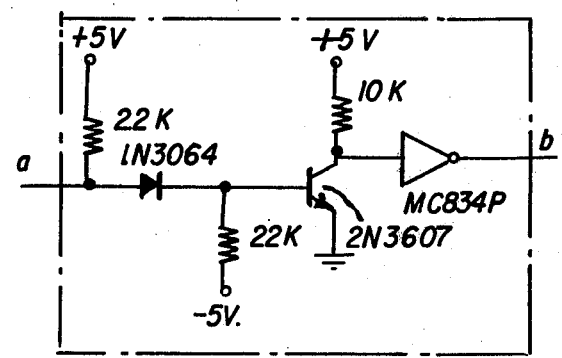
Figure 22S:
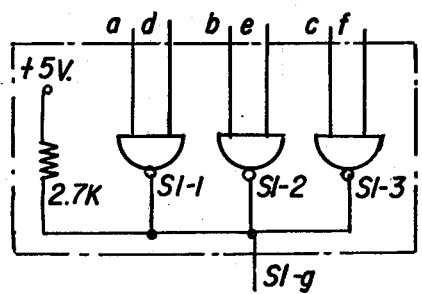

The input select circuits S1–S9, such as circuit S1 shown in FIG. 22*s* comprises three two-input NAND gates S1-1, S1-2 and S1-3 the outputs of which are connected together to a common lead S1-d. One input S1-a of gate S1-1 is connected to an output 1219 of a whole percent tax switch 1220 via lead 1221. One input S1-b of gate S1-2 is connected to an output 1229 of a tenths percent tax switch 1230 via lead 1231. Input S1-c of gate S1-3 is connected to lead S01 and thence to the output of item scan flip-flop 231. The second leads gates S1-1 to S1-3 are connected via leads 1210–1212 to gates 1201–1206 which generate pulses which enable one of the three gates S1-1 to S1-3 to gate inputs from the whole or tenths tax switches or from the item quantity scan circuit outputs into a coincidence circuit E-6, FIG. 13.

Gates 1202–1205 enable one gate of the nine circuits S-1 to S-9 in the present example, gate S1-3 during times T1–T9 of the item scan program, gating the scan outputs S0-1 to S0-9 to the coincidence circuit E-6 over leads S1-g to S9-g a different set of gates including gates 1201–1204 enable one gate of the nine circuits, gate S1-1 in this example during times T1–T9 of the tax program gating the output 1219 of the whole tax switch 1220 to the coincidence circuit E6. Gate 1206 enables one gate, such as gate S1-2, of circuit S-1 during times T11–T19 of the tax program, gating the output 1229 of the tenths tax switch 1230 to the coincidence circuits E-6.

The nine outputs S1g–S9g of the input select circuits S-1 to S-9 each provide an input to one of nine inputs E6-a to E6-j of the coincidence circuit E-6, shown schematically in FIG. 24E. Circuit E-6 is identical with circuit E-1 of data transfer circuit DTA and includes nine two-input NOR gates having inputs E6a–E6j and E6a′–E6j′, respectively. Inputs E6a′–E6j′ are connected to nine outputs 1-9 of decimal counter 1250. The decimal counter 1250 is stepped at time ST14 during T1–T9 of the item line scan program, and during times T1–T9 and T11–T19 of the tax program, the counter 1250 provides outputs 1–9 which are compared via circuit E-6 with outputs of circuits S1–S9. Coincidence will provide an output on lead E6K which output through inverter 1340 will set a complete flip-flop 1341.

Returning to the example, since the item quantity box 3 has been marked for the line L3 being scanned, a logic 1 is provided on lead S03. Circuit S3 is enabled by the signal on lead 1212 from gates 1202–1205, and a logic 1 is provided on lead S3g and extended to input c of circuit E6.

After the price information has been transferred to the sub-accumulator once during time T1-ST1 to ST9, the program counter continues to step to T1-ST14.

At ST14 of time T1, the decimal counter 1250 will be stepped as gate 1251 is enabled, to provide a count of one at output 1 of the counter 1250. Since coincidence is not detected, the sub program counter 300 will step to ST15. When the sub-program counter 300 steps ST0, the main program counter 400 will step to T2 and the sequence of steps to transfer the price data to the sub accumulator a second time will be initiated.

SECOND TRANSFER OF PRICE DATA

At time T2, the data transfer circuits DTA–DTC are again operative, at successive counts of ST1–ST9 to gate to the sub accumulator 1050 a second set of serial data pulses five pulses through gate 1801 enabled by data transfer circuits DTA, and gates 1401–1403 to step counter 1055 five counts, and two pulses through gate 1802, enabled by data transfer circuits DTB, and gates 1405–1407 to step counter 1054 twice. Thus after two transfers of data, counter 1054, registering the tens digits, has been stepped four times indicating a count of 40 cents and counter 1055 has been stepped ten times indicating a count of ten cents.

CARRY CIRCUITS

Each data transfer circuit DTA–DTD has associated therewith a transfer carry circuit such as circuit G-1 of data transfer circuits DTA, and a carry flip-flop such as flip-flop 1811 for accommodating transfer of carries between the counters 1055–1051 of the sub accumulator 1050 and the counters 1015–1018 of the main accumulator 1000.

Thus, the transfer of the tenth count of sub- accumulator counter 1055 to sub accumulator counter 1054 is established by carry circuit G-1 of transfer circuits DTA and carry flip-flop 1811.

The outputs of the subaccumulator counter, such as counter 1055, are extended to the input circuits, such as circuits D-13 to D-16 of the data transfer circuits DTA over a set SA of four leads SA1–SA4.

Leads SA1 and SA4 are extended to inputs G1a and G1b of gate G1-1 of the carry circuit G1 shown in FIG. 22*g*. A third input of gate G1-1 is an enable signal from gates 1851–1853 (FIG. 18) generated during times T1–T9.

Similarly, leads MA1 and MA4 connected to the outputs of the main accumulator 1000 are connected to inputs G1d and G1e of gate G1-2. The third input of gate G1-2 in an enable signal generated by gates 1420 and 1421, FIG. 14 at T10 of the item line scan progam or time T21 of the tax program.

Each time, during times T1–T9 of the item line scan program, the subaccumulator counter 1055 steps to the count of/its nine outputs on leads SA1 and SA4 will be logic 1, enabling gate G1-1 which will disable gate G1-3. As the counter 1055 is stepped from nine to ten (or zero) gate G1-1 will be disabled, gate G1-3 will be enabled and gate G1-4 will be disabled providing a logic 1 pulse momentarily on lead Ga, through capacitor GC, FIG. 22g, which sets flip-flop 1811, FIG. 18.

The set output of flip-flop 1811 enables gate 1430 a second input of which is a logic 1 during time T1–T9 of the item line scan program. The output of gate 1430 is extended to gate 1432 through an inverter 1431. Gate 1432 will be enabled at ST10 of each time slot T1–T9 and when gate 1432 is enabled, subaccumulator counter 1054 will be stepped once as the output of gate 1432 is extended to the input circuit C-1, FIG. 22c, of the counter 1054.

Data transfer circuits DTB–DTD also include carry circuits for setting an associated one of the carry flip-flops 1812–1814 the outputs of which are gated via gates 1433–1435 to input circuits C-2, C-1 and A-1 of subaccumulator counter 1053–1051 respectively. Gates 1432–1435 are singly enabled by timing pulses ST10–ST13, respectively, in order that the carries may be made in the appropriate sequence and also if, for example, a carry from counter 1055 to counter 1054 to ST10 should necessitate a subsequent carry from counter 1054 to the next highter counter 1053, such carry will be made during time ST11 of the same major time slot.

In the present example, a carry of 1 from subaccumulator counter 1055 to subaccumulator counter 1054 will be effected in the manner just described via circuit G-1, carry flip-flop 1811, and gates 1430–1433 during time T2-ST10.

Referring to the timing diagram, FIG. 23f, during times T2, ST1–ST2, subaccumulator tens counter 1054 will step from a count of two to a count of four. During times T2, ST1–ST5, the subaccumulator units counter 1055, FIG. 23e will step from a count of five to a count of ten. However, as units counter 1055 steps from a count of nine to a count of ten at ST4–ST5, the transfer carry flip-flop 1811 is set, FIG. 23d.

At T2-ST10, the subaccumulator tens counter 1054 will be stepped one count to a count of five.

The transfer carry flip-flop 1811 will be reset at T3, ST0 when the output of the square wave generator is gated to the reset input of the flip-flop 1811 by gate 1815. Accordingly, at T2, ST10 subaccumulator counter 1055 will be at a count of zero and counter 1054 will be at a count of five, representing 50 cents. Counter 1051–1053 will also be at zero.

At T2, ST14 the decimal counter 1250, FIG. 12, of the item quantity count circuit is stepped as gate 1251 is enabled, and an output 2 of the counter 1250 is extended to the inputs labeled b of each gate of circuit E6. However, since the output of circuit S-2 on lead S2-g is ground, circuit E6 is not enabled and the complete flip-flop 1341 is not set.

Accordingly, the sub program counter 400, will step to ST15 and as it continues to step to ST0, the main program counter 400 will step to T3.

THIRD TRANSFER OF DATA

As the sub-program counter advances from ST15 of T2 to the count ST0, the main program counter advances to count T3 and the price twenty-five cents of the item represented by line L3 is transferred a third time by transfer circuits DTA–DTC from the programmable price select board 1100 to the sub-accumulator 1050, and to the sub-accumulator, counters 1051–1055 total such entries, will have registered the total price seventy-five cents in binary form. The outputs of the sub-accumulator counters 1054 and 1055 which register seven and five, respectively, are shown in FIGS. 23e and 23f.

As the sub-program counter advances to count ST14 in the third time slot T3, the decimal counter 1250 of the item quantity count circuit will advance to the count three, and coincidence circuit E-6 will be enabled since lead S3-g and lead m connected to output three of the counter have a logic 1 signal thereon.

As such a coincidence is detected, a ground or logic 0 is provided on lead E6k which sets the complete flip-flop through gate 1340 to indicate that the marked quantity three has been detected.

The output CFF of the complete flip-flop 1341 enables gate 701 (FIG. 7) which disables gate 702. The logic 1 output of gate 702 together with ST15 enables gate 703 which, through gate 704, sets the tens ready jump flip-flop 709. The reset output of the tens ready flip-flop 709 is gated with ST0 by NOR gate 711 and will set the tens flip-flop 710 as the sub-program counter advances from ST15 to ST0.

The output of the tens flip-flop 710 applied through capacitor C10 to gate 321 momentarily enables gate 321 (FIG. 3) disabling gate 320. The logic 1 output of gate 320 resets the main program counter 400 and the sub-program counter 300, which will provide counts ST0–ST15 and T10–T19 as indicated by the tens flip-flop 710 which remains set. Thus, the setting of the complete flip-flop 1341 acts to step the program from time T3 to T10, skipping times T4–T9.

At T10, the further transfer of data from the price select board 1100 through the data transfer circuits DTA–DTC is inhibited as enabling gates 1701–1703 are inhibited as on input 10'S FF to gate 1702 becomes a logic 0. Moreover, gates 1851–1853 (FIG. 18) are disabled inhibiting data transfer gates of FIG. 14.

DATA TRANSFER TO MAIN ACCUMULATOR

As the program advances to time T10, the data present in the sub-accumulator 1050 will be transferred over data transfer circuits DTA–DTE to the main accumulator 1000. At T10, gate 1710 (FIG. 17) is disabled, enabling gate 1711 which, in turn, disables gate 1712 providing a logic 1 on lead TPB for enabling input source gates, such as gates D13-2, to D16-2, to pass the data in binary form on the leads, such as leads SA1–SA4, output from the sub-accumulator counters, such as counter 1055, to the binary-to-decimal counter 1610 of transfer circuits DTA.

In the present example, the digit five stored in the sub-accumulator units counter 1055 provides a logic output 1010 on leads SA1–SA4. Accordingly, gates D13-2 and D15-2 will be enabled providing ground on leads 1611 and 1613 input to the converter 1610. Converter 1610 will provide a ground or logic 0 at output 5 of the converter 1610 which is extended to input E1-e of coincidence circuit E1.

In a similar manner, the outputs representing the digit seven of sub-accumulator tens counter 1054 are passed to the coincidence circuit E-2 of transfer circuits DTB.

The transfer flip-flops F-1 and F-2 of data transfer circuits DTA and DTB will be enabled during times T10, ST1–ST5 and T10, ST1–ST7 respectively, as shown in the timing diagram, FIGS. 23b and 23c, in the manner described in the foregoing for the transfer of data to the sub-accumulator.

While the transfer circuits F1 and F2 are enabled, NOR gates 1801 and 1802 will be enabled, at the same time, to gate the output of the square wave generator to gates 1411 and 1415, respectively. These gates are enabled at time T10 of the item line scan program by a signal generated by gates 1420 and 1422. The logic 0 output of gate 1411 disables gate 1412 the output of which, through inverter 1413 and input circuit A-3 steps the main accumulator units counter 1015 at the rate of the square wave signal.

Similarly, the logic 0 output of gate 1415 disables gate 1416, the output of which, through inverter 1417 and input circuits C-6, steps the main accumulator tens counter 1016 at the rate of the square wave signal.

Thus, as shown in the timing diagram, FIG. 23f, during T10, ST1–ST5, the main accumulator units counter 1015 is stepped five times to register a count of five and the tens counter 1016, during T10, ST1–ST7, is stepped seven times to a count of seven. At ST5 and ST7 of T10 the transfer circuits F1 and F2, respectively are reset and serial data transfer gates 1801 and 1802 are inhibited.

Since the sub-accumulator counters 1051–1053 contain no data, no transfer will take place from the sub-accumulator counters 1051–1053 and the main accumulator 1000. It is pointed out that the sub-accumulator comprises five counters 1051–1055 while the main accumulator comprises only four counters 1015–1018. Counter 1051 is used to register data during the tax computation as will be explained and when the decimal point is shifted to the left two places to scale the tax data to the price data in the main accumulator the output of counter 1051 is transferred to main accumulator 1017 and thus, the fifth main accumulator counter is not required. In accordance with the embodiment of the electrical order pricing system described only a four digit total $99.99 can be accumulated in the main accumulator. The number of digits can be increased by the addition of appropriate data transfer circuits, counters and logic control gates.

Referring to FIG. 7, when the ten's flip-flop 710 is set, its set output is gated with the T0 output of the main program counter 400 by gates 712 and 713 to provide a signal T10. Output T10 enables gate 725 during the item line scan program, disabling gate 726 which provides a logic 1 at an input of gate 727. Gate 727 is set at ST15 to T10, disabling gate 728 which sets a 30's ready jump flip-flop 729.

As the sub-program counter 300 steps from ST15 to ST0, gate 731 will be enabled setting the 30's flip-flop 730. Setting of the thirties flip-flop 730 will act, in a manner similar to the setting of the tens flip-flop 710, to disable certain timing circuits and enable certain other timing circuits to effect print out of the pricing data on the sales check.

EXTENSION PRINT-OUT

After the line scan has been completed and the data transferred from the sub-accumulator 1050 to the main accumulator 1000 by way of the transfer circuits DTA–DTD, the quantity of items detected for line L3, and the total or extended price calculated for those items, i.e., the product of the quantity of items times the price set on the programmable price select board is printed out for each line.

Figure 20:
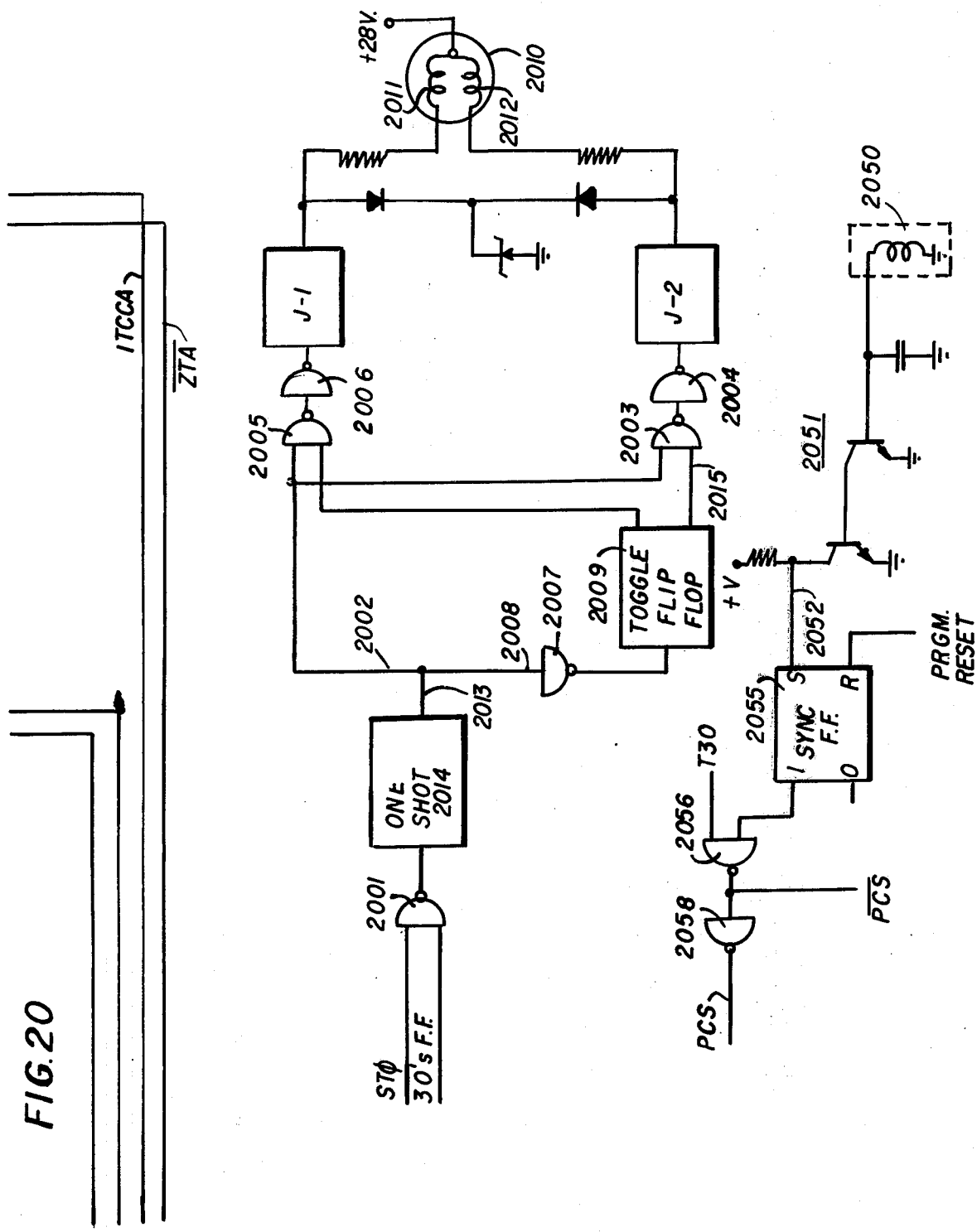

The printing apparatus, shown schematically in FIG. 20, includes a stepping motor 2010 for rotating a printing cylinder 83, shown in FIG. 1f, which has digits 0–9 disposed along its periphery in five columns. The cylinder 83 includes a rod 83b aligned with the zeros for providing a zero reference for the print cylinder. The stepping motor 2010, FIG. 20, is responsive to pulses received alternately from drivers J-1 and J-2 which are alternately energized by a toggle flip-flop 2009, associated logic gates 2003–2007, and a monostable multivibrator 2014 triggered in response to the enabling of a gate 2001. Accordingly, during the printing cycle, i.e., T-30–T-39 at each subtime ST-0 drivers J-1 and J-2 will be alternately energized causing the motor 2010 to rotate the print cylinder 83 a digit at a time.

Figure 19:
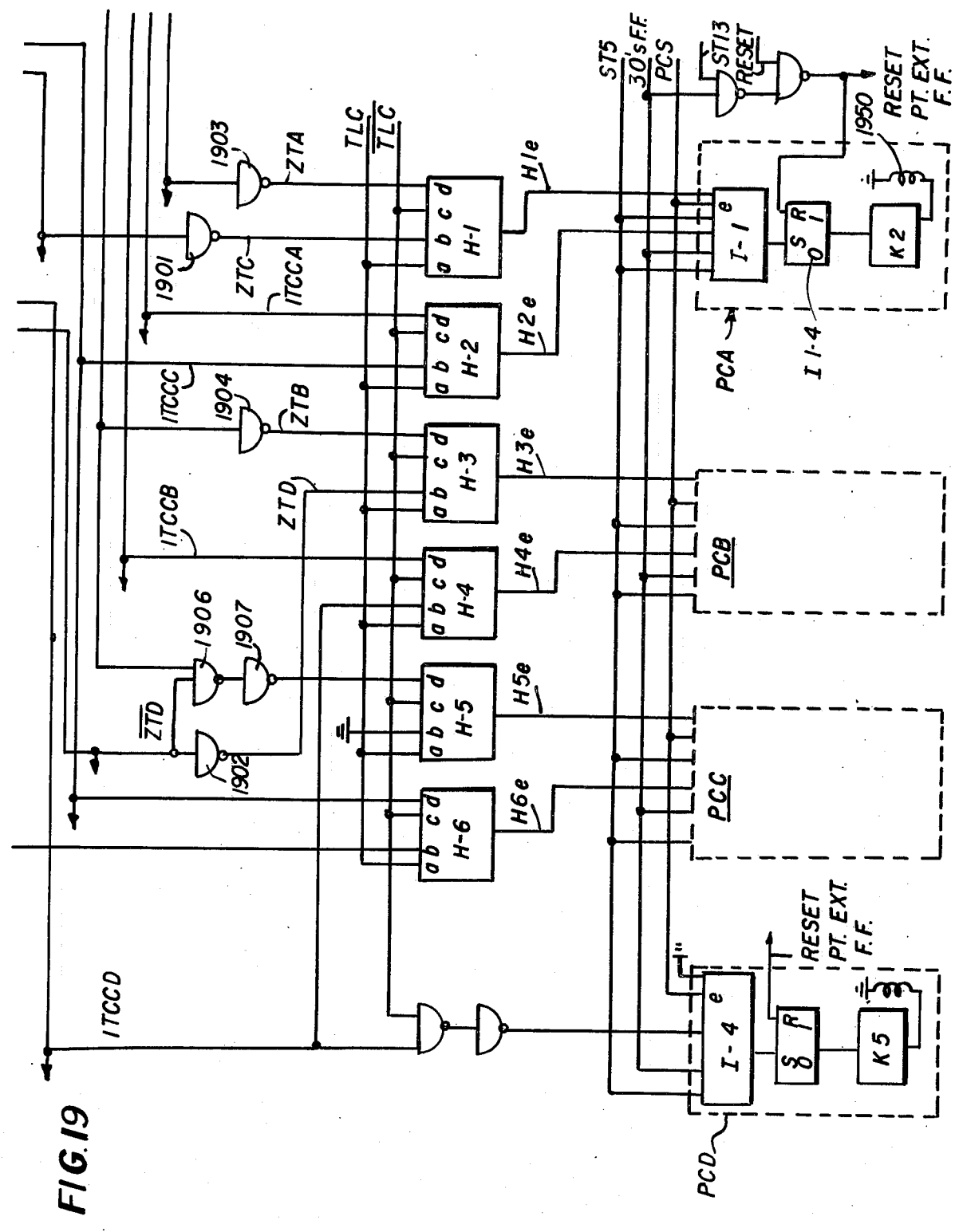

Printing solenoid driver circuit K1, shown in FIG. 13, and circuits K2–K5, shown in FIG. 19, will be energized in response to enabling of print control circuits H1–H6, I1–I4 and flip-flop 1314, FIG. 13, to selectively operate print hammers (not shown).

During time T-30, all the zeroes will be printed; then the print wheels will be rotated one digit and, during time T-31, all the ones will be printed, etc.

After the data has been transferred to the main accumulator during time T10, the item line scan program is jumped to time T30 as the thirties flip-flop 730 is set. The set output of the thirties flip-flop 730 through a capacitor C12, momentarily enables gate 323 which disables gate 320 resetting the main and sub-program counters. Also the reset output of the thirties flip-flop 730 disables gate 733 whereby the tens ready flip-flop 709 and the tens flip-flop 710 are reset.

The setting of the thirties flip-flop 730 disables gate 1710, FIG. 17 enabling gate 1711 which, in turn, disables gate 1712, providing a logic 1 signal on lead TPB during times T30–T39, which enables data input select gates, such as gates D13-B to D16-B of data transfer circuits DTA whereby the outputs of the sub-accumulator counters such as counter 1055 on leads SA1–SA4 are gated through the binary-to-decimal converter 1610 to the inputs of coincidence circuits E-1.

Since the sub-accumulator 1050 has registered seventy-five cents, a logic 0 will be provided on outputs seven and five of binary-to-decimal converters 1620 and 1610, respectively. These outputs will be gated through the coincidence circuits E2 and E1, respectively, to print control circuits H1 to H6 via leads ITCCA and ITCCB during time slots T7 and T5 of the printing cycle T30–T39.

The inputs of the data transfer circuits DTC–DTE are zero, and thus, the setting of transfer circuits such as shown in FIG. 22f, associated with circuits DTC–DTE will be inhibited, and logic 0 levels will be provided on leads $\overline{ZTC}$–$\overline{ZTD}$. Leads $\overline{ZTC}$ and $\overline{ZTD}$ are also extended to print control circuits H1 to H6. Leads $\overline{ZTC}$ and $\overline{ZTD}$ are extended to gates 1901 and 1902 respectively, the outputs of which are connected to inputs H1-b and H3-b of circuits H1 and H3 respectively. Circuit H1, shown in FIG. 22h, is comprised of two two-input NAND gates H1-1 and H1-2 having their outputs connected as inputs to a third NAND gate H1-3. Gates H1-1 and H1-2 are normally disabled and gate H1-3 is normally enabled providing a logic 0 at the output H1-e of circuit H1.

Outputs ZTA and ZTB are connected to the inputs H1-d and H3-d of circuits H1 and H3 through gates 1903 and 1904, respectively.

One of two enabling signals TLC or $\overline{\text{TLC}}$ is provided to inputs, such as inputs H1-a and H1-c, of circuits H1 to H6, respectively.

Circuits H1 to H6 are used to provide a shift of the decimal point two places to the right, during printout of the tax computed. During the item scan program, for example, data output from transfer circuits DTC and DTD are passed through control circuit H3 and H4 whereas during the tax program the data output from transfer circuits DTC and DTD are passed through circuits H1 and H2, respectively, the circuits which pass the outputs of transfer circuits DTA and DTB during the item scan program.

Data transfer circuits DTE do not provide a zero transfer output since a zero will not be printed as the first digit for the outputs of data transfer circuits DTC–DTE as will be shown.

In the present example in which the seventy-five cents is extended from the sub-accumulator 1050 to the coincidence circuits E1 and E2 of data transfer circuits DTA and DTB for enabling the printout circuits, the logic 0 levels on leads $\overline{\text{ZTC}}$ and $\overline{\text{ZTD}}$ of transfer circuits DTC and DTD disable gates 1901 and 1902. Output $\overline{\text{ZTD}}$ also inhibits gate 1906 from being enabled. The logic 1 output of gate 1906 is inverted by gate 1907, the logic 0 output of which acts as an inhibit to circuit H-5 which will prevent a zero to be printed in the third digit column (dollars) since the digit in the fourth column (tens of dollars) is also zero.

Referring to FIG. 13, the item quantity count circuit further includes item quantity extension print control circuits having a coincidence circuit E-7, which is similar to coincidence circuit E-1 shown in FIG. 22e, for detecting coincidence between one of the nine outputs of the decimal counter 1250, and one of nine timing pulses $\overline{\text{T31}}$ to $\overline{\text{T39}}$ generated by the main program counter 400.

Since in the present example the counter stopped at a count of three, and a logic 0 output on lead 1309 disables gate 1310 providing a logic 1 level on lead 1311 at an input to gate 1312. Gate 1312 which is enabled at ST5 of each time slot T30-T39 of the item line count program, at T33, ST5 sets a print extension flip-flop 1314, which enables a solenoid driver circuit K-1 shown in FIG. 22k which energizes solenoid coil 1320.

Referring to FIG. 20, after the thirties flip-flop 730 has been set, gate 2001 will be enabled at ST0 setting a monostable multivibrator circuit, or "one-shot" 2014 which provides a logic 1 level at its output; this output 2013 is extended over path 2002 to enable gate 2005, a second input of which is a logic 1, whereby drive circuit J-1, FIG. 22j, is enabled through gate 2006. Circuit J-1 is operative to energize a winding 2011 of the print motor 2010, which rotates the print cylinder, FIG. 1f, one step.

The output 2013 of the "one-shot" 2014 is also extended over path 2008 and gate 2007 to pulse a toggle flip-flop 2009, resetting the flip-flop 2009 thereby disabling gate 2005 such that energization of coil 2011 is stopped.

When toggle flip-flop 2009 is reset and a logic 1 is extended to over lead 2015 at an input of gate 2018. Gate 2003 will be enabled by the T31, ST0 when "one-shot" 2014 is set and accordingly when drive circuit J-2 is energized through gate 2004 a second winding 2012 of the motor 2010 will be energized stepping the print cylinder a second step.

As shown in FIG. 1f, the print cylinder includes a rod of magnetic material 83b which is rotated as the print cylinder is stepped around so that the various digits 0-9 can be aligned in succession with the print out area of the sales check.

When the zeros are aligned with the print-out area, the end of the rod 83b is adjacent a magnetic pick up head or sensing device 2050 shown schematically in FIG. 20 which provides an output to a level detecting circuit 2051. When such an output is detected, circuit 2051 provides a set output on lead 2052 which sets a sync flip-flop 2055, which when set indicates the zero characters of the print cylinder are aligned with the print out area of the sales check. The output of the sync flip-flop is gated with timing pulse T30 by gate 2056 to provide a signal $\overline{\text{PCS}}$ which is inverted by gate 2058 to provide a logic 1 level PCS.

The enabling of any print control circuits I1 to I4 and the stepping of the main program counter 400 will be inhibited during T30 by gate 450, FIG. 4 until the sync flip-flop 2055 has been set and signal $\overline{\text{PCS}}$ is logic 0.

When the sync flip-flop 2055 is set, a logic 1 applied to lead PCS is extended to inputs PCA-e to PCD-e of four print control circuits PCA–PCD, FIG. 19. Each print control circuit such as circuit PCA includes an input section, a section such as I-1, shown in FIG. 22i, comprised of two three input gates I1-1 and I1-2 the outputs of which are connected as inputs to a third gate I1-3, the output of which is connected to the set input of a print control flip-flop I1-4. If for example, a zero were to be printed in the cents column as indicated by a zero output from data transfer circuit DTA, circuit H-1 would be enabled and the logic 1 on lead H1-e and inputs PCS and ST5, would enable circuit I1-2 at ST5 setting print control flip-flop I1-4 and energizing print hammer solenoid driver K-2 causing a zero to be printed in the cents column of the sales check. All zeros are printed during time T30. The print control flip-flops of all the print control circuits PCA–PCD and flip-flop 1314 are reset during time ST13 of times T30-T39.

The setting of the sync flip-flop 2055 further causes gate 450 to be disabled and the output of gate 450, through gates 401–403, starts the main program counter which steps to T31.

At T31, ST0, the "one-shot" 2014 is triggered setting toggle flip-flop 2009 and energizing driver J-2 and consequently coil 2012 of stepping motor 2010, whereby the print cylinder 82 FIG. 1f, is rotated so that the digit 1's are aligned with the print out area of the sales check.

Referring to FIG. 17, NOR gates 1720–1738 generate enable signals, which represent $\overline{\text{T31}}$ and $\overline{\text{T39}}$ for coincidence circuits E1, E2, etc., for gating the data output from the sub-accumulator to the print control circuits H1–H6 and I1–I4. It is pointed out that main timing signals T31 to T39 are used in order to provide gating of the data to the print control circuits for a time long enough to accommodate operation of the printing apparatus. Timing signals $\overline{\text{T31}}$ to $\overline{\text{T39}}$ are also used to gate the output of the item quantity count counter 1250 through the coincidence circuit E-7 shown in FIG. 13, to set the quantity extension print flip-flop 1314.

The digits 1 through 9 will be printed during ST5 of times T31 to T39, respectively, as data outputs from either the sub-accumulator 1050 or the decimal counter 1250 are effective to enable corresponding print control circuitry. The enable circuits will be reset at ST13 of times T31 to T39.

Accordingly, the main program counter 400 will step from T31 to T33 while the print cylinder 83 stepped to align the threes with the print out area, at which time coincidence circuit E-7, FIG. 13, will be enabled and at ST5, extension print control flip-flop 1314 will be set via gates 1310, 1312, and 1313 enabling solenoid driver circuit K1 energizing coil 1320 to effect print out of the quantity three in the item quantity column of the sales check. At T33, ST15 the flip-flop 1314 will be reset.

When the start flip-flop 305 is reset, gate 513 FIG. 5 will be disabled and gate 510 will be enabled whereby the brake will be released and the clutch engaged so that the sales check will be advanced to the next item L4.

Thus, after the quantity and price extensions have been printed for Line L3, the program will continue the scanning of the remaining item lines L4–L53. Each time a quantity mark is detected coincidentally with a line mark, advancement of the sales check will be halted and the same program steps followed for line L3 will be duplicated for each line bearing item quantity indicia. The quantity of items for each line and the extended prices for each line will be printed on the sales check. The extended prices for all the items will be accumulated in the main accumulator.

In the present example, however, no other item lines have been marked. Thus, after L53 has been scanned, the total price in the main accumulator is seventy-five cents.

SUB-TOTAL PRINTOUT

At the end of the item sequence program, the system is scanning line L53, the last item row on the sales check. When the sales check is advanced so that line L54 is scanned, the sub-total program sequence is started. When line mark LI54 is detected by transistor 202, FIG. 2, whereby amplifier 215 provides the signal LIMA.

The signal LIMA steps the units line counter 901. At this time the output of units line counter is four and the output of the ten line counter is five. Thus, the logic 1 levels on leads LCD5 and LCU4 enable gate LG54 of line count matrix 800 providing a logic 0 on lead LCM54. This output LCM54 disables gate 811 providing a control signal STLC used to initiate the sub-total line count program.

The detection of line mark LI54 also causes signal LIMA-1 to be generated via delay circuit 243 and flip-flop 242.

When LIMA-1 and STLC are logic 1 gate 303, FIG. 3, is enabled, diabling gate 301 with the output of gate 301 momentarily enabling gate 304 through capacitor C3 whereby the start flip-flop 305 is set, enabling gate 510, disabling gate 513 so that the clutch is released and the brake is set so that further advance of the sales check is again temporarily inhibited.

The sub-program counter 300 will be stepped via gate 310 and at T0, ST1 the program reset flip-flop 1002 will be reset.

Since this program comprises only a print out procedure, at T0, ST15 the program will jump to T30 to initiate the printout cycle. Gate 723 is disabled when STLC is a logic 1. Thus, gate 724 connected to the output of gate 723 will be enabled when its second input ST15 is a logic 1. At ST15, the thirties ready flip-flop 729 will be set and as the sub-program counter steps to ST0 to thirties flip-flop 730 will be set. When the thirties flip-flop 730 is set, the sub-program counter 300 and the main program counter 400 are both reset and the outputs of the main accumulator 1000 are gated into the data transfer circuits DTA-DTD over leads, such as MA1 to MA4 for data transfer circuit DTA. Gate 1709 enables gate 1708 which disables gate 1705 providing a logic 1 on lead TPA which is extended to inputs such as D13e–D16e of data input select circuits D13–D16. Enable signal TPA is extended to date transfer circuit DTB–DTD. In this fashion the price data seventy-five cents stored in the main accumulator is passed to the binary-to-decimal converters such as converters 1610 and 1620.

The remaining portion of the subtotal program is similar to the printout portion of the item line scan program just described. The price data seventy-five cents stored in the main accumulator and passed to the binary-to-decimal converters 1610 and 1620 which provide outputs on leads 5 and 7 of the converters respectively, indicative of the price data being transferred. These outputs will be gates to the respective print control circuits H2 and H4 during times T35 and T37 and the print cylinder will be rotated one digit with each timing pulse T31–T39 such that at T35, when print control circuit PCA is enabled a five will be printed in the units column of the print out area, adjacent line L54 of the sales check. At time T37, a seven will be printed out in the tens column as print control circuit PCB is enabled. Thus, the printout on line L54, of the sub-total seventy-five cents stored in the main accumulator is effected. At T39 ST15, the program reset flip-flop 1002 will be reset causing reset of the following: the main program counter 400, the sub-program counter 300, the thirties flip-flop 729, the thirties flip-flop 730, and the start flip-flop 305.

When the start flip-flop 305 is set, the brake is released and the clutch engaged and the check in advanced to line L55.

TAX COMPUTATION PROGRAM

Upon detection of the line mark LI55 in the described above for the detection of line mark LI54, the start flip-flop 305 is set, clutch is released, and the brake is applied to temporarily halt advancement of the sales check.

The signal LIMA, generated in response to the detection of the line mark LI55 will step the line units counter 901 to a count of five whereby gate LG55 of the line count matrix 800 is enabled providing a logic 0 on lead LCM 55. This output disables gate 812 providing a control signal TLC used to initiate the tax line count program.

As in the previous programs the setting of the start flip-flop 305 will start the sub-program counter 300 and at ST1, the program reset flip-flop 1002 will be reset enabling the main program counter 400 to step to T1 as the sub-program counter steps from ST15 to ST0 in T0. During time T0 ST8, the sub-accumulator counters 1051–1055 will be reset.

Referring to FIG. 12, two tax rate selector switches 1200 and 1230 are set to predetermined values 0–9, to represent a whole number value and fractional number value for a sales tax to be computed based on the subtotal of the price stored in the main accumulator. If, for example, a tax rate of 5.3% were to be indicated, while percent tax switch contact 1222 would be set to five and the fractional percent tax switch contact 1236 would be set to three.

Portions of the tax computation program are analogous to portions of the item line scan program. For example, to determine the tax, the data in the main accumulator 1000 is transferred to the sub-accumulator 1050 via transfer circuits DTA-DTE a number of times indicated by the setting of the tax selector switches 1220 and 1230. Thus, for a tax of 5.3%, the data would first be transferred to the sub-accumulator five times. Then the data will be transferred to the sub-accumulator three times, however, during each of these three transfers, the data from the tens counter 1016 of the main accumulator will be transferred to the units counted 1055 of the sub-accumulator 1050, etc. to account for the decimal point.

WHOLE % TAX

During the data transfer, the decimal counter 1250 is stepped with each timing pulse T1–T9 and the outputs 1–9 of the counter are compared with the outputs 1T to 9T of the whole percent tax switch 1220 or 0.1T to 0.9T of the fractional percent tax switch 1230. At each coincidence 5 and 3 for example, the complete flip-flop 1341 will be set terminating the transfer of data by setting the ten's ready flip-flop 709 when the whole tax has been computed, or the twenties ready flip-flop 719 when the fractional % tax has been computed. In both cases, the main program counter 400 will be reset and intermediate timing pulses skipped.

By way of illustration, the whole percent tax selector switch 1220 has been set to indicate a tax of 1%. The fractional percent tax selector switch 1230 has been set to zero.

At T1, gate 1704, FIG. 17 will be enabled, disabling gate 1705 and providing enable signal TPA for gating the outputs of the main accumulator counters 1015–1018 on conductors MA–MD through the input select circuits, such as circuits D9–D16 of data transfer circuits DTB and DTA. The outputs on MC–MD are zero, and thus no transfer of data will be effected by transfer circuits DTC–DTD.

From T1–T9, input select circuits D9–D11 and D13 to D15 will be enabled by enable signal TPA and the binary outputs on leads MB and MA, respectively, to gate the contents of the main accumulator seventy-five cents to the binary-to-decimal converters 1620 and 1610 which will provide logic 0's on outputs 7 and 5, respectively, which are extended to circuits E2 and E1.

As in the item line count program flip-flops of circuit F1-F2 of data transfer circuits, DTA and DTB which have non-zero inputs will be set at T1-ST0, by signal STD output of gates 1739–1740, FIG. 17. Transfer circuit flip-flops of transfer circuit DTC–DTD are prevented from being set by the logic 0 output of associated binary-to-decimal converters which disable a gate similar to gate F14 of circuit F1, FIG. 22f.

However, since the input to data transfer circuits DTA is non-zero, the zero output Zin of converter 1610 is logic 1 and at T1, ST0 gate F14 will be enabled, setting flip-flop F1-A, providing a logic 0 on lead TDA. Similarly, a logic 0 will be provided on lead TDB of transfer circuit DTB.

Gates 1801 and 1802, FIG. 18 will thus be enabled by outputs TDA and TDB to gate the output of the square wave generator 312 to inputs of gates 1401 and 1405, respectively. Gates 1401 and 1405 are in turn enabled during T1–T9 by a signal generated by gates 1850–1851 and thus, the square wave signal is gated through gates 1401–1403 and 1405–1407 to sub-accumulator counters 1055 and 1054, through input circuits A-2 and C-3. Counters 1054–1055 will be stepped at the rate of the square wave as long as circuits F1–F2 are enabled.

Circuit F1 will be enabled until a reset signal on lead EN1 output from the coincidence circuit E1 resets flip-flops F1-A, FIG. 22f. Output EN1 is provided when coincidence is detected by circuit E1 between the output 5 of converter 1610 and one of the nine timing pulses $\overline{ST1}$-$\overline{ST9}$ generated by gates 1720–1738, FIG. 17, during each time slot T1–T9, and extended to data transfer circuits DTA–DTE.

Thus, circuit F1 will be reset at ST5 after the sub-accumulator units counter 1055 has been stepped five times to register a count of five. When circuit E1 is enabled and circuit F1 reset, gate 1801 is disabled.

Similarly, at ST7 after the sub-accumulator tens counter 1054 has been stepped seven times to register a count of seven, circuit F2 will be reset and gate 1802 disabled.

The sub-program counter 300 will continue stepping to a count of T1, ST14. At this time the contents (seventy-five cents) of the main accumulator 1000 has been transferred to the sub-accumulator counters 1054–1055.

During times T1–T9 of the tax line count program, gates 1201–1204, FIG. 12, are enabled to provide an enable signal at the output of gate 1201 which is extended to inputs, such as inputs S1d–S9d, of circuits S1–S9 (FIG. 22s) of the item quantity counter circuit to gate the output of the whole percent tax selector switch 1220 through one of the circuits S1–S9 during times T1–T9. Since the contact 1222 of the tax selector switch 1220 has been set at terminal 1223, to indicate a tax of 1%, +V is extended over lead 1224 through contact 1222 and terminal 1223 to conductor 1221 which is connected to input S1a of circuit S1. Circuit S1, shown schematically in FIG. 22s is comprised of three two-input NAND gates S1-1 to S1-3, having a common output S1-g. Inputs S1a and S1c of circuit S1 are inputs to gate S1-1 and S1-3 which will be enabled during T1–T9 of the tax line count program. Accordingly, a logic 0 is extended over lead S1-g to an input E6a of coincidence circuit E6. The outputs of the other circuits S2–S9 are extended to other inputs E6b–E6j of circuit E6. As shown in FIG. 22e, the inputs E6a–E6j and E6a'–E6j' are inputs to NOR gates E6-1 to E6-9. Inputs E6a–E6j are connected to outputs 1–9 of decimal counter 1250 which is stepped at ST14 of each time slot T1–T9 as gate 1251 is enabled by gate 1717 and signal ST14.

At T1, ST14, decimal counter 1250 is stepped providing a logic 0 at output 1 and due to the output of circuit S1, coincidence circuit E6 is enabled providing a logic 0 on lead E6k setting the complete flip-flop 1341. The setting of the completer flip-flop will set the tens ready jump flip-flop 709 FIG. 7, via gates 701–704 at ST15, and as the sub-program counter steps from ST15 to T1 to ST0, the tens flip-flop 710 will be set. Consequently, through gates 320 and 321, the main sub-program counters will be reset and the program will be jumped from T1 to T10 and further transfer of data responsive to the whole percent tax switch 1220 will be stopped. The complete flip-flop 1341 is reset at T10.

During T10–T19, the fractional percent tax based on the setting of the fractional percent tax switch 1230 will be calculated. Since the fractional tax is set at zero, the +V or logic 1 is passed over lead 1232 and contact 1231 to lead 1233 and extended to enable gate 750 FIG. 7 during T10 of the tax line count program. Consequently, the twenties ready jump flip-flop 719 will be set at ST15 through gates 751-752. As the sub-program counter steps from T10, ST15 to ST0, the twenties flip-flop 720 will be set then through NOR gate 721. Signals $\overline{T20}$ and T20 are derived from the output of flip-flop 720 by gates 722 and 723′. Since no fractional tax is to be computed, the program has jumped from T10 to T20. When the twenties flip-flop 720 is set, the twenties ready jump flip-flop 719 is reset through gate 720.

Digressing, if the whole percent tax switch 1220 had been set to zero, the logic 1 output over lead 1226 extended to gate 753 will enable gate 753 during T0 of the tax line count program. At T0 ST15 gate 703 will be enabled since gate 702 is disabled by gate 753, and through gate 704 the tens ready jump flip-flop 709 will be set. As the sub-program counter steps from T0, ST15, the tens flip-flop will be set through gate 711 effecting a jump in the tax computation program from T0 to 10 at which time a fractional tax if any, would be calculated. If, both the whole percent tax and the fractional percent tax are set to zero, the entire tax calculation program initiated by the detection of line mark LI55, can be bypassed. To this end, a tax program disable flip-flop 360 has been provided, FIG. 3, which can be set manually by circuit 361, inhibiting gate 302 which will in turn inhibit gate 301 from causing the start flip-flop 305 to be set when LIMA-1 is a logic 1 responsive to the detection of line mark LI55 associated with the tax line of the sales check. Tax disable flip-flop 360 can be set manually for each sales check in which case a reset circuit comprising gate 365 will reset the flip-flop 360 during the receipt program when $\overline{RLC}$ becomes a logic 0, or by the reset circuit 505 of FIG. 5. On the other hand, a manual set circuit 361 may provide a continuous set signal for flip-flop 360.

FRACTIONAL % TAX

If the fractional percent tax selector switch 1230 had been set to some value such as three to indicate 0.3%, the output 1236 of the tax switch 1230 for 0.3% would be extended to circuits S1-S9 during times T11-T19, and circuit S3 would be enabled during this time by a signal on lead 1211 output from NOR gate 1206 which would be enabled after T10 while the tens flip-flop 710 is set. Circuit S3 would provide an output on S3d which, after counter 1250 had stepped three times to a count of three, would enable coincidence circuit E6, setting the complete flip-flop 1341 at T13, ST14.

During times T11-T13, the outputs of the main accumulator would be gated through the data transfer circuits DTA-DTD in the manner described for the whole tax calculation, however, the data would be transferred three times, once each time slot T11-T13 to register a fractional percent tax of 0.3%. Moreover, a decimal point shift would be provided to scale the fractional percent tax to the same magnitude as the whole percent tax.

During T1-T19 while the outputs of the main accumulator are being gated through the transfer circuits DTA-DTD, gate 1851 is disabled and gate 1853 is enabled, disabling gate 1854 and providing a logic 1 input to gates 1440-1442. Accordingly when circuits F1-F2 of transfer circuits DTA-DTB are enabled and serial transfer gates 1801-1802 are enabled, the square wave signal is gated through gate 1802 associated with data transfer circuit DTB, transferring data from the main accumulator tens counter 1016, to gate 1442 which, when enabled will gate the square wave signal through gates 1402-1403 to the sub-accumulator units counter 1055. The output of the main units accumulator 1015 will not be gated to the sub-accumulator 1050 during T11-T19, while the fractional percent tax is being computed. Similarly, the outputs of the main accumulator hundreds counter 1017, representing dollars, and the outputs of the main accumulator thousands counter 1018, representing tens of dollars, will be transferred to the sub-accumulator tens counter 1054 and hundreds counter 1053, respectively to effect the shift of the decimal point one place to the left.

During the computation of the whole or fractional percent tax figures whenever a sub-accumulator counter such as units counter 1055, steps from nine to zero, the transfer carry circuit, such as circuit G-1 is enabled, setting an associated transfer carry flip-flop 1811 in the manner described in the item line count program, and the next higher sub-accumulator counters 1054-1051, such as tens counter 1054, will be stepped during times ST10-ST13 to effect the carry transfer.

Returning to the example, the tax 0.0075 cents based on the settings of the tax selector switches 1220 and 1230 has been transferred to the sub-accumulator counters with the ten counter 1054 registering the seven and the units counter 1055 registering the five. It is pointed out that the same accumulator counter 1000 and 1050 and data transfer circuits DTA-DTD have been used to calculate the tax and thus, the tax registered in the sub-accumulator appears as 0.75 or seventy-five cents. The tax program includes a sequence of operations for shifting the decimal two places to the left so that the value of the tax calculated is scaled to the magnitude of the sub-total stored in the main accumulator for the order being priced. This shift is provided during time T21 of the tax program. In addition, a tax round-off sequence is provided during time T20, prior to the decimal point shifting operation, in which the tens digit of the tax figure in the sub-accumulator, a seven in this example, is compared in a tax compare circuit 1615, FIG. 16, and if the digit is equal to or greater than five, a one is added to the sub-accumulator hundreds counter 1053.

TAX ROUND OFF

At T20 ST0 the outputs of the sub-accumulator counters are gated through the input select circuits of the data transfer circuits DTA-DTE when gates 1712-1713 are enabled providing a logic 1 on lead TPB.

The contents of sub-accumulator tens counter 1054, which is seven, is extended over leads SB to data source circuits D9-D12 with circuits D9-D11 being enabled providing logic 0 levels on outputs 1621-1623. A logic 1 is present on output 1624 of circuit D12. Output 7 of binary-to-decimal converter 1620 is logic 0, and outputs 0-6 and 8-9 are logic 1.

Leads 1623-1624 are extended to NAND gate 1626 which is disabled by the logic 0 on lead 1623. Gate 1626 will be disabled, providing a logic 1 output whenever the contents of sub-accumulator counter 1054 is four or greater by virtue of the logic 0's present in the binary coded representations of the digit four to nine which are inverted by circuits D9-D12. Thus, gate 1626 provides a way of determining whether or not the contents of the sub-accumulator tens counter 1054 is equal to or greater than four. The output of gate 1626 is connected to an input of gate 1627.

A second input to gate 1627 is connected via lead 1628 to output 4 of binary-to-decimal converter 1620.

The output on lead 4 is a logic 1, unless the contents of the sub-accumulator is four in which case output on lead 1628 provides a way of determining whether or not the contents of the sub-accumulator tens counter 1054 is equal to four. Together these outputs to gate 1627 indicate whether or not the contents of the sub-accumulator tens counter 1054 is equal to or greater than five.

Since both of these inputs to gate 1627 are logic 1, gate 1627 is enabled a T20 ST10, disabling gate 1628 and momentarily extending a logic 1 to lead GB through capacitor C16. Output GB is extended to transfer carry flip-flop 1812, setting the flip-flop 1812.

The output of flip-flop 1812 is extended to gate 1438 which will be enabled during T20 when gate 1852 is disabled. Thus, the output of transfer carry flip-flop 1812 will be extended through gates 1438 and 1440 to gate 1433, which will be enabled at T20 ST11 gating a pulse to the sub-accumulator hundreds counter 1053, stepping the counter 1053 one count. Thus, since the tens digit, seven in this example, is greater than five, the tax round off circuit 1615 caused the next higher sub-accumulator counter, the hundreds counter 1053 to be stepped one count to effect the round off of the tax figure. The sub-accumulator now contains the binary representation of 1.75. The tens and unit digits seven and five will be shifted out of the sub-accumulator during the shift operations in time T21 at which time the digit one in the hundreds counter 1053 will be shifted to the units counter 1055 to represent the total tax of one cent.

Since at T20, ST11 the outputs of the sub-accumulator are gated to the transfer carry circuits of all the data transfer circuits DTA-DTE, any further carrier caused by the tax round off operation can be completed. Thus, the outputs of carry transfer flip-flops 1813-1814, controlled by transfer circuits DTC-DTD, will be gated to sub-accumulator counter 1052-1051 at times T20, ST12 and T20, ST13, respectively.

At T20 ST15, the main program counter will step to T21, ST0. Signal T21 is generated by gates 760-761 connected to the output of the main program counter 400 and the twenties flip-flop 720.

TAX DECIMAL POINT SHIFT

The total tax stored in the sub-accumulator will be transferred via data transfer circuits DTA-DTE to the main accumulator during T21 to be added to the sub-total stored therein.

At T21, ST0, gates 1712-1714 generate a logic 1 on output TPB to gate the outputs on leads SA-SE into the data transfer circuits DTA-DTE. Accordingly the digit one stored in hundreds counter 1053 the digit seven of tens counter 1054 and the digit five of units counter 1055 will be gated through the input select circuits of data transfer circuits DTC-DTA to provide inputs to coincidence circuits, such as circuit E1 of data transfer circuits DTA with such inputs being a one for circuits DTC, a seven for circuits DTB and five for circuits DTC, a seven for circuits DTB and five for circuits DTA. The zero contents of counters 1051-1052 will inhibit data transfer circuits DTD-DTE.

Data transfer circuits DTA-DTC will provide a logic 0 level on leads TDA-TDC in the manner already described for transfer of data via the data transfer circuits.

Serial transfer gates 1801-1803 associated with transfer circuits DTA-DTC will be enabled during T21 by the outputs TDA-TDC of circuit DTA-DTC, and the square wave signal will be passed to the inputs of gates 1411, 1415, and 1418; however, these gates are inhibited during time T21. The output of gate 1803 is also extended to gate 1419 which is enabled at T21, gating the square wave signal to the main accumulator units counter 1015 through gates 1412-1413.

Gate 1803 will remain enabled until T21, ST1 allowing the main accumulator units counter to be stopped once from five to six. At T21, ST1, coincidence will be detected between the data input, binary coded one and timing signal ST1 resetting circuit DTC and disabling gate 1803. The sub-program counter will continue stepping to T21 ST9, resetting the other data transfer circuits. The main accumulator now stores seventy-six cents, the total of the extended item prices and the corresponding 1% tax.

During T21, ST10-T21, ST13, any carries occuring due to adding the tax to the sub-total in the main accumulator will be effected. During times T21 ST1-T21 ST9 while the transfer of data is being made, the main accumulator outputs on leads MA-MD are continuously gated to carry circuits such as G1 of transfer circuits DTA, and, in the manner described in the item count program, whenever a counter 1015-1018 as the main accumulator steps from nine to zero, the associated carry circuit is enabled, setting a transfer carry flip-flop 1811-1813. The outputs of these flip-flops will be gated to the main accumulator via gates 1470-1478 during T21, ST10-T21, ST13.

At T21 gate 762 will be enabled disabling gate 726. Then at T21, ST15 gate 727 will be enabled, setting the thirties ready jump flip-flop 730 and as the sub-program counter steps from ST15 to ST0, the thirties flip-flop 730 will be set.

TAX PRINTOUT

During T30-T39 of the tax computation program the printout of the total tax stored in the sub-accumulator will be effected.

The printout of the tax figure stored in the sub-accumulator is done through a series of operations which are similar to the printout of price extensions on the sales check, with the tax figures being gated through the data transfer circuits DTA-DTE during T31-T39 when gates 1712-1713 provide a logic 1 on output TPB. Once the inputs to transfer circuits DTD-DTA are 0, 1, 7, 5, coded in binary form, respectively, circuits DTA-DTD will gate, a logic 0 to output $\overline{ZTD}$. Circuits DTC-DTA will provide logic 1 outputs on leads ITCCC at T31, ITCCB at T37, and ITCCA at T35.

Outputs $\overline{ZTD}$-$\overline{ZTA}$ and ITCCE-ITCCA are extended to print control gate-circuits H1-H6. However, control signal TLC gates the outputs of data transfer circuits DTE-DTC to print control circuits PCD-PCA, respectively. The outputs of transfer circuits DTB-DTA are not gated to print control circuits.

Accordingly, the zero input of transfer circuit DTD is gated to print control circuits, PCB during T30, and the data input of one to transfer circuit DTC is gated to print control circuit PCA during T31. The printing of zero in the third digit column is inhibited by grounding the input of print control gating circuit H5.

As in the steps of the printing sequence described for the printing of the extended prices on the sales check the "one-shot" 2014, FIG. 20, is stepped at ST0 during times T30-T39 alternately energizing drive circuits J-1 and J-2 which cause the print motor 2010 to be stepped rotating the print cylinder 82. The main program counter 400 will be inhibited until the sync flip-flop is set responsive to detection of rod A3 of the print cylinder 82 being rotated to align the zero's of the print cylinder with the printout area of the check.

At T30, ST5 after the sync flip-flop 2055 has been set, a zero is printed on the check in the tens column of line L55 and at time T31, ST5 a one is printed on the check on line L55 in the units column. At ST13 of each time slot T30-T39, the print control circuits PCD-PCA are reset to prevent erroneous printed out in subsequent time slots.

In summary, during T30-T39 the outputs of hundreds counter 1053 and tens of hundreds counter 1052 of the sub-accumulator 1050 were gated to the units and tens print control circuits PCB-PCA and at T30 the contents of counter 1052, zero, was printed in the tens column of the sales check and at T31, the contents of counter 1053, one was printed in the units column of the check.

GRAND TOTAL PROGRAM

At the end of the tax computation program during time T39 sub-time ST15, the program reset flip-flop 1002, the start flip-flop 305, the 30's flip-flop 730, and the main and sub-program counters are reset. The brake is deenergized and the clutch is energized and the sales check advances to line L56, the line of the sales check on which the grand total, the total of the subtotal and the tax which is registered in the main accumulator will be printed.

When line mark LI56 is detected by the line mark scanning apparatus, the line units counter is stepped from a counter of five to a count of six, and the outputs of the line units counter 901 and tens counter 902 are extended to the line count matrix 800 enabling gate LG56 providing a logic 0 on lead LCM 56. Lead LCM 56 is connected to enable gate 813, providing a logic 1 output GTLC, a control signal used to initiate the grand total line count program.

The line mark signal LIMA further causes output LIMA-1 to be generated by setting flip-flop, and LIMA-1 together with the output of gate 313 enable gate 303 providing a logic 0 at its output which, in turn, disables gate 301, enabling gate 304 and setting the start flip-flop 305, through gate 306. When the start flip-flop 305 is set the motor is stopped as the brake is applied and the clutch deenergized, as described above. Th sub-program counter 300 is clocked and the grand total program sequence is initiated.

During the grand total program sequence, the outputs of the main accumulator 1000 will be transferred to the print control circuits H1-H6 and I1-I4, and the contents of the main accumulator will be printed on line L56 of the sales check.

Since there is no computation in the grand total program sequence, the program will at T0, ST15 jump from T0 to T30 for the print-out cycle. Referring to FIG. 7, when output GTLC is generated gate 723 will be disabled extending a logic 1 output to gate 724. At T0, ST15, gate 727 will be enabled disabling gate 728 providing a logic 1 at its output which sets the 30's ready-jump flip-flop 729. When the program steps from ST15 to ST0, the 30's flip-flop 730 will be set causing the main and sub program counters to be reset whereby counts T30-T39 will be generated.

During T30, ST0, the outputs of the main accumulator counters 1015-1018 will be gated into the input section of the data input transfer circuits DTA-DTD. The main accumulator 1000 is storing seventy-six cents representing the total of the extended price and the sales tax. Accordingly, the inputs to circuits D6 through D12 of data transfer circuits DTB will be a binary representation 1110 of the digit 7, and the inputs to circuits D13 of data transfer circuits DTA through D16 will be a binary representation 1010 to the digit 6. These inputs are gated into the binary-to-decimal converters 1620, 1610 during times T30-T39 by gates 1703-1709 FIG. 17.

Gate 1709 is disabled during the grand total line count program and a logic 1 at its output together with an input 30's F, F enabled gate 1708 and a logic 0 is provided at the output of gate 1708. The output of gate 1708 disables gate 1705 providing the logic 1, output TPA is used to gate the outputs of the main accumulators through the input circuits D9-D16 of the data transfer circuit DTB and DTA. The data transfer circuits DTC-DTE have zero inputs.

The outputs of the circuits D9 through D16 are fed to the binary-to-decimal converters 1620-1610 and logic 1's are provided on output 7 of converter 1620 and on the output 6 of converter 1610. The outputs of converters 1610 and 1620 are extended to the coincidence circuits E1 and E2, respectively.

The output of the binary-to-decimal converter 1610 is gated through the coincidence circuit E1 during times T36, and output converter 1620 is gated through circuit E2 during T37.

During time T36 circuit F1 is set providing a logic 1 output on lead ITCCA which is fed to input D of circuit H2, FIG. 19, during time T36, enabling circuit H2. The output of circuit H2 is extended to print control circuit PCA which will be enabled, at time ST5 with driving circuit K2, energizing the solenoid coil 1950 to print out a six.

Similarly, during time T37, a seven will be printed when the output ITCCE of transfer circuit DTB through circuit H4 to enable print control circuit PCB to effect the print out. The main program counter will continue to step to T39, and at time T39 ST15, the program will be reset, resetting the program counters, the start flip-flop, etc., thus energizing the clutch and releasing the brake.

RECEIPT PROGRAM SEQUENCE

As the motor continues to advance the sales check through the unit, the line mark sensing circuit scans lines L57 and L58 stepping units line counter 901 to a count of eight at which time a sequence of programmed operations, similar to the grand total program, will occur to print the grand total again adjacent line L58 to provide a receipt for the customer order as priced by the unit.

Upon detection of line L58, a command RLC is generated at the output LCM58 of the line count matrix 800 by gate 814 of the line count matrix 800. The start flip-flop will be set and advancement of the sales check will be halted.

During times T30 to T39 of the customer receipt program, the outputs of the main accumulator are gated into the data transfer circuits DTA-DTD, and at T36 and T37 the contents of the main accumulator units and tens counters 1015-1016, seventy-six cents, will be extended to the print control circuits PCA-PCB as described above in the grand total program. The grand total will be printed on line L58 of the sales check. The lower portion of the sales check is perforated so that the receipt can be torn from the sales check and presented to the customer.

At the end of the receipt program sequence at T39, ST15, the start flip-flop will be reset and the sales check will be advanced further and will continue through the unit being returned to the waitress by way of the sales check return slot 43.

ERROR DETECTING CIRCUITRY

A lost scan output can occur any time from T1–T9 of the item line count program is the line scan circuits 200 are disabled or for some other reason the scan output S01–S09 originally detected and which caused the item line scan program to be initiated has been lost. If the program were to continue, under these conditions, the sales check would be erroneously priced.

Accordingly, a NAND gate 1060 is normally disabled during T1–T9 of the item line scan program if scan output is detected and signal $\overline{SOD}$, generated by gates 251–260, is a logic 0. During the line scan portion $T_1$–$T_9$ of the program, if the output, one of outputs S01–S09 which was detected becomes logic 0, the gate of gates 251–259 which had been enabled, will be disabled and $\overline{SOD}$ will become a logic 1 and gate 1060 will be enabled. The output $\overline{LOSO}$ of gate 1060 is connected to an input of gate 1007 and which, in turn, is connected to the set input of the program reset flip-flop, 1002, which will reset the program counters 300 and 400 and the start flip-flop 305 to advance the sales check part the line on which the lost scan occured.

Figure 9:
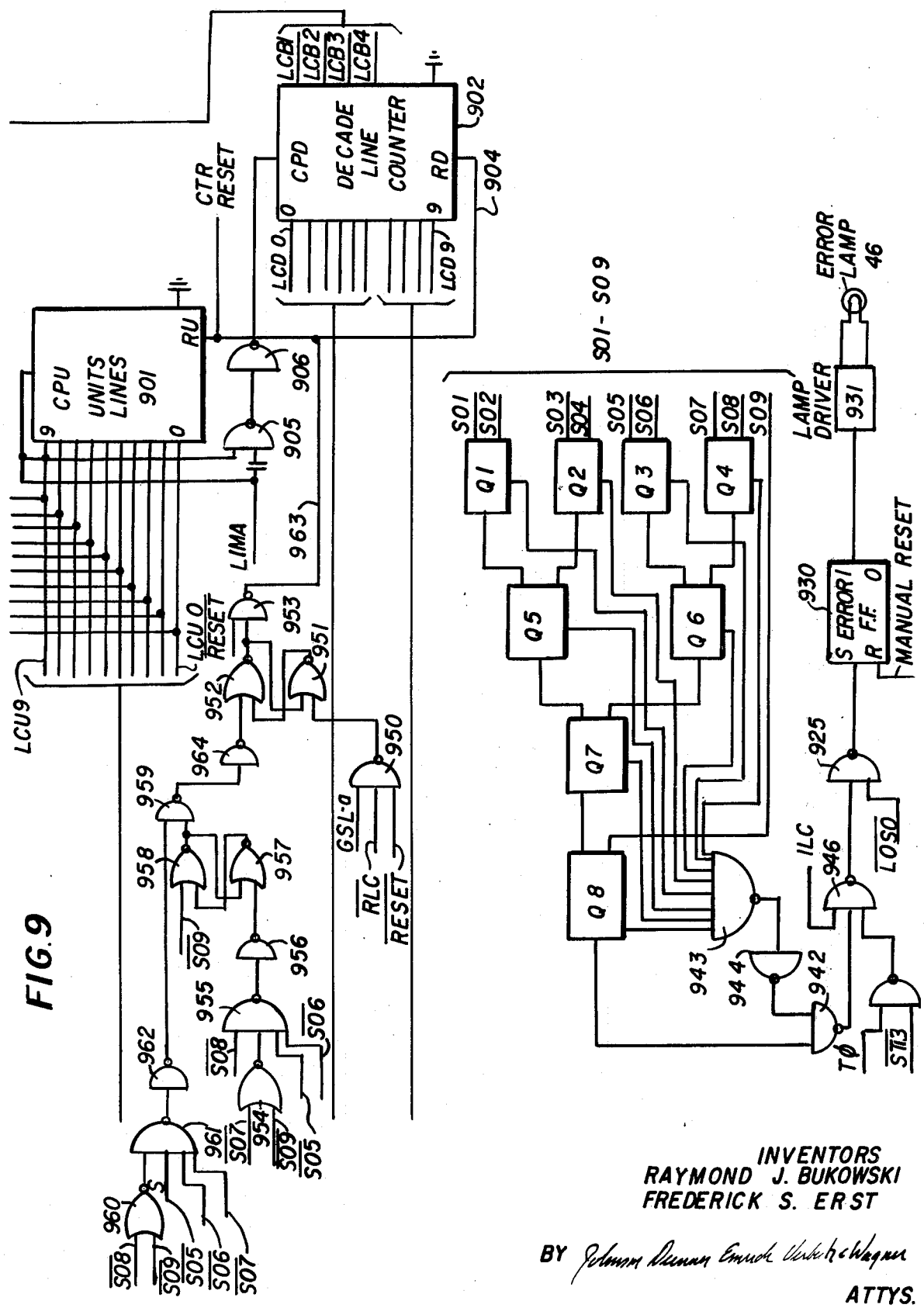

The logic 0 output $\overline{LOSO}$ of gate 1060 is also extended to an input of a gate 925, FIG. 9, for setting an error flip-flop 930. When the error flip-flop 930 is set, a lamp driver 931 is energized lighting the error indicator lamp 46 located on the front panel of the unit, FIG. 1b. The error lamp 46 will remain lit until the error flip-flop 930 is reset.

Error detecting circuits shown in FIG. 9 are provided for detecting the presence of more than one item quantity indication mark on any line of the sales check.

The multiple scan detecting circuits are essentially comprised of a plurality of NAND gates which provide an "exclusive-OR" function for "NANDING" the nine scan outputs S01–S09 and providing an output whenever more than one of these outputs is a logic 1.

Referring to FIG. 9 in conjunction with FIG. 22q, the multiple scan circuit includes eight identical stages Q1–Q8. Whenever both inputs A and B of a section Q1–Q8 are logic 0, output C is logic 1 and output D is logic 0. Whenever one of the inputs A or B is a logic 1, both outputs C and D are a logic 1. When inputs A and B are both logic 1, both output C and D are a logic 1.

If, for example, line L3 is being scanned, an output, logic 1, is present on lead S03. Inputs A and B to circuits Q1, Q3, Q4 and input Q2B will be a logic 0, and input Q2A will be logic 1. Accordingly, outputs Q1D, Q3D and Q4D are logic 0 and output Q2D is logic 1. Since inputs A and B of circuit Q5 are the outputs Q1D and Q2D, logic 0 and logic 1, circuit Q5 will have a logic 1 at its output Q5D. Circuit Q6, the outputs of which are both logic 0, will have a logic 0 on output Q6D. The inputs to circuit Q7 are outputs Q5D, logic 1 and logic 0, respectively, and thus Q7D will be logic 1.

The inputs to circuit Q8 are the logic 1 output of circuit Q7 and the logic 0 on lead S09, and thus output Q8D of circuit Q8 is a logic 1. The output of circuit Q8 is connected to an input of gate 942. A second input to gate 942 is the output of gate 943 which has eight inputs connected to outputs Q1C–Q8C all of which are logic 1. Accordingly gate 942 is enabled at its logic 0 output, inverted by gate 944 enables gate 942, disabling gate 946 and providing a logic 1 input to gate 925, which is enabled and the error flip-flop 930 is not set.

If two scan outputs S01–S09 were logic 1, gate 943 would be disabled setting the error flip-flop 930 at T0, ST13 through gates 944, 942, 946, and 925, and lighting error lamp 46.

INVENTORY CONTROL CIRCUIT

The electronic pricing control apparatus further includes inventory control circuitry 600 shown in FIG. 6, responsive to item quantity indications for each item line for registering the number of items ordered by each customer to provide a record of the total quantity sales of each menu item.

The inventory apparatus control circuits 600 include a matrix 601 of fifty-one counters or visual indicators one for each of the item lines L3 to L53 provides on the sales check 20. Each counter includes a stepping coil ICM3–ICM53. The fifty-one coils ICM3–ICM53 are arranged in a six by ten matrix to simplify selection of an indicator to be stepped to register a quantity of an item which has been ordered.

The designation of which coil is to be energized is effected by the line counters 901 and 902, and the inventory sounter selected is stepped a number of times equal to the quantity marked on the item line of the sales check. The pulsing of the stepping coils is controlled by an inventory counter 610, a pulse gate flip-flop 635, and gates 611–629.

The inventory counter coils ICM3–ICM53 are arranged in a six by ten matrix with the coils in each column, such as coils ICM3–ICM10, having a lead such as lead P1b connected to contacts such as contact 660a of relay 660 of one of six column select relays 660–665. Each of the six column select relays 660–665, when energized, connects +VB volts to a lead of the coils in the corresponding column.

The relays 660 through 665 are, in turn, energized by a binary-to-decimal converter 666, which is controlled by the line decade counter 902. The inputs to the binary-to-decimal counverter select one of six columns of the inventory control matrix 600. Each of the six rows represents a count decade units, tens, fifties of the line count. Thus, if the line count is in the zero decade, counts 0–9, relay 660 will be energized and +VB will be extended to coils ICM3–ICM10. The coils in each row, such as coils ICM3, ICM13, . . . LCM53, have a lead such as lead P3a connected to one of ten row select circuits P1–P10 such as circuit P3.

A ground is connected to the coils ICM3–ICM53 by one of the ten circuits P1–P10. Circuit P1, for example, shown in FIG. 22p, comprises a 2 input NOR gate P1-A, one input of which is connected to an output 1 of the line decade counter 901 and the second input of which is connected to an output of an inventory pulse gate flip-flop 635 through gate 627.

The inventory pulse gate flip-flop 635 is set during the time T0, ST1, and the positive output of the pulse gate flip-flop 635 will gate nine even output counts T0, T2, T4 T6, T8, T10, T30, T32, and T34 of the main program counter to the inputs of circuits P1–P10 as long as the flip-flop 635 is set. The pulse gate flip-flop 635 will be reset upon detection of coincidence between the energized output S01–S09 of the scanning apparatus 200 and an output 1–9 of an inventory counter 610. The counter 610 is stepped by the nine odd counts of the main program counter 400, T1, T3, T5, T7, T9, T31, T33, T35 and T37.

Both the item quantity scan cycle T0-T10 and the print out cycle T30-T39 are used for stepping the inventory counters.

By way of illustration, when the quantity mark in box three is detected for line L3 during the item line scan a logic 1 will be present on output S03, and as has already been described, the program counters will begin to count T0-T39, and ST0-ST15. At time T0, ST0, the decade counter 902 will have logic 0 outputs on leads LCB1-LCB4 and the line units counter 901 will have a logic 0 at output LCU3 input to circuit P3, to indicate a count of three. Leads LCB1-LCB4 are extended to inputs of a binary-to-decimal converter 666 through gates 667-670. The output of line decade counter 902 is zero and hence, relay 660, connected to the zero output of converter 666 will be energized, and +VB will be applied to coils ICM3-ICM10 of the inventory control counter matrix 600.

At T0, ST1 of the item line scan program NAND gate 623 will be enabled providing a logic 0 at its output, which through NOR gate 624 will set the inventory control pulse gate flip-flop 635 providing a logic 1 at its set output. This set output is extended to gate 629 and gate 627. Also, at T0 ST1, since main accumulator output MCO is logic 0, gate 626 will be disabled and gate 627, connected to the output of gate 626 will be enabled providing a ground on lead IC0 thereby enabling circuit P3, and energizing coil ICM3 to step the counter once.

At T1, ST0 gate 626 will be anabled disabling gate 627 and circuit P3 whereby coil ICM3 is deenergized. Gate 629 will be enabled by the output of program counter 902 which is a logic 1, and the inventory counter 610 will step to a count of one.

In a similar sequence during T2, the coil ICM3 will be pulsed a second time and during T3, the inventory counter will be stepped to a count of two.

However, also during time T3, the item line count program will have completed the items quantity count, three and the program will jump to T10. At T10 an even count of the main program counter 400, the coil ICM3 will be pulsed a third time. At T31, the inventory counter 610 will be stepped a third time, and the logic 1 signals on leads S03 and output C13 of the inventory counter 610 will enable NAND gate 616. The logic 0 output of gate 616 disables gate 625, resetting the pulse gate flip-flop 635. Thus, further pulsing of coil ICM3 of the inventory counter matrix 600 is inhibited. When the pulse gate flip-flop 635 is reset, the inventory counter 610 will also be reset by the reset output of the pulse gate flip-flop.

In subsequent scans, the pulsing coils ICM4-ICM53 of the inventory counters of matrix 600 will be controlled in accordance with the line mark LM4-LM53 being detected by the scanning apparatus 200 which, in turn, will provide appropriate outputs of the line mark counters 901 and 902 to selectively energize the coils of the matrix 600.

Two other inputs for resetting the pulse gate flip-flop 635 are from the reset circuit 505 of FIG. 5, and lost scan output detected $\overline{LOSO}$ of gate 1060, FIG. 10. These reset signals are gated to the pulse gate flip-flop via gate 611-613.

CONTROL MARK FUNCTION

Referring to FIG. 1a, the card 20 includes control indicia in the item quantity area of lines L0-L2. Line L0 includes a printed mark in columns nine and seven; line L1 includes a mark in column nine; and line 12 includes marks in columns eight and nine.

These marks are detectable by the line scan apparatus 200 particularly transistors 209-211 which effect the setting of flip-flops 237-239 respectively, in response to the detection of a mark as the card is moved through the transport. These control marks are used to provide various control functions for the electronic order pricing system and by way of illustration are described with reference to an application for effecting the rest of the line units and decade counters as the initial step in an order card pricing operation.

Referring to FIG. 9, the ouputs $\overline{S05}$-$\overline{S09}$ of scan detector flip-flops 235-239 and signals GSL-a, $\overline{RLC}$, and $\overline{RESET}$ are combined logically by a series of NAND and NOR gates 950-962 to provide a control signal for resetting the line counters 901 and 902.

In operation, before a card is inserted into the transport, signal GSL-a is a logic 0. Thus NAND gate 950 is disabled, disabling a NOR gate 951 having an input connected to the output of gate 950, and a logic 0 is provided at the output of gate 951. This output is extended to an input of a NOR gate 952 which is enabled at this time, providing a logic 1 at its output which is extended to a NAND gate 953 which is enabled, providing a logic 0 on lead 963 connected to the reset input RU of line unit counter 901 and over conductor 904 to the reset input RD of line decade counter 902.

When a data card or sales check is inserted into the transport unit, the microswitch 78 is operated disabling relay GSL and providing a logic 1 on lead GSL-a, causing gate 950 to be enabled and providing a logic 0 on one input of gate 951. Gate 951 remains disabled by the logic 1 output of gate 952 which is extended to a second input of gate 951.

When the card has been advanced into the unit so that line L0 is positioned under the scan apparatus 200, the marks in the ninth and seventh quantity columns of line L0 will be detected and flip-flops 237 and 239 will be set providing logic 0 levels on leads $\overline{S07}$ and $\overline{S09}$. It is pointed out that the error lamp 46 (FIG. 9) will not be lit in response to the detection of multiple scan quantities since the controlling logic gates, including gate 946 require the item ine count signal ILC to be a logic 1, and this signal is not generated until the line indicia LI-3 is detected.

When outputs $\overline{S07}$ and $\overline{S09}$ become logic 0, a NOR gate 954 is enabled and the logic 1 output of gate 954, extended to a NAND gate 955 enables gate 955. The output of gate 955 disables NAND gate 956 providing a logic 1 at an input of a NOR gate 957 which is thus disabled. The logic 0 output of gate 957 is extended to an input of a NOR gate 958. A second input of NOR gate 958 is a logic 0 and gate 958 is enabled, providing a logic 1 at its output. This output is extended to a second input of gate 957 to inhibit the enabling of gate 957. The output of gate 958 is further extended to an input of a NAND gate 959 which is disabled at this time by a second input.

As the card is advanced further so that line L1 is adjacent the scan apparatus, the mark in the ninth quantity column of line L1 is detected and output $\overline{S09}$ continues to be a logic 0 level. Gate 954 is disabled; however, gate 958 remains enabled and a logic 1 is present at one input of gate 959.

The card is advanced to position line L2 adjacent the scanning apparatus to detect the marks in columns eight and nine of line L2, setting flip-flops 238 and 239 to provide logic 0 levels on outputs $\overline{S08}$ and $\overline{S09}$. Accordingly a NOR gate 960 is enabled, enabling a NAND gate 961 having an input connected to the output of gate 960. The output of gate 961 is connected to the input of a NAND gate 962 which is thus disabled by gate 961 providing a logic 1 at its output. The logic 1 output os gate 962 is extended to a second input of gate 959 enabling gate 959 and providing a logic 0 level at its output which is extended through an inverter gate 964 to a second input of gate 952 which is then disabled, providing a logic 0 at its output and an input of gate 953, disabling gate 953 and providing a logic 1 level on leads 963 and 904 for resetting the line units counter 901 and the line decade counter 902.

As the card is advanced to line L3, gates 954 and 960 are disabled, gate 959 is disabled gate 953 is again enabled, providing a logic 0 level on the reset leads 963 and 904.

While the above control function has been described with reference to an application for resetting the line counters immediately prior to the start of the item line scan program of an order pricing operation, it is apparent that the control signal providing could be used to effect the control of other circuits or apparatus of the electronic order pricing system, or that more than one control function could be provided through the provision of coded indicia and apropriate logic circuitry responsive to the detection of the indicia.

We claim:

1. In an electronic order pricing system, the improvement comprising a data card having indicia representative of orderable items and the quantity of each item ordered for a given order, said data card having a plurality of rows with a row mark adjacent each row, certain ones of said rows representing an orderable item and at least one of said certain rows having a plurality of quantity marking positions which as marked represent a different quantity of the item ordered and a corresponding printout area for receiving printed data representing a row total price for the quantity of the item ordered for such row, detecting means for detecting said indicia including first means responsive to the detection of at least the row mark for said row to provide a first output signal identifying the ordered item and a second means responsive to the detection of a mark in one of the quantity positions of said one row to provide a second output signal indicating the quantity of the identified item ordered, processing means responsive to said first and second output signals to effect the calculation of a row total price representing the cost for the quantity of each item ordered and an item total price representing the sum of the row total prices, and printout means controlled by said processing means to effect the printout in the corresponding printout areas of said data card of the row total prices calculated.

2. In an electronic order pricing system, the improvement comprising a data card having a plurality of first indicia each representative of a different orderable item and at least a second indicia associated with one of said first indicia for indicating the quantity of the corresponding item ordered for a given order, detecting means for detecting said first and second indicia including first means having counting means for counting the number of said first indicia detected and identification means controlled by said counting means for providing a separate item identification signal for each of said first indicia detected to indicate which item is to be priced, and second means for providing an item quantity signal which indicates the quantity ordered of the item, price select means responsive to the item identification signal provided for each item ordered to provide for each item a set of price output signals, each signal of a set representing a digit of a unit price for the item representing by the first indicia detected, and processing means for using said price output signals and said item quantity signal for calculating a total price for the quantity of the item ordered to thereby provide price signals which represent the total price for the quantity of the item ordered.

3. The improvement in an electronic order pricing system as set forth in claim 2 in which said price select means includes path means for distributively routing said first output signal over a selected set of paths, each path of said set representing a digit of the unit price of the item ordered.

4. The improvement in an electronic order pricing system as set forth in claim 2 in which said processing means includes signal transfer means, signal accumulating means, and control means for controlling said signal transfer means to transfer each set of price output signals from said price select means to said signal accumulating means a number of times equal to the quantity determined for a corresponding item, whereby said signal accumulating means accumulates signals which represent a row total price for the quantity of each item ordered.

5. The improvement in an electronic pricing system as set forth in claim 4 in which said control means includes quantity means having coincidence detecting means, including a plurality of comparator circuits, each corresponding to a different item quantity to be determined, responsive to said second output signal for determining the quantity of the item ordered, means for providing enabling signals for sequentially enabling said comparator circuits, said second output signal being extended to a predetermined one of said comparator circuits which corresponds to the quantity of the item ordered whereby said one comparator circuit is enabled responsive to the coincidence of said second output signal and an enabling signal to provide a control signal representative of the item quantity for disabling said signal transfer means.

6. The improvement in an electronic order pricing system as set forth in claim 5 in which said item quantity means includes tax rate means for controlling said coincidence detecting means to effect the calculation of a sales tax for said order based on a preselected percentage for addition to the item total price to thereby provide the total price for said order.

7. The improvement in an electronic order pricing system as set forth in claim 6 which includes means for printing on said data card and row total price for each item ordered, the quantity of each item ordered, the item total price, the sales tax, and the total price for the order.

8. The improvement in an electronic order pricing system as set forth in claim 1 in which said detecting means includes scanning means for optically scanning a predetermined area of said data card which contains said indicia to detect said indicia and means responsive to the detection of an item quantity mark to increase the sensitivity of said scanning means.

9. In an electronic order pricing system the improvement comprising a data card having a plurality of rows and an index mark in each row, certain of said rows representing an orderable item, and at least one of said item rows including a quantity mark which represents the quantity of an item ordered for an order; card scanning means for detecting said marks, one at a time; means responsive to the detection of each of the index marks of said certain rows to generate a corresponding index signal for each row to indicate which row is being scanned; price select means responsive to the index signals generated for said certain rows to provide price signals representing the unit price for each orderable item; first control means responsive to the detection of the index marks of said certain rows to generate a first control signal for effecting the determination of the quantity of each item ordered, the calculation of a row total price for the quantity of each item ordered and the printing on said data card of the quantity of each item ordered and the row total price calculated for each ordered item; means for for accumulating the row total prices for all of the items ordered to provide an item total price; second control means responsive to the detection of a first other index mark to generate a second control signal to effect the printout on said data card in the row indexed by said further index mark of said item total price; third control means responsive to the detection of a second other index mark to generate a third control signal for effecting the calculation of a sales tax for said order, the printout on said data card of the sales tax in the row indexed by said second other index mark, and the addition of said sales tax to said item total price to provide a total price for the order; and fourth control means responsive to the detection of a third other index mark to generate a fourth control signal for effecting the printout on said data card in the row indexed by said third other index mark of the total price for the order.

10. In an electronic order pricing system, the improvement comprising a data card having a plurality of rows with a row mark adjacent each row, certain ones of said rows representing an orderable item, at least one of said certain rows being marked with a quantity mark representing a quantity ordered of the item represented by said one row, card scanning means for scanning said data card to detect said row marks and any quantity marks in said certain rows, said card scanning means including first means having means for counting the number of row marks detected, and identification means for providing a separate item identification signal for each row mark detected which indicates which item is to be priced, and second means for providing an item quantity signal which indicates the quantity ordered of the item, price select means responsive to said item identification signal to provide a set of price output signals, each signal of a set representing a digit of the unit price of the item representing by the marked row, and calculating means for using said price output signals and said item quantity signal for calculating a row total price for the quantity of the item ordered and the providing row price signals which represent the total price for the quantity of the item ordered.

11. The improvement in an electronic order pricing system as set forth in claim 10 in which said price select means includes path means for providing a different plurality of sets of signal paths for each item identification signal provided, each path set representing a digit of an item unit price and each path of each path set representing a value for the digit, said path means including a plurality of path select devices for each path set for selecting a path in each path set, each said item identification signal traversing selected paths to provide an individual set of price output signals.

12. The improvement in an electronic order pricing system as set forth in claim 11 in which each of said path select devices comprises socket means having a plurality of contacts each connected to a different output of said price select means and plug means connected to the identification means of said card scanning means and removably insertable into said socket means to engage a selected one of said contacts, each said item identification signal being routed through said price select means over an individual signal path of each set and over a path select device associated therewith to selected outputs of said price select matrix.

13. In an electronic order pricing system the improvement comprising a data card having a plurality of rows with a row mark adjacent each row, certain ones of said rows representing an orderable item, at least one of said certain rows being marked with a quantity mark representing a quantity ordered of the item represented by said one row, card scanning means for scanning said data card to detect said row marks and any quantity marks in said certain rows including a first means for providing, whenever a quantity mark is detected in a marked row, an item identification signal for said marked row which indicates which item is to be priced and a second means for providing an item quantity signal which indicates the quantity ordered of the item, price select means responsive to said item identification signal to provide a set of price output signals each signal of which corresponds to a digit of the unit price of the item represented by the marked row, first accumulator means, signal transfer means controlled by said second means for transferring to said first accumulator means the set of price output signals provided by said price select means for each item ordered as each item row is scanned, the price output signals for each item ordered being transferred to said first accumulator means a number of times equal to the quantity of each item ordered, to that said first accumulator means accumulates said price output signals to provide row total price signals which represent the total price for the quantity of item ordered, second signal accumulator means, and meand for rendering said signal transfer means effective to transfer the row price signals provided for each marked row from said first accumulator means to said second accumulator means whereby said second accumulator means stores total item price signals which represent the total of the row prices for the ordered items.

14. The improvement in an electronic order pricing system as set forth in claim 13 which includes print control means, and means for rendering said signal transfer means effective to transfer to said print control means the row price signals and the item quantity signal provided for each marked row while the row is being scanned to effect the printout on said data card in the row being scanned of the quantity ordered of and the row total price for the item represented by the row being scanned, and for effecting the transfer to said print control means of the total item price signals after all of said certain rows have been scanned to effect the printout on said data card in a certain other row of the total of the item prices for the ordered items.

15. The improvement in an electronic order pricing system as set forth in claim 13 in which said first means includes means for determining the quantity of each item ordered while the price output signals corresponding to each item are being transferred to said first accumulator means and for inhibiting further transfer of said price output signals when the quantity ordered of an item has been determined.

16. The improvement in an electronic order pricing system as set forth in claim 13 which includes inventory register means responsive to each item quantity signal and item identification signal provided to register the quantity of each item ordered.

17. In an electronic order pricing system the improvement comprising a data card having a plurality of rows with a row mark adjacent each row, certain ones of said rows representing an orderable item, at least one of said certain rows being marked with a quantity mark representing a quantity ordered of the item represented by said one row, card scanning means for scanning said data card to detect said row marks and any quantity marks in said certain rows and to provide, whenever a quantity mark is detected in a marked row, an item identification signal for said marked row which indicates which item is to be priced and an item quantity signal which indicates the quantity ordered of the item, price select means responsive to said item identification signal to provide a set of price output signals each signal of which corresponds to a digit of the unit price of the item represented by the marked row and means for coding said price output signals into binary coded signals, first accumulator means including counting means for each digit for receiving digital pulses representing the value of each digit, signal transfer means including digital pulse generating means connected to said counting means of said first accumulator means, gating means interposed between said pulse generating means and said counting means and control means responsive to the binary coded signals representing each digit to enable said gating means to pass a number of digital pulses representing the digital value of each digit to a respective counter of said first accumulator means, said number of digital pulses being passed to respective counters of said first accumulator means a number of times equal to the quantity of each item ordered, so that said first accumulator means accumulates a number of digital pulses which represent the total price for the quantity of the item ordered.

18. In an electronic order pricing system the improvement comprising a data card having a plurality of rows with a row mark adjacent each row, certain ones of said rows representing an orderable item, at least one of said certain rows being marked with a quantity mark representing a quantity ordered of the item represented by said one row, card scanning means for scanning said data card to detect said row marks and any quantity marks in said certain rows including a first means for providing, at least whenever a quantity mark is detected in a marked row, an item identification signal for said marked row which indicates which item is to be priced, a second means for providing an item quantity signal which indicates the quantity ordered of the item and error indicating means for providing an error indication whenever more than one quantity mark is detected in one of said certain rows, price select means responsive to said item identification signal to provide a set of price output signals, each signal of a set representing a digit of the unit price of the item represented by the marked row, and calculating means for using said price output signals and said item quantity signal for calculating a row total price for the quantity of the item ordered and providing row price signals which represent the total price for the quantity of the item ordered.

19. The improvement in an electronic order pricing system as set forth in claim 16 in which said card scanning means includes data card reading apparatus for scanning said data card a row at a time, and advance means for advancing said data card past said card reading apparatus, means responsive to each item quantity signal for disabling said advance means to stop advancement of said card whereby the row of said data card having the pair of marks detected remains adjacent said card reading apparatus while the row total price is calculated for that row, and means for enabling said advance means after each row total price has been calculated.

20. The improvement in an electronic order pricing system as set forth in claim 19 in which said card reading apparatus scans a predetermined area of each row of said data card as said data card is advanced past said card reading apparatus, said card reading apparatus including means responsive to the detection of each quantity mark to increase the sensitivity of said card reading apparatus.

21. In an electronic order pricing system the improvement comprising a data card including indicia representative of orderable items and the quantity of each item ordered for an order and at least a first control indicia, detecting means for detecting said indicia including a first means for providing a first output signal representing an ordered item and a second means for providing a second output signal representing the quantity of the item ordered, calculating means responsive to said first and second output signals to effect the calculation of a subtotal price representing the cost of the items ordered and to provide price data representing said subtotal price, first accumulator means for storing said price data, said second means including tax rate means for establishing a percent tax rate for the order pricing system to permit a tax to be computed for the order, second accumulator means, control means responsive to the detection of said first control indicia to provide a control signal and transfer means responsive to said control signal for transferring said price data from said first accumulator means to said second accumulator means a number of times equal to a tax rate established whereby said second accumulator means stores tax data representing the tax for said order, said transfer means being further effective to transfer said tax data from said second accumulator means to said first accumulator means whereby said first accumulator means stores data representing the total price for the order.

22. The improvement is an electronic order pricing system as set forth in claim 21 in which said transfer means includes means for decreasing the tax data two orders of magnitude prior to the transfer of said tax data from said second accumulator means to said first accumulator means.

23. The improvement in an electronic order pricing system as set forth in claim 22 in which said transfer means includes means for rounding off said tax data prior to decreasing the order of magnitude of said tax data.

24. The improvement in an electronic order pricing system as set forth in claim 21 in which said tax rate means includes means for selectively providing outputs each representing a different tax rate, and said second means includes means for determining which output has been selected and for providing an inhibit signal to inhibit further transfer of said price data from said first accumulator means to said second accumulator means when the output selected has been determined 25. The improvement in an electronic order pricing system as set forth in claim 21 in which said tax rate means includes first means for establishing a whole percent tax rate and second means for establishing a fractional percent tax rate.

26. In an electronic order pricing system the improvement comprising a data card having a plurality of item rows which represent an orderable item, each item row having an index mark and certain of said item rows being marked with a quantity mark to represent a number ordered of the item of a marked row for a given order, scanning means for scanning said data card a row at a time to detect said marks including a first means for providing a first output signal in response to the detection of each row mark and a second means for providing a second output signal in response to the detection of each item quantity mark, counting means for counting the number of said first output signals provided and for providing an individual item identification signal for each item row as each row is being scanned, price select means responsive to each item identification signal to provide a set of price output signals which correspond to the unit price of the item identified, item quantity means including coincidence detecting means responsive to said second output signal to determine the number of items ordered for each marked row, first accumulator means, signal transfer means for transferring to said first accumulator means the price output signals provided for a marked row a number of times equal to the number of items ordered for the marked row so that the first accumulator means stores row price signals representing the price for the number of items ordered for said marked row, second accumulator means, said signal transfer means being effective to transfer to said second accumulator means the row price signals provided for each marked row whereby said second accumulator means stores total item price signals representing the total price for the ordered items.

27. In an electronic order pricing system, the improvement comprising a data card having a plurality of item rows each of which represents an orderable item, each item row having a row mark and certain of said item rows being marked with a quantity mark to represent a number ordered of the item of the marked row for a given order; scanning means for scanning said data card a row at a time and for providing a first output signal responsive to the detection of each row mark and a second output signal responsive to the detection of each item quantity mark; drive means for advancing said data card past said scanning means, means responsive to said first and second output signals for disabling said drive means to halt the advancement of said data card each time a row mark and an item quantity mark are detected simultaneously, counting means for counting the number of said first output signals and for providing an individual item identification signal for each item row as each item row is being scanned; price select means responsive to each item identification signal to provide a set of price output signals which correspond to the unit price of the item identified; means responsive to said second output signal to determine the number of items ordered for each marked row; first accumulator means; signal transfer means for transferring the price output signals provided for a marked row to said first accumulator means a number of times equal to the number of items ordered for the marked row so that the first accumulator means stores row price signals representing the price for the number of items ordered for said marked row; second accumulator means; said signal transfer means being effective to transfer to said second accumulator means the row price signals provided for each marked row whereby said second accumulator means stores total item price signals representing the total price for the ordered items; and means for enabling said drive means after the item row price signals provided in response to said first and second output signals have been transferred to said second accumulator means.

28. The improvement in an electronic order pricing system as set forth in claim 26 in which said price select means includes means for providing a plurality of sets of paths for each orderable item, each path set representing a digit of the unit price of an associated orderable item, and each path of a set representing a digit value, and path select means in each path set for selecting a path of each path set.

29. The improvement in an electronic order pricing system as set forth in claim 28 in which said path select means includes socket means having a plurality of contacts each connected to a different output of said price select means and plug means connected to said counting means and removably insertable into said socket means to engage a selected one of said contacts, each item identification signal being distributively routed through said price select means over an individual plurality of sets of paths provided to selected outputs of said price select means.

30. The improvement in an electronic order pricing system as set forth in claim 26 wherein said item quantity means includes tax rate means for establishing a percent tax rate for the order pricing system to permit a tax to be computed for the order, said signal transfer means being effective to transfer the total item price signals from said second accumulator means to said first accumulator means a number of times equal to the tax rate established whereby said first accumulator means stores tax signals representing the tax for the order, said signal transfer means being further effective to transfer said tax signals to said second accumulator means whereby said second accumulator means stores signals representing the total price for the order.

31. The improvement in an electronic order pricing system as set forth in claim 30 in which said tax rate means includes tax select switch means for selecting one out of ten outputs of said tax rate means, each representing a different whole percent tax rate, said item quantity means being operable to determine which output has been selected while said total item price signals are being transferred from said second accumulator means to said first accumulator means and to provide a signal for inhibiting further transfer of said total item price signals when the output selected has been determined.

32. The improvement in an electronic order pricing system as set forth in claim 31 in which said tax rate means includes further tax select means for establishing a fractional percent tax rate, said signal transfer means including control means for controlling said item quantity means to enable said whole percent tax to be computed for said order, to enable a fractional percent tax to be computed for said order, and to effect the addition of said whole percent tax and said fractional percent tax to said total price for the ordered items to provide said total order price signals in said second accumulator means.

33. The improvement in an electronic order pricing system as set forth in claim 26 in which said set of price output signals provided by said price select means include cent digit signals, dime digit signals, and dollar digit signals which represent the value of the digits of the unit price of the item identified, said first and said second accumulator means each including cent digit signal storing means, dime digit signal storing means, and dollar digit signal storing means, and said signal transfer means including at least a cent digit transfer section, a dime digit transfer section, and a dollar digit transfer section for transferring the price output signals which represent the value of the cent, dime, and dollar digits of the unit price over separate paths to a respective signal storing means of said first accumulator means, and from the signal storing means of said first accumulator means to respective signal storing means of said second accumulator means.

34. The improvement in an electronic order pricing system as set forth in claim 33 in which said item quantity means includes means for establishing a percent tax rate for the order pricing system to permit a tax to be computed for the order, said signal transfer means being effective to transfer the item total price signals from said second accumulator means to said first accumulator means a number of times equal to a tax rate established so that the cent digit signal storing means, the dime digit signal storing means, and the dollar digit storing means of said first accumulator means store tax signals representing the digits of a tax computed for the order, said signal transfer means including means to effect the transfer of the tax signals in the dollar digit signal storing means of said first accumulator means to the cent digit signal storing means of said second accumulator means, whereby said second accumulator means stores signals which represent the digits of the total price for the order.

35. The improvement in an electronic order pricing system as set forth in claim 34 in which said signal transfer means further includes means responsive to the signals which represent the dime digit of said tax for providing, prior to the transfer of said tax signals from said second accumulator means to said first accumulator means, a round-off signal whenever the dime digit is equal to or greater than five, and means responsive to said round-off signal to cause the tax dollar digit to be increased by one.

36. The improvement in an electronic order pricing system as set forth in claim 26 which includes inventory counter means having separate item quantity register means for each orderable item, said inventory counter means being responsive to each item identification signal to select item quantity register means associated with the item identified and being responsive to said second output signal to operate said selected register means to register the quantity ordered of the item identified.

37. In an electronic order pricing system the improvement comprising an order data card having a plurality of rows with a preprinted index mark adjacent each row, certain ones of said rows representing an orderable item, and at least one of said certain rows including an item quantity area adjacent the corresponding index mark having a plurality of quantity marking positions for receiving a pencil mark which indicates the quantity of the item ordered and a corresponding printout area for receiving printed data representing a row total price for the quantity of the item ordered for such row, detecting means for detecting said index marks and said pencil marks including a first means responsive to the detection of at least the index mark for said one row to provide a first output signal indicating the ordered item and a second means responsive to the detection of a pencil mark in one of the quantity positions of said one row to provide a second output signal indicating the quantity of the item ordered and calculating means responsive to said first and second output signals for effecting the calculation of a row total price representing the cost for the quantity of the item ordered and an item total price representing the sum of the row total prices, and printout means controlled by said calculating means to effect the printout in the corresponding printout areas of said order data card of the row total prices calculated.

38. In an electronic order pricing system the improvement comprising, a data card having a plurality of rows with an index mark adjacent each row, and an area adjacent each index mark for receiving a quantity mark indicating the quantity of each item ordered, scan means for scanning said data card a row at a time to detect said row marks and said item quantity marks including a first means for providing a first output signal indicating an ordered item and a second means for providing a second output signal indicating the quantity of the item ordered, processing means responsive to said first and second output signals for effecting the calculation of a row total price representing the cost for the quantity of each item ordered, and an item total price representing the sum of the row total prices, advance means operable when enabled to continuously advance said data card past said scan means, means operable in response to the concurrent detection of an item quantity mark and a corresponding index mark in a given row to disable said advance means to thereby temporarily stop advancement of said data card whereby the row of said data card having the pair of marks detected remains adjacent said scan means while the row total price is calculated for that row, means for printing the calculated row total price on said data card in the row being scanned, and means for enabling said advance means after each row total price has been printed on said data card.

39. For use in an electronic order pricing system having a card transport apparatus, a data card having longitudinal and transverse dimensions, said data card including a plurality of index marks disposed longitudinally thereon, a plurality of generally transversely disposed orderable item lines disposed in predetermined relation to said index marks, an item quantity area associated with each of said item lines for receiving quantity indicia indicating the quantity of each item ordered, and a printing area disposed adjacent each of said item lines for receiving printed indicia thereon indicating the quantity of each item ordered and the price corresponding to the quantity of each item ordered.

40. A system as set forth in claim 39 wherein said data card further includes a transversely disposed line corresponding to a selected one of said index marks for receiving printed indicia indicating the total price of the items ordered.

41. A system as set forth in claim 39 wherein said data card has a longitudinally extending margin edge, said index marks being equidistantly spaced longitudinally along said margin edge, said transversely disposed orderable item lines being spaced longitudinally along said data card with each item line corresponding to one of said index marks, and wherein the item quantity area associated with each of said item lines comprises a transversely disposed area associated with each of said item lines adjacent the corresponding index mark therefor.

42. In an electronic order pricing system the improvement comprising, a data card including indicia representative of orderable items and the quantity of each item ordered, card scanning means for scanning said data card to detect said indicia to provide an item identification signal which identifies an item to be priced and an item quantity signal which indicates the quantity ordered of the item identified, price select means responsive to said item identification signal to provide a set of price output signals, each signal of which corresponds to a digit of the unit price of the identified item, and means for coding said price output signals into binary coded signals, accumulator means including counting means having a separate pulse counter for each digit for receiving digital pulses representing the value of each digit, signal transfer means including digital pulse generating means connected to said counting means of said accumulator means, gating means interposed between said pulse generating means and said counting means, and control means responsive to the binary coded signals representing each digit to enable said gating means to pass a number of digital pulses representing the digital value of each digit to a respective pulse counter of said accumulator means, the number of digital pulses being passed to respective pulse counters of said accumulator means a number of times equal to the quantity of the item ordered, so that said accumulator means accumulates a number of digital pulses which represent the total price for the quantity of the item ordered.

43. A digital computer for recording and calculating transaction data on an input-output form bearing clock lines and corresponding rows of data blocks containing data marks comprising: means to feed the form containing the data into a form reader; means to scan a row of blocks adjacent clock lines on the form for quantity of an item until a data mark in a row of blocks corresponding to a clock line is sensed; means to stop the form for a time interval; memory means for storing sensed data; means to continue the form feeding and the scan, stop data storage for each succeeding row of blocks corresponding to a clock line until all the data have been sensed; means to calculate quantity and price transactions and for storing the results of the transaction in the memory; and means to print the data printout and the total transaction calculation on the form.

44. The apparatus of claim 43, including means for printing quantity, and quantity x price data onto the form.

45. In an electronic order pricing system, the improvement comprising a data form having a plurality of first indicia representing orderable items and corresponding rows of data blocks for receiving data marks indicating the quantity of an item ordered, advance means for feeding the data form into a form reader, means for scanning the rows of data blocks until a data mark is sensed in a row of blocks corresponding to one of said first indicia, means to stop the form for a time interval whenever a data mark is sensed, means for storing data representing the data mark sensed, means for using the stored data to calculate the quantity of the item ordered and price transaction data for the quantity of the item ordered, said advance means being controlled thereafter to continue feeding the form through the form reader permitting the form to be stopped as each data mark is sensed until all data marks have been sensed to permit calculation of the quantity of each item ordered, price transaction data for each item ordered, and a total transaction calculation for the order, and means for printing at least the quantity of each item ordered and the total transaction calculation on the data form.

46. In an electronic order pricing system, the improvement comprising a data card bearing a plurality of first indicia representing orderable items and corresponding rows of data blocks for receiving data marks indicating the quantity of an item ordered, means for scanning the rows of data blocks adjacent the first indicia to sense data marks disposed therein, means for storing data representing the quantity ordered of a given item as indicated by a data mark in at least one row of data blocks, and means for using the stored data to calculate quantity and price transaction data for the quantity of the item ordered.

47. In an electronic order pricing system, the improvement comprising a data card having indicia representative of orderable items and the quantity of each item ordered, said data card having a plurality of rows with a mark adjacent each row, certain ones of said rows representing an orderable item and at least one of said certain rows having a plurality of quantity marking positions which as marked by data marks indicate a different quantity of the item ordered, means for sensing said indicia to provide output signals representing the quantities of items ordered, and means for using said output signals to calculate a row total price representing the cost for the quantity of each item ordered and an item total price representing the sum of the total prices.

48. In an electronic order pricing system, the improvement comprising a data card having a plurality of first indicia each representative of a different orderable item and at least a second indicia associated with one of said first indicia for indicating the quantity of the corresponding item ordered for a given order, means for detecting said first and second indicia, means responsive to the detection of at least said second indicia and the corresponding first indicia for calculating the quantity of the item ordered and the total price for the quantity of the item ordered, and means for printing the quantity of the item ordered and total price for the order on the data card.

49. In an electronic order pricing system, an order pricing apparatus for recording and calculating transaction data on a data card having first indicia representative of orderable items and second indicia associated with said first indicia for indicating quantities of items ordered, said order pricing apparatus comprising detecting means for detecting said first and second indicia including first means having counting means for counting the number of said first indicia detected and identification means controlled by said counting means for providing a separate item identification signal for each of said first indicia detected to indicate which item is to be priced, and second means for providing an item quantity signal which indicates the quantity ordered of the item, price select means responsive to the item identification signal provided for each item ordered to provide for each item a set of price output signals, each signal of a set representing a digit of a unit price for the item represented by the first indicia detected, and processing means for using said price output signals and said item quantity signal for calculating a total price for the quantity of the item ordered to thereby provide price signals which represent the total price for the quantity of the item ordered.

50. In an electronic order pricing system, the improvement comprising a data bearing member of a predetermined size having longitudinal and transverse dimensions, a plurality of index marks disposed longitudinally on said member, a plurality of data channels longitudinally disposed on said member in a predetermined relation to said index marks, at least certain ones of said data channels representing orderable items, said certain data channels being adapted to receive indicia indicating the quantity of each item ordered, and a printout area for receiving printed indicia indicating the total price for ordered items, detecting means for detecting said indicia including first means responsive to the detection of at least the row mark for said row to provide a first output signal identifying the ordered item and a second means responsive to the detection of a mark in one of the quantity positions of said one row to provide a second output signal indicating the quantity of the identified item ordered, processing means responsive to said first and second output signals to effect the calculation of a row total price representing the cost for the quantity of each item ordered and an item total price representing the sum of the row total prices, and printout means controlled by said processing means to effect the printout in the corresponding printout areas of said data card of the row total prices calculated.

51. For use in an order pricing system having an electronic order pricing apparatus, a data control device for supplying input data to said order pricing apparatus, said data control device comprising a data bearing member of a predetermined size having longitudinal and transverse dimensions, a plurality of index marks disposed lingitudinally on said member, a plurality of data channels longitudinally disposed on said member in a predetermined relation to said index marks, at least certain ones of said data channels representing orderable items, said certain data channels being adapted to receive indicia indicating the quantity of each item ordered, and a printout area for receiving printed indicia indicating the total price for ordered items.

52. A data control device as set forth in claim 51 wherein said printing area is transversely disposed on said member in correspondence with one of said index marks.

53. For use in an order pricing system including an electronic order pricing apparatus a data control device comprising a data card bearing indicia representative of orderable items and the quantity of each item ordered for a given order, said data card having a plurality of rows with a row mark adjacent each row, certain ones of said rows representing orderable items and at least one of said certain rows bearing a plurality of quantity marking positions which as marked represent a different quantity of the item ordered and a corresponding printout area for receiving printed data representing a row total price for the quantity of the item ordered for such row.

54. In an electronic order pricing system in which a preprinted order card is marked by personnel to designate food items ordered by a restaurant customer, the improvement comprising an order card having a plurality of rows each of which is arranged to represent an orderable food item, the identification of which is printed in such row, a row mark associated with each row for identifying such row on the order card, each row also including a plurality of digits, each of which is of a different value for designating different quantities of the food items ordered for such row, and which as marked by the personnel indicate the quantity of each item ordered for a given order, and an order pricing apparatus including card scanning means, means for enabling the personnel to insert the order card into the pricing apparatus to permit detection of each marked digit and the corresponding row mark by the card scanning means which responsively provides output signals representing the quantities of items ordered, means for using said output signals to calculate a row total price representing the cost for the quantity of each item ordered and an item total price representing the sum of the row total prices, and means for printing the item total price on the order card for use by the customer.

55. The improvement in an electronic order pricing system as set forth in claim 54 in which the order card includes in each row a printing area for receiving printed data indicating the quantity ordered and the row total price charged to the customer for each item ordered.

56. A method of controlling the operation of an electronic order pricing apparatus for sensing and processing transaction data and recording data representing the results of the transaction on an input-output form; said apparatus including a form reader for sensing the transaction data; computing means having memory means for storing sensed data and data processing means for processing the data; and said form bearing a plurality of clock lines each representing an orderable item, and a row of data blocks corresponding to each clock line for receiving a data mark indicating the quantity of an item ordered, said method comprising the steps of feeding the form containing the transaction data into the form reader; scanning the row of data blocks adjacent to a clock line until a data mark corresponding to the clock line is sensed; stopping the form for a time interval; storing the sensed data in the memory; continuing the form feeding and the scanning until succeeding clock lines and data marks have been sensed including repeating the steps of stopping the form and storing sensed data for each row of blocks having a data mark corresponding to a clock line until all the data marks have been sensed; calculating quantity x price by way of the data processing means and storing data representing the results of the transaction in the memory; and recording the data representing the results of the transaction on the form.

57. The method of claim 56 in which data stored in the memory is updated by each transaction.

58. The method of claim 56 in which the data from the blocks is printed onto the form during the time interval.

59. A method of controlling the operation of an electronic order pricing apparatus for sensing and processing transaction data and recording data representing the results of the transaction on an input-output form; said apparatus including a form reader for sensing the transaction data; computing means having memory means for storing sensed data and data processing means for processing the data; and said form bearing a plurality of clock lines each representing an orderable item, and a row of data blocks corresponding to each clock line for receiving a data mark indicating the quantity of an item ordered, said method comprising the steps of feeding the form containing the transaction data into the form reader; scanning the row of data blocks adjacent to a clock line until a data mark corresponding to the clock line is sensed; stopping the form for a time interval; storing the sensed data in the memory; continuing the form feeding and the scanning until succeeding clock lines and data marks have been sensed including repeating the steps of stopping the form and storing sensed data for each row of blocks having a data mark corresponding to a clock line until all the data marks have been sensed; calculating quantity of an item price and quantity x price by way of the data processing means and storing data representing the results of the transaction in the memory; and recording the data representing the results of the transaction on the form.

60. The method of claim 59 in which data stored in the memory is updated by each transaction.

61. The method of claim 59 in which the data from the blocks is printed onto the form during the time interval.

* * * * *

UNITED STATES PATENT AND TRADEMARK OFFICE
CERTIFICATE OF CORRECTION

PATENT NO. : 4,128,758
DATED : December 5, 1978
INVENTOR(S) : Raymond J. Bukowski and Frederick S. Erst It is certified that error appears in the above-identified patent and that said Letters Patent are hereby corrected as shown below:

Column 49, line 62 omit "the" third occurrence.

Column 50, line 48, "meand" should be -- means --;

Column 53, line 6, place a "." at the end of the sentence.

Signed and Sealed this

Eighth Day of May 1979

[SEAL]

Attest:

RUTH C. MASON
Attesting Officer

DONALD W. BANNER
Commissioner of Patents and Trademarks